US012621890B2

(12) United States Patent
Qiao et al.

(10) Patent No.: US 12,621,890 B2
(45) Date of Patent: May 5, 2026

(54) ASYMMETRIC CHANNEL

(71) Applicant: Ofinno, LLC, Reston, VA (US)

(72) Inventors: Weihua Qiao, Herndon, VA (US);
Kyungmin Park, Vienna, VA (US);
Esmael Hejazi Dinan, McLean, VA
(US); SungDuck Chun, Fairfax, VA
(US); Peyman Talebi Fard, Vienna, VA
(US); Hua Zhou, Vienna, VA (US);
Taehun Kim, Fairfax, VA (US)

(73) Assignee: Ofinno, LLC, Reston, VA (US)

( * ) Notice: Subject to any disclaimer, the term of this
patent is extended or adjusted under 35
U.S.C. 154(b) by 387 days.

(21) Appl. No.: 18/125,545

(22) Filed: Mar. 23, 2023

(65) Prior Publication Data

US 2023/0309166 A1 Sep. 28, 2023

Related U.S. Application Data

(60) Provisional application No. 63/322,740, filed on Mar.
23, 2022.

(51) Int. Cl.
*H04L 12/26* (2006.01)
*H04W 76/15* (2018.01)
*H04W 76/27* (2018.01)

(52) U.S. Cl.
CPC ........... *H04W 76/15* (2018.02); *H04W 76/27*
(2018.02)

(58) Field of Classification Search
None
See application file for complete search history.

(56) References Cited

U.S. PATENT DOCUMENTS

| | | | | |
|---|---|---|---|---|
| 11,425,543 B2 * | 8/2022 | Kang | .................... | H04W 4/40 |
| 12,047,266 B2 * | 7/2024 | Hande | ................ | H04L 43/0864 |
| 2019/0239097 A1 * | 8/2019 | Meylan | ................ | H04W 24/02 |
| 2019/0288953 A1 * | 9/2019 | Yavuz | ............... | H04W 28/0205 |
| 2021/0100061 A1 * | 4/2021 | Park | ..................... | H04W 76/25 |
| 2022/0225351 A1 * | 7/2022 | Liu | ......................... | H04L 1/08 |
| 2022/0386165 A1 * | 12/2022 | Liu | ....................... | H04W 76/14 |
| 2023/0276391 A1 * | 8/2023 | Qiao | .................. | H04L 43/0858 |
| | | | | 370/350 |

OTHER PUBLICATIONS

3GPP TS 22.104 V18.3.0 (Dec. 2021); Technical Specification; 3rd
Generation Partnership Project; Technical Specification Group Ser-
vices and System Aspects; Service requirements for cyber-physical
control applications in vertical domains; Stage 1; (Release 18).

(Continued)

*Primary Examiner* — Sithu Ko
(74) *Attorney, Agent, or Firm* — Xin Gao; Kavon
Nasabzadeh; Jacob L. Mangan

(57) ABSTRACT

A base station may receive, from a first wireless device, a
first radio resource control (RRC) message indicating that a
communication associated with a bearer is asymmetric. The
bearer may be associated with a service that needs a sym-
metric communication. The base station may also send, to
the first wireless device and based on the first RRC message,
a second RRC message that includes radio resource con-
figuration parameters of the first wireless device.

20 Claims, 26 Drawing Sheets

(56) References Cited

OTHER PUBLICATIONS

3GPP TR 22.867 V18.2.0 (Dec. 2021); 3rd Generation Partnership Project; Technical Specification Group Services and System Aspects; Study on 5G Smart Energy and Infrastructure; (Release 18).

3GPP TS 23.401 V17.3.0 (Dec. 2021); Technical Specification; 3rd Generation Partnership Project; Technical Specification Group Services and System Aspects; General Packet Radio Service (GPRS) enhancements for Evolved Universal Terrestrial Radio Access Network (E-UTRAN) access; (Release 17).

3GPP TS 23.501 V17.3.0 (Dec. 2021); Technical Specification; 3rd Generation Partnership Project; Technical Specification Group Services and System Aspects; System architecture for the 5G System (5GS); Stage 2; (Release 17).

3GPP TS 23.502 V17.3.0 (Dec. 2021); Technical Specification; 3rd Generation Partnership Project; Technical Specification Group Services and System Aspects; Procedures for the 5G System (5GS); Stage 2; (Release 17).

3GPP TS 23.503 V17.3.0 (Dec. 2021); Technical Specification; 3rd Generation Partnership Project; Technical Specification Group Services and System Aspects; Policy and charging control framework for the 5G System (5GS); Stage 2; (Release 17).

3GPP TS 38.214 V16.7.0 (Sep. 2021); Technical Specification; 3rd Generation Partnership Project; Technical Specification Group Radio Access Network; NR; Physical layer procedures for data; (Release 16).

3GPP TS 38.300 V16.8.0 (Dec. 2021); Technical Specification; 3rd Generation Partnership Project; Technical Specification Group Radio Access Network; NR; NR and NG-RAN Overall Description; Stage 2; (Release 16).

3GPP TS 38.321 V16.7.0 (Dec. 2021); Technical Specification; 3rd Generation Partnership Project; Technical Specification Group Radio Access Network; NR; Medium Access Control (MAC) protocol specification; (Release 16).

3GPP TS 38.331 V16.7.0 (Dec. 2021); Technical Specification; 3rd Generation Partnership Project; Technical Specification Group Radio Access Network; NR; Radio Resource Control (RRC) protocol specification; (Release 16).

R3-191770; 3GPP TSG-RAN WG3 #103bis; Xi'An, China, Apr. 8-Apr. 12, 2019; Agenda Item: 25.1; Source: Ericsson; Title: Discussion on QoS Monitoring for URLLC; Document for: Discussion, Decision.

RP-211574; 3GPP TSG RAN Meeting #92e; Electronic Meeting, Jun. 14-18, 2021; Revision of RP-210918; Source: Ericsson; Title: Revised WID on support of reduced capability NR devices; Document for: Approval; Agenda Item: 9.7.1.7.

S1-203342-cl; 3GPP TSG-SA WG1 Meeting #91e; Electronic Meeting, Aug. 24-Sep. 2, 2020; (revision of S1-203124r2); Title: FS_5GSEI Use case of Line Current Differential Protection in power distribution grid; Agenda Item: 7.9.1; Source: Huawei, China Telecom, Samsung Electronics GmbH, Orange; Contact: Shuang Zhang.

S1-203342-rm; 3GPP TSG-SA WG1 Meeting #91e; Electronic Meeting, Aug. 24-Sep. 2, 2020; (revision of S1-203124r2xxxx); Title: FS_5GSEI Use case of Line Current Differential Protection in power distribution grid; Agenda tem: 7.9.1; Source: Huawei, China Telecom, Samsung Electronics GmbH, Orange; Contact: Shuang Zhang.

S1-213296; 3GPP TSG-SA1 Meeting #95e; Electronic Meeting, Aug. 23-Sep. 2, 2021; (revision of S1-213110r5); Change Request; 22.104; CR 0078; rev—; Current version: 18.1.0.

S1-213297; 3GPP TSG-SA1 Meeting #95e; Electronic Meeting, Aug. 23-Sep. 2, 2021; (revision of S1-213202r7); Change Request; 22.104; CR 0087; rev—; Current version: 18.1.0.

Yan, Ye; Qian, Yi; Sharif, Hamid; and Tipper, David, "A Survey on Smart Grid Communication Infrastructures: Motivations, Requirements and Challenges" (2013). Faculty Publications from the Department of Electrical and Computer Engineering. 316.

Fredrik Ege Abrahamsen; Yun Ai ; and Michael Cheffena, "Communication Technologies for Smart Grid: A Comprehensive Survey" Sensors. 2021; 21(23):8087.

Communications solutions from power generation to consumers, GE, 2021.

Ketan Rajawat; "Smart Grid Communications"; IIT Kanpur.

Ersan Kabalci and Yasin Kabalci; "Smart Grids and Their Communication Systems"; Mar. 30, 2019.

Department of Energy; Communications Requirements of Smart Grid Technologies; Oct. 5, 2010.

Focus Group On Smart Grid; Smart-O-34Rev.4; International Telecommunication Union; Telecommunication Standardization Sector; Study Period 2009-2012; Geneva, Dec. 18-21, 2011.

3GPP TS 28.552 V17.5.0 (Dec. 2021); Technical Specification; 3rd Generation Partnership Project; Technical Specification Group Services and System Aspects; Management and orchestration; 5G performance measurements; (Release 17).

R2-1910714; 3GPP TSG-RAN WG2 Meeting #107; Prague, Czech Republic, Aug. 26-30, 2019; Agenda item: 11.12.3; Source: Nokia, Nokia Shanghai Bell; Title: Accurate UE-RAN delay measurement; WID/SID: NR_SON_MDT-Core—Release 16; Document for: Discussion and Decision.

R3-190030; 3GPP TSG-RAN WG3 #103; Athens, Greece, Feb. 25-Mar. 1, 2019; SA WG2 Meeting #S2-131; S2-1813333; Nov. 26-30, 2018, West Palm Beach, US; Title: LS on 5G_URLLC; Response to:—; Release: Rel-16; Work Item: FS_5G_URLLC; Source: SA2.

R3-191771; 3GPP TSG-RAN WG3 #103bis; Xi'An, China, Apr. 8-Apr. 12, 2019; Title: [Draft] Reply LS on 5G_URLLC; Response to: R3-190030; Release: Rel-16; Work Item: FS_5G_URLLC; Source: Ericsson [to be RAN3].

A.4 Monitoring of UL and DL user plane delay inNG-RAN.

Daniel Fahlborg; "Measuring one-way Packet Delay in a Radio Network"; Master of Science Thesis in Electrical Engineering; Department of Electrical Engineering, Linköping University, 2018.

Accedian Networks; White Paper—One-Way Delay Measurement Techniques; Jan. 2012.

* cited by examiner

FIG. 7C

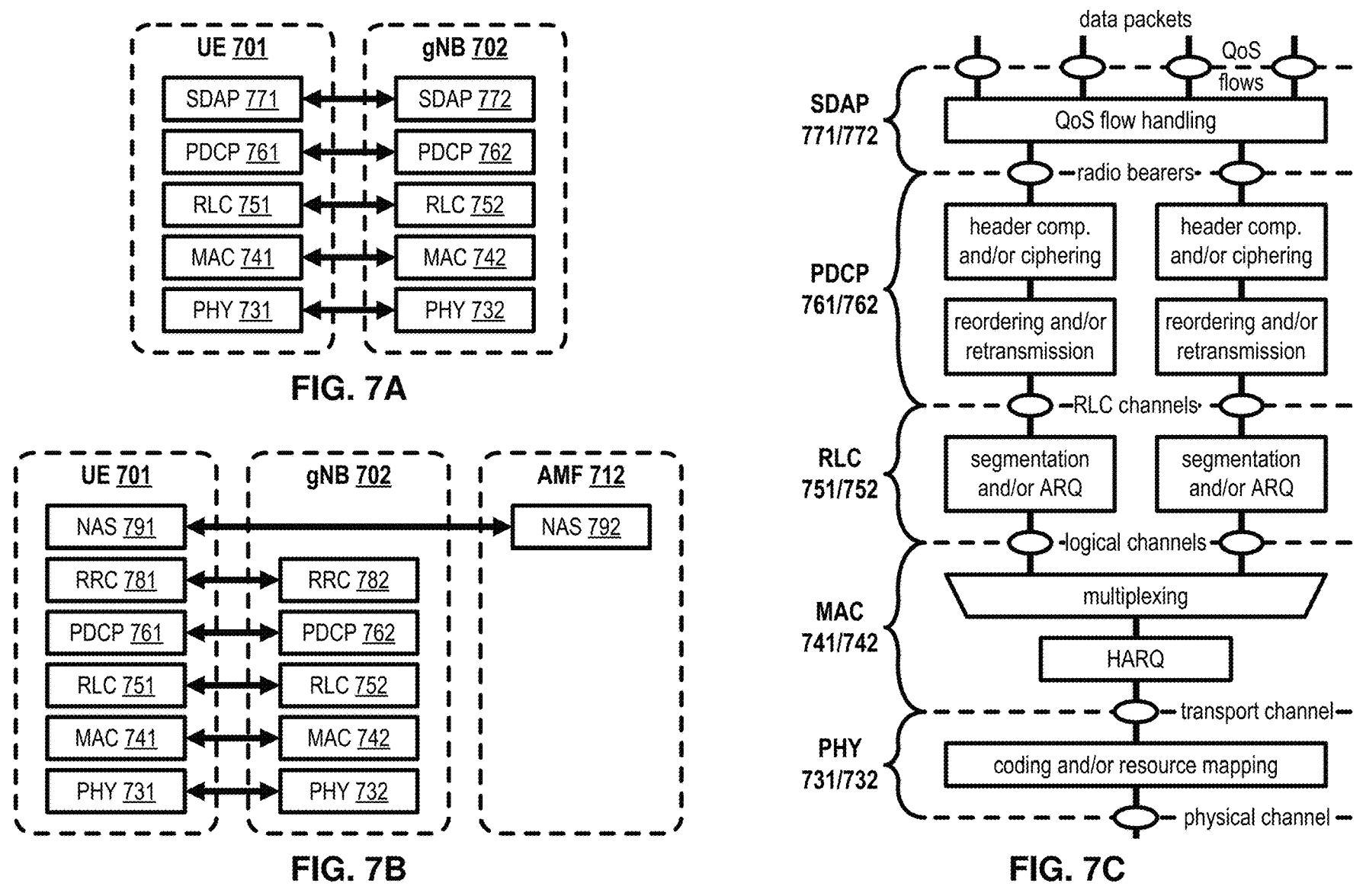

SDAP 771/772

PDCP 761/762

RLC 751/752

MAC 741/742

PHY 731/732 data packets

QoS flows

QoS flow handling radio bearers header comp. and/or ciphering reordering and/or retransmission header comp. and/or ciphering reordering and/or retransmission RLC channels segmentation and/or ARQ segmentation and/or ARQ logical channels multiplexing

HARQ transport channel coding and/or resource mapping physical channel

FIG. 7A gNB 702

SDAP 772

PDCP 762

RLC 752

MAC 742

PHY 732

UE 701

SDAP 771

PDCP 761

RLC 751

MAC 741

PHY 731

FIG. 7B

AMF 712

NAS 792 gNB 702

RRC 782

PDCP 762

RLC 752

MAC 742

PHY 732

UE 701

NAS 791

RRC 781

PDCP 761

RLC 751

MAC 741

PHY 731

RRCSetupRequest message

```
-- ASN1START
-- TAG-RRCSETUPREQUEST-START

RRCSetupRequest ::=          SEQUENCE {
    rrcSetupRequest          RRCSetupRequest-IEs
}

RRCSetupRequest-IEs ::=      SEQUENCE {
    ue-Identity              InitialUE-Identity,
    establishmentCause       EstablishmentCause,
    spare                    BIT STRING (SIZE (1))
}

InitialUE-Identity ::=       CHOICE {
    ng-5G-S-TMSI-Part1       BIT STRING (SIZE (39)),
    randomValue              BIT STRING (SIZE (39))
}

EstablishmentCause ::=       ENUMERATED {
    emergency, highPriorityAccess, mt-Access, mo-Signalling,
    mo-Data, mo-VoiceCall, mo-VideoCall, mo-SMS, mps-PriorityAccess, mcs-PriorityAccess,
    AsymmetricChannelIndication, spare5, spare4, spare3, spare2, spare1}

-- TAG-RRCSETUPREQUEST-STOP
-- ASN1STOP
```

FIG. 22

UE sending, by a first wireless device to a base station, a first message indicating an asymmetric channel between the first wireless device and a second wireless device receiving, by the first wireless device from the base station, a second message indicating modifying radio bearer resource of the asymmetric channel

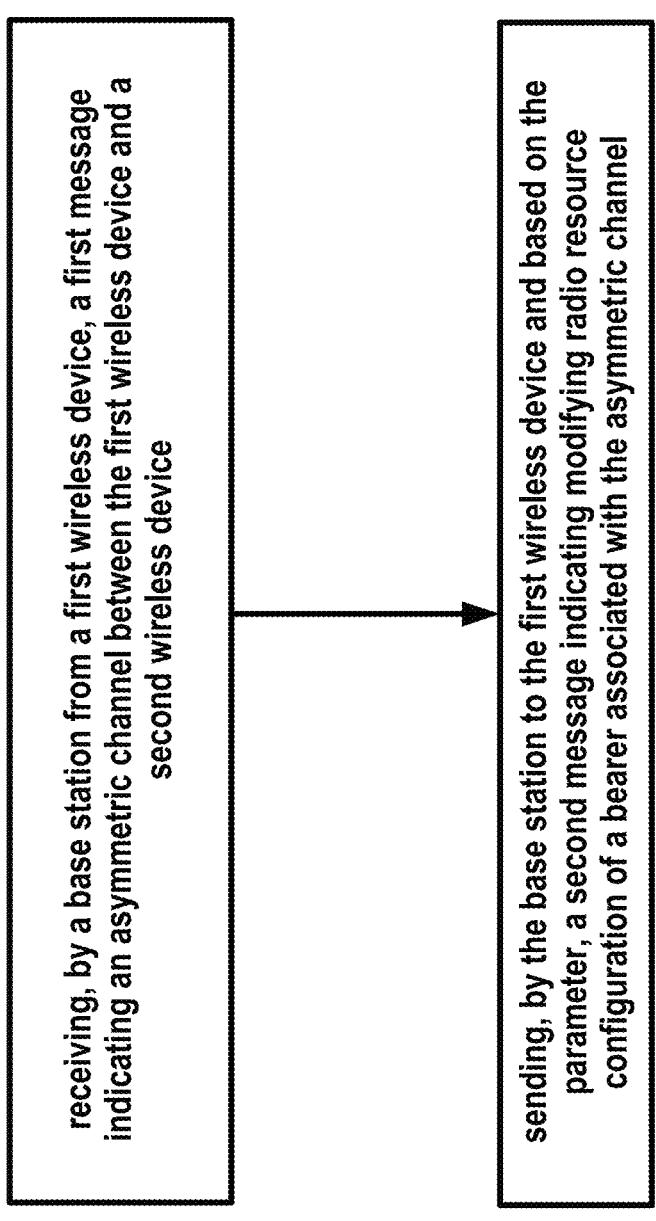

(R)AN receiving, by a base station from a first wireless device, a first message indicating an asymmetric channel between the first wireless device and a second wireless device sending, by the base station to the first wireless device and based on the parameter, a second message indicating modifying radio resource configuration of a bearer associated with the asymmetric channel

FIG. 24

ASYMMETRIC CHANNEL

CROSS-REFERENCE TO RELATED APPLICATIONS

This application claims the benefit of U.S. Provisional Application No. 63/322,740, filed Mar. 23, 2022, which is hereby incorporated by reference in its entirety.

BRIEF DESCRIPTION OF THE DRAWINGS

Examples of several of the various embodiments of the present disclosure are described herein with reference to the drawings.

FIG. 7A, FIG. 7B, and FIG. 7C illustrate a user plane protocol stack, a control plane protocol stack, and services provided between protocol layers of the user plane protocol stack.

FIG. 22 is an example diagram depicting a RRCSetupRequest message as per an aspect of an embodiment of the present disclosure.

FIG. 24 is an example diagram depicting the procedures of a base station as per an aspect of an embodiment of the present disclosure.

DETAILED DESCRIPTION

Figures 1A, 1B:
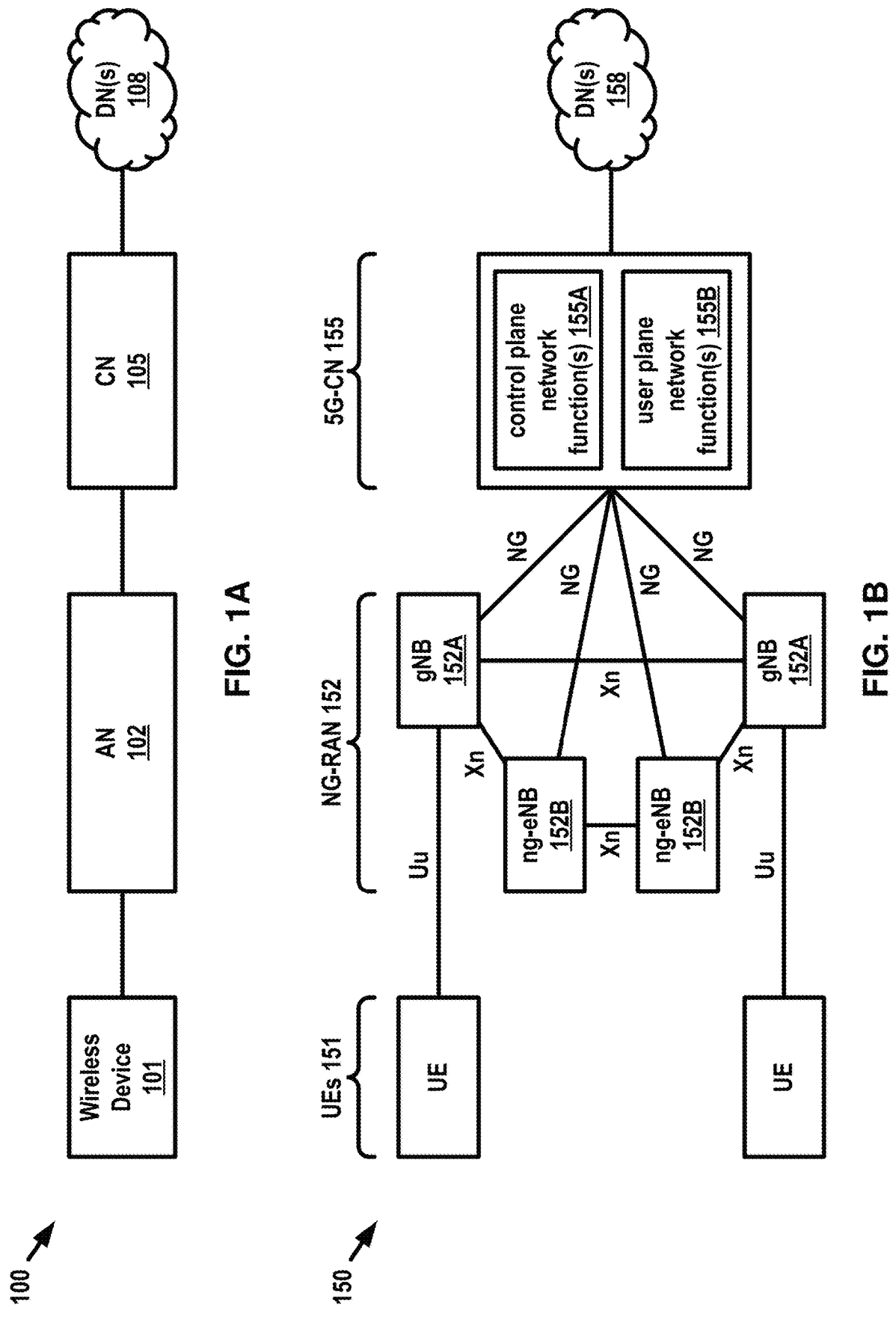
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNs (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interlace, for example, may be divided into an NG user plane interlace (NG-U) and an NG control plane interlace (NG-C). The NG-U interlace may provide delivery of user plane data between the base stations and the one or more user plane network functions 155B. The NG-C interlace may be used for control signaling between the base stations and the one or more control plane network functions 155A. The NG-C interface may provide, for example, NG interlace management, UE context management, UE mobility management, transport of NAS messages, paging, PDU session management, and configuration transfer and/or warning message transmission. In some cases, the NG-C interlace may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interlace. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interlace associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

Figures 2A, 2B:
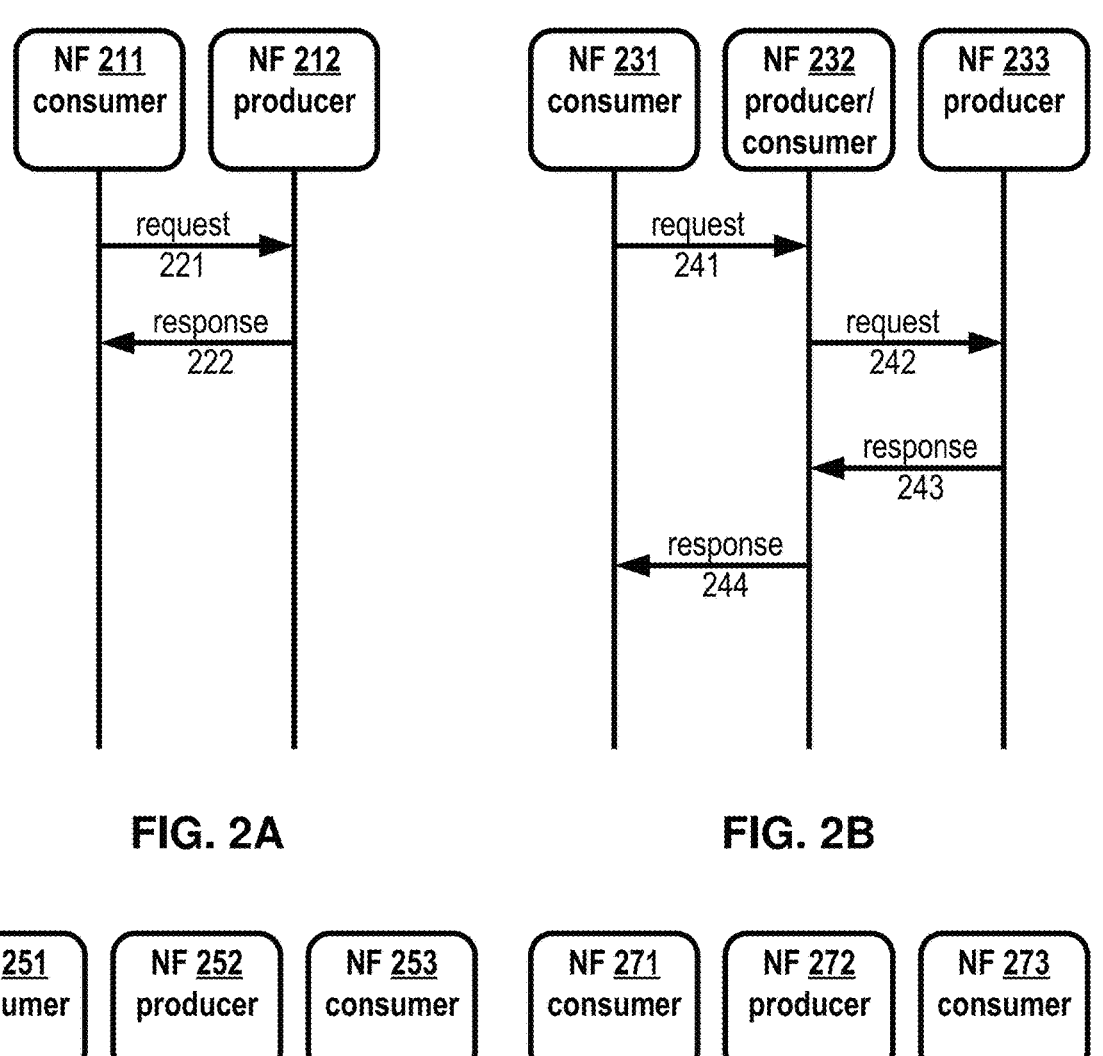
FIG. 2A, FIG. 2B, FIG. 2C, and FIG. 2D illustrate various examples of a framework for a service-based architecture within a core network.

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figures 2C, 2D:
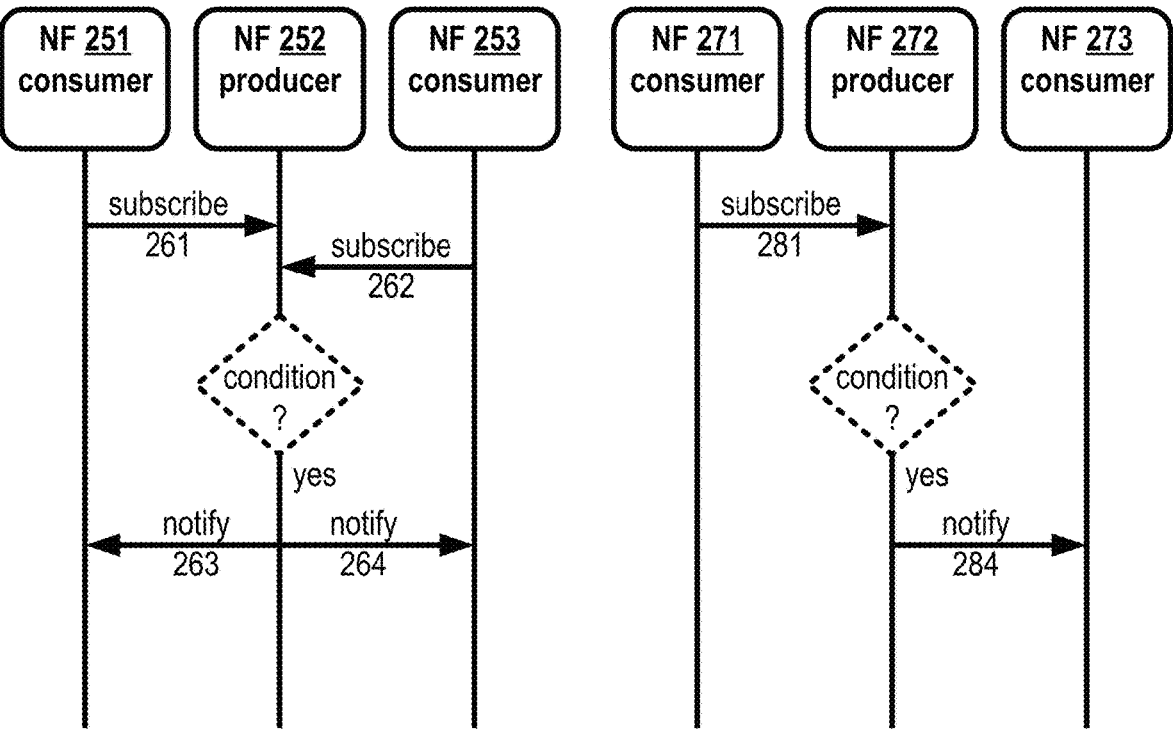

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
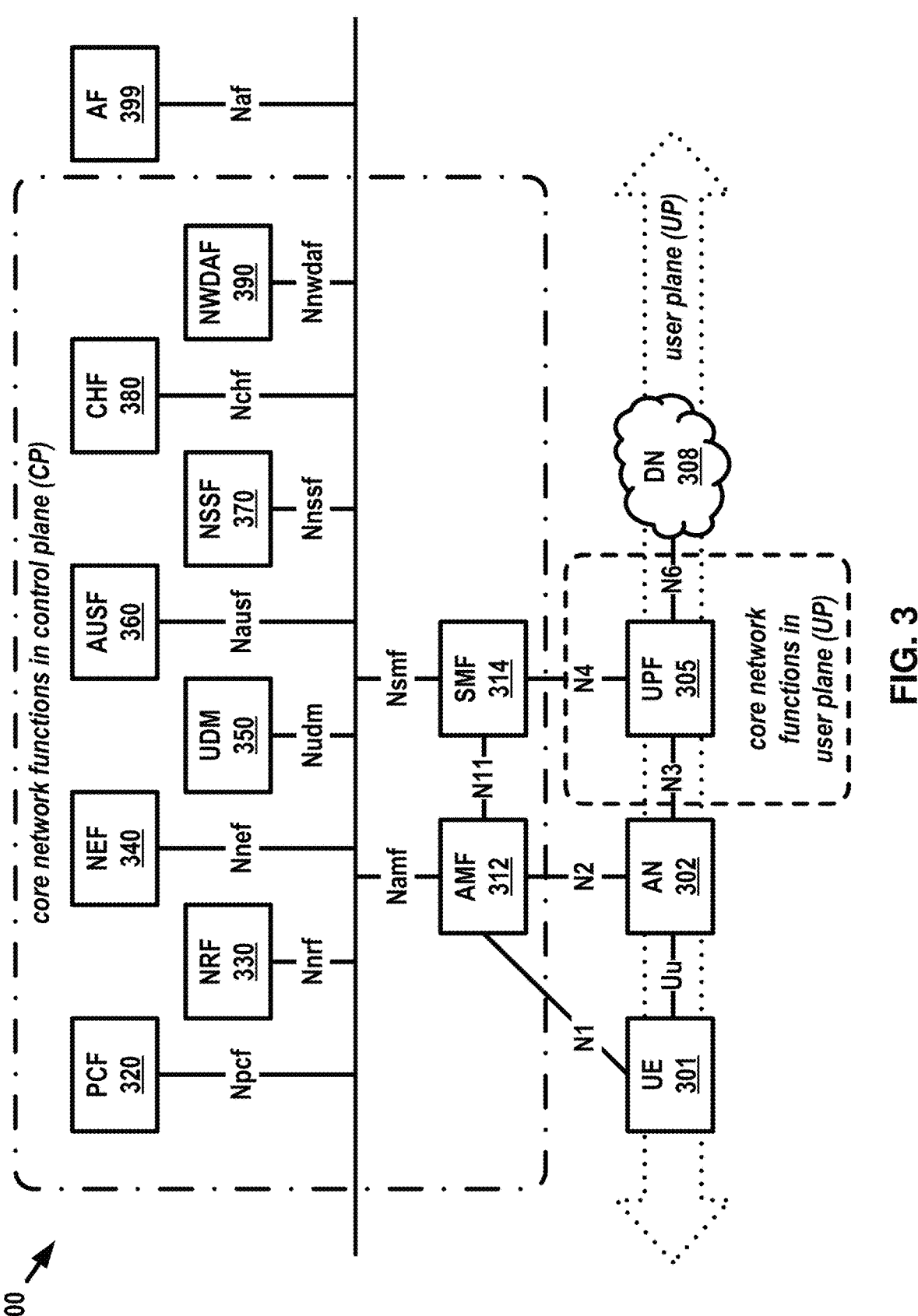
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interlace. The UPF 305 may handle any number of PDU sessions associated with any number of UEs (via any number of ANs). For purposes of handling the one or more PDU sessions, UPF 305 may be controlled by any number of SMFs via any number of corresponding N4 interlaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control network billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC 220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
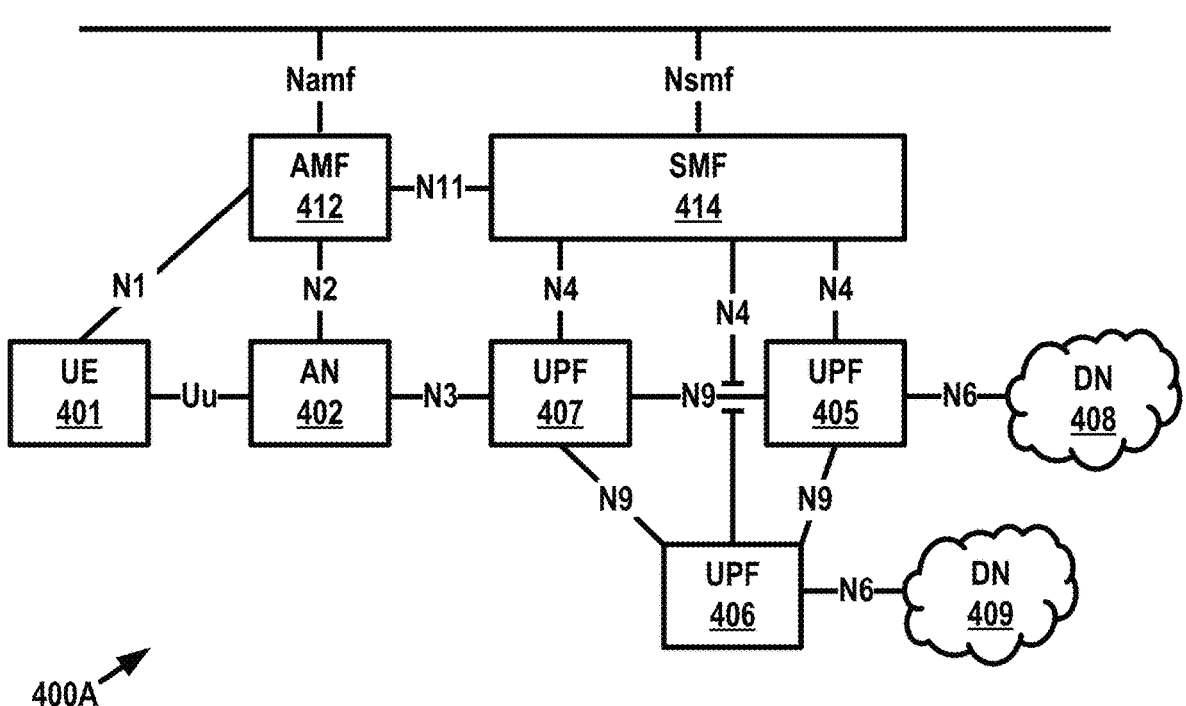
FIG. 4A and FIG. 4B illustrate example of core network architecture with multiple user plane functions and untrusted access.
Figure 4B:
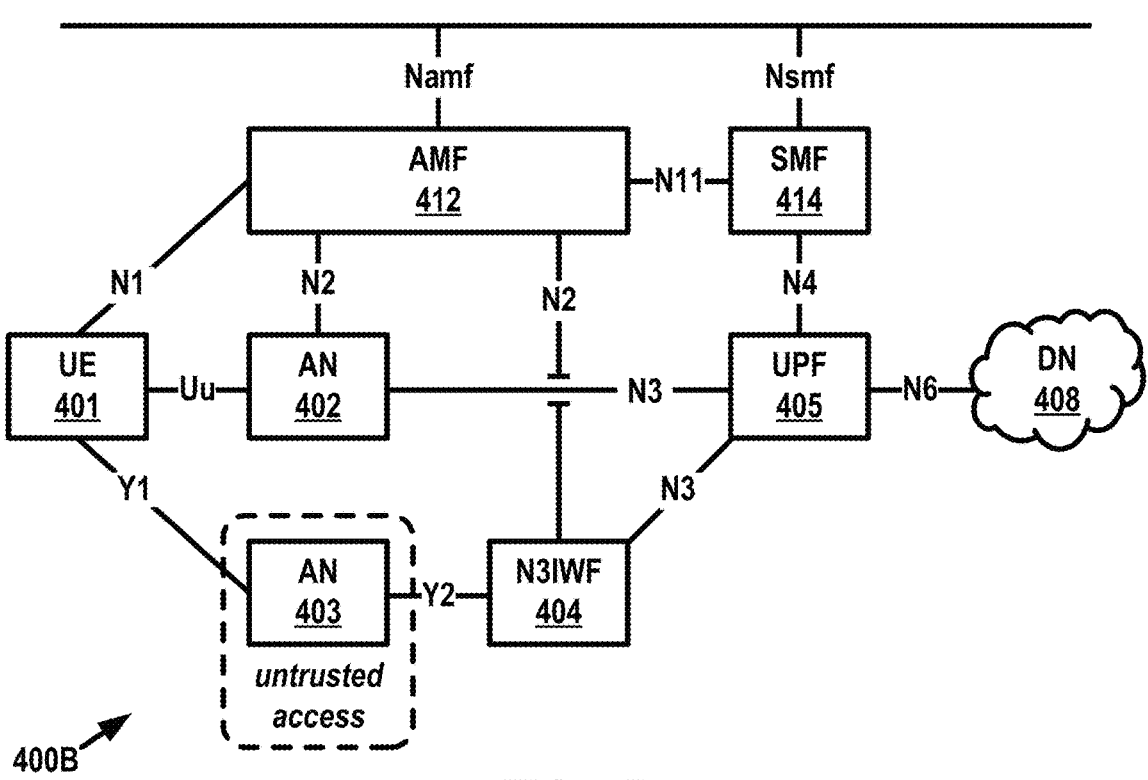
Figure 5:
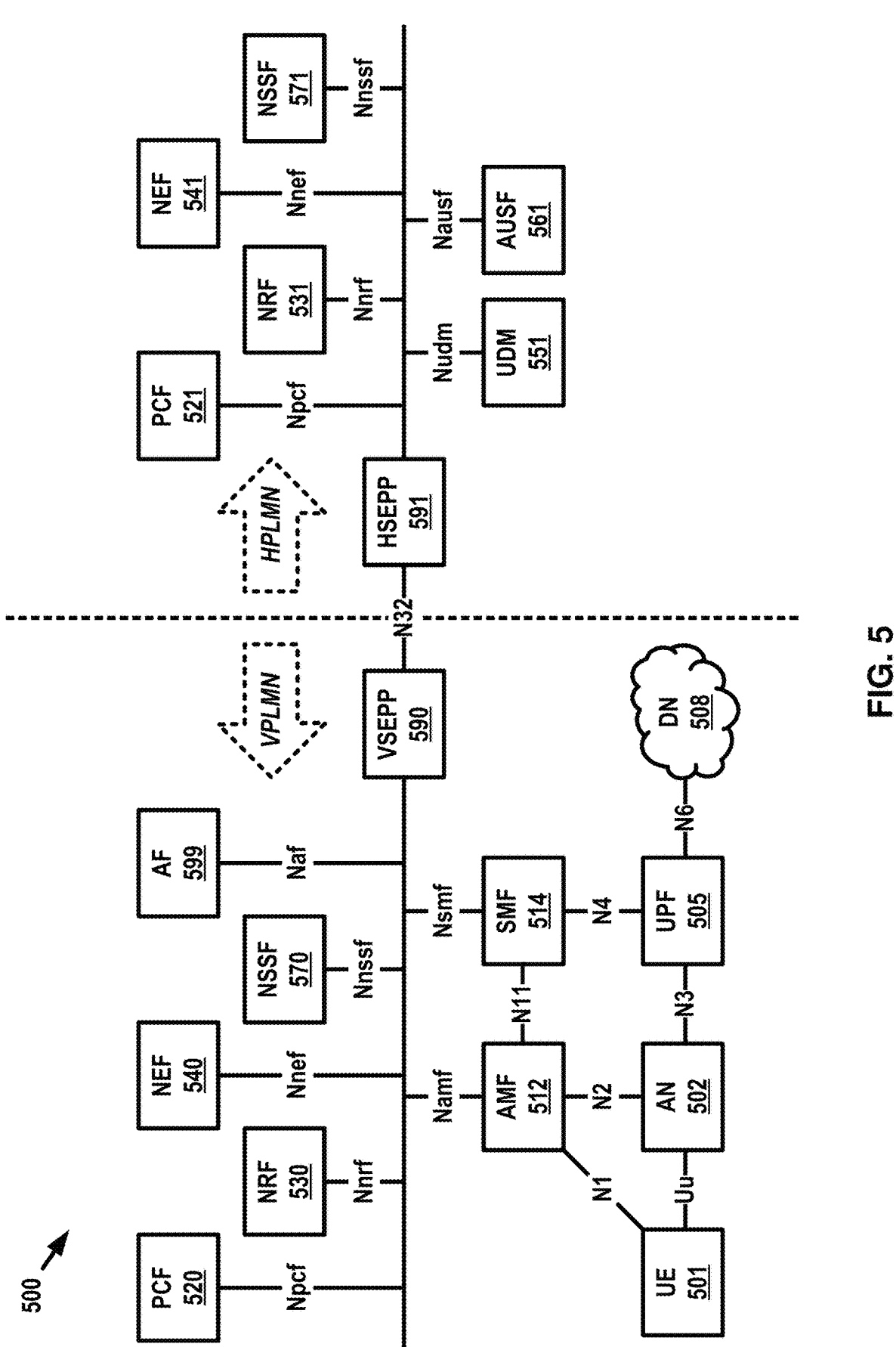
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNs (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interlace may run parallel to the N32 interlace, crossing the frontier between the VPLMN and the HPLMN to carry user plane data. One or more SMFs of the respective PLMNs may communicate via the N32 interlace to coordinate session management for UE 501. The SMFs may control their respective UPFs on either side of the frontier.

Figure 6:
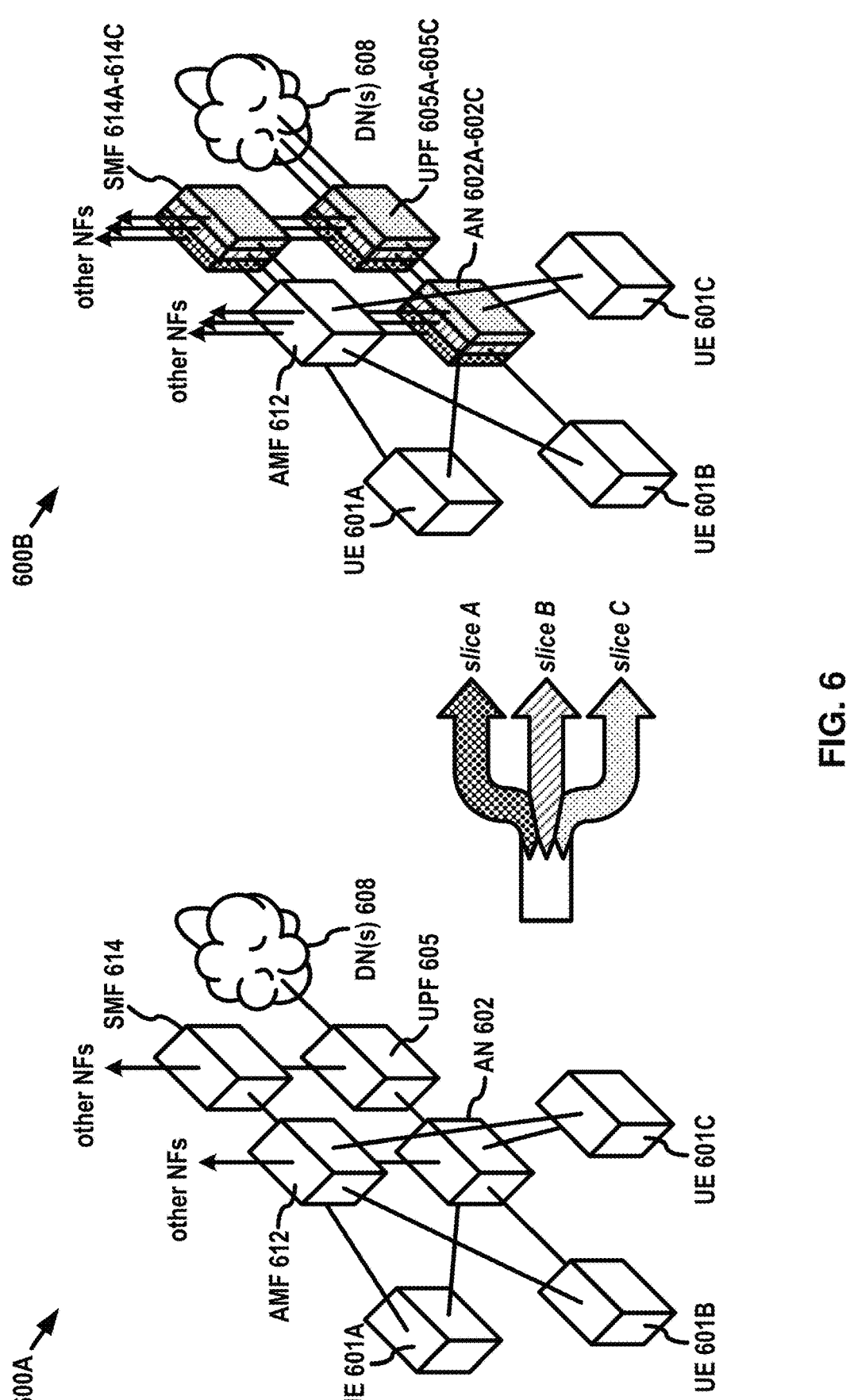
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multiantenna mapping.

Figure 8:
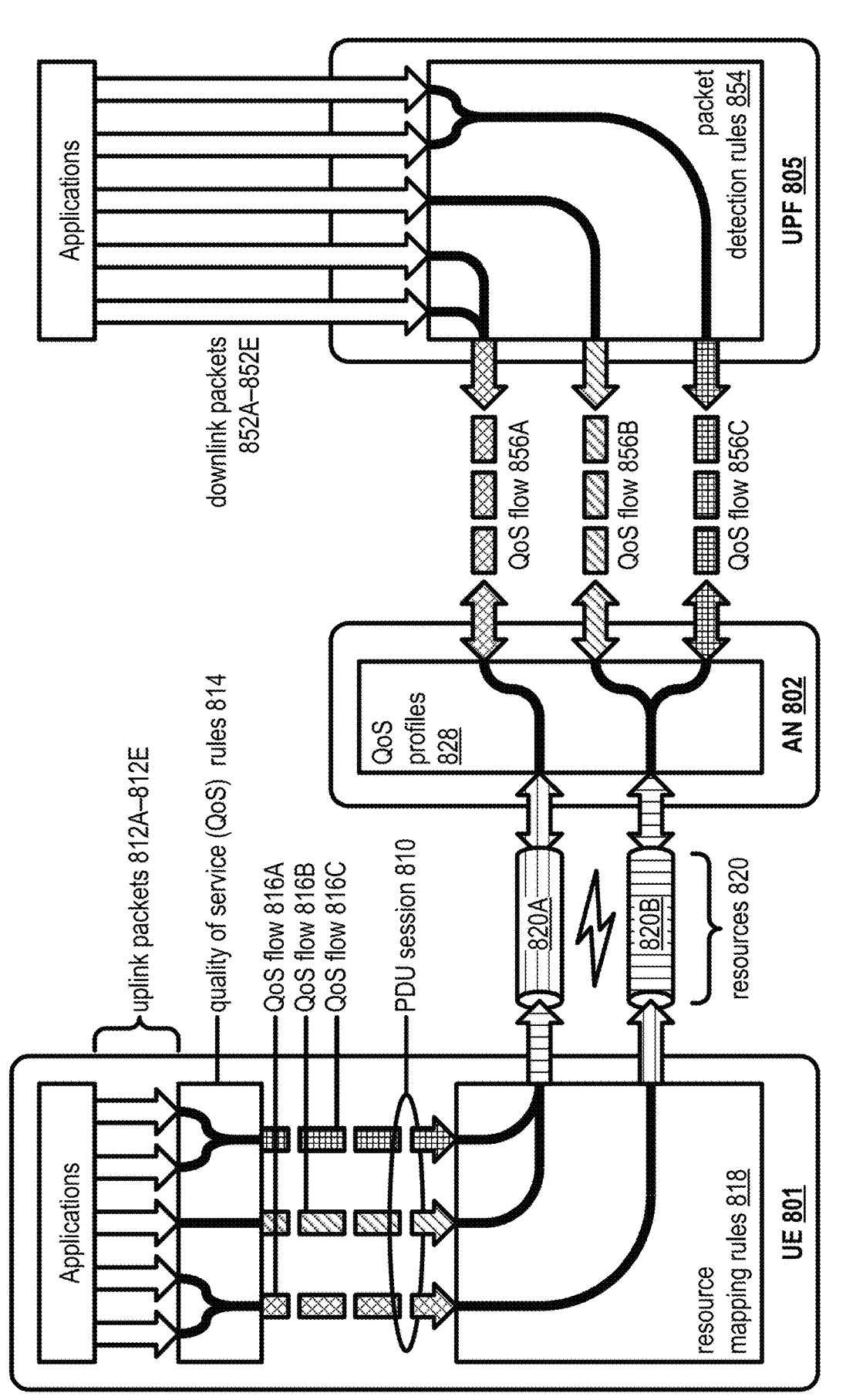
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), 51 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
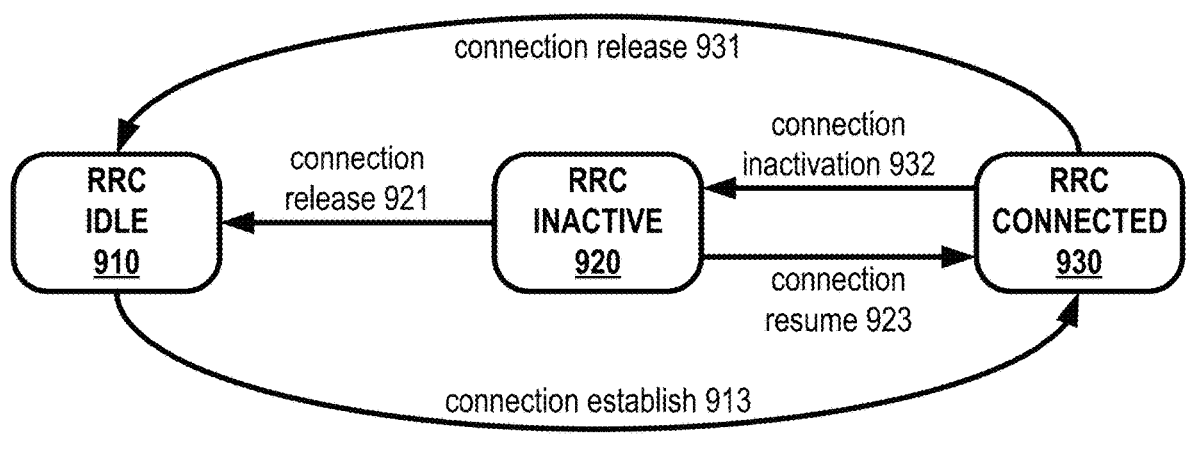
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
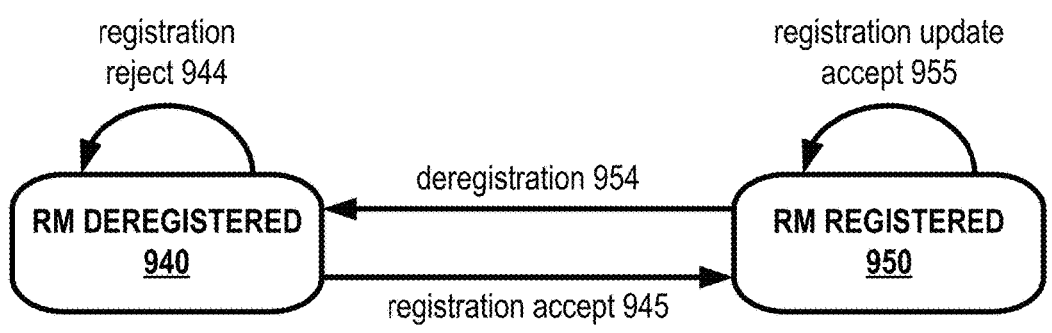

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
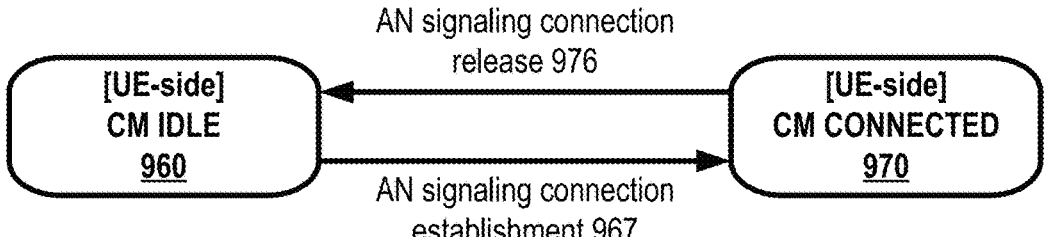

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE cannot communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
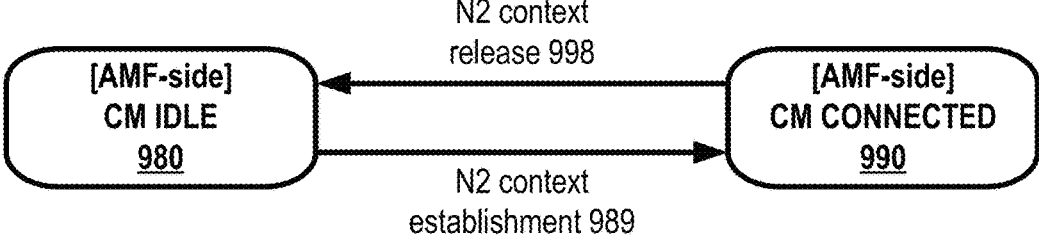

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
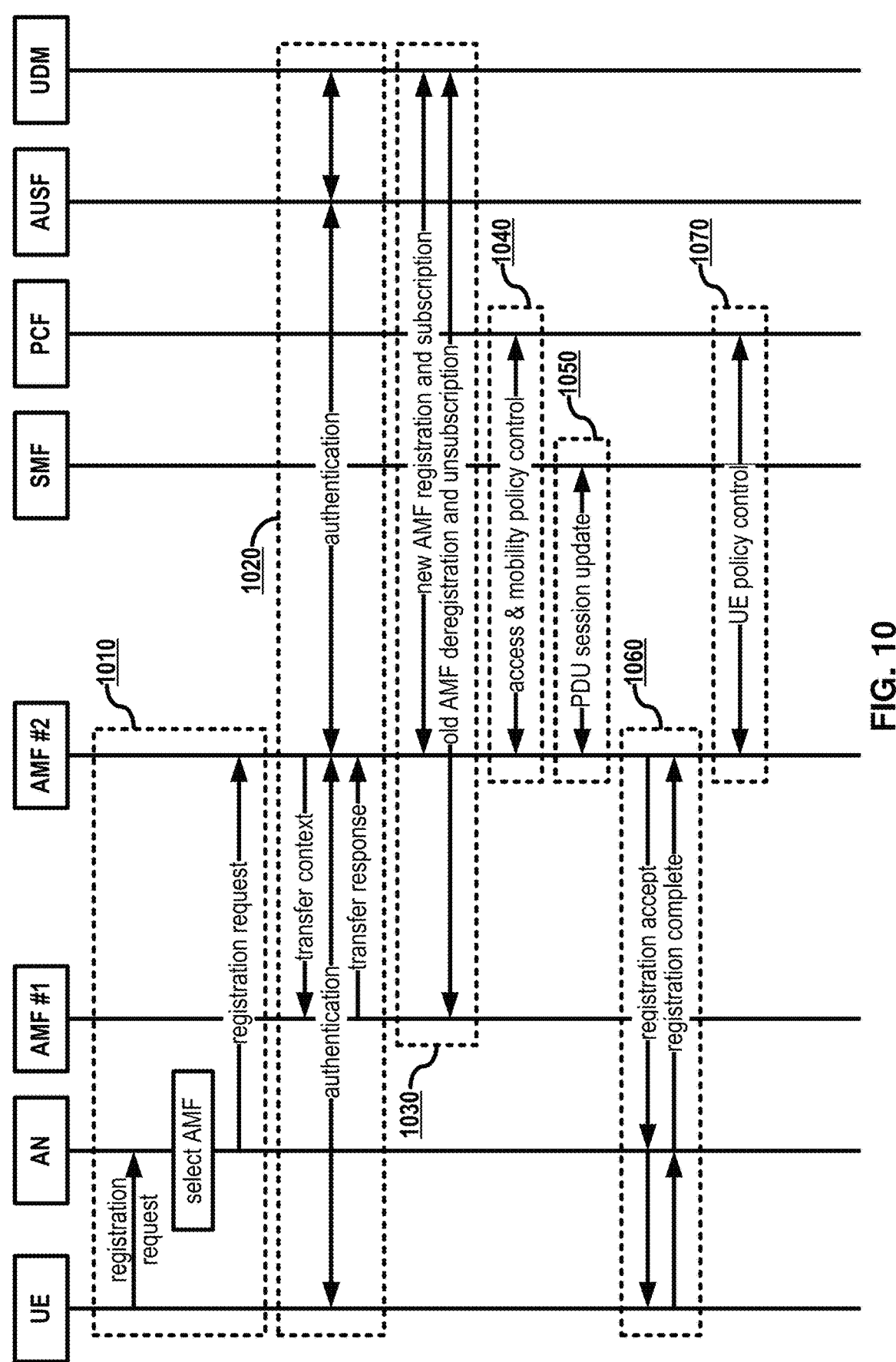
FIG. 10 illustrates an example of a registration procedure for a wireless device.
Figure 11:
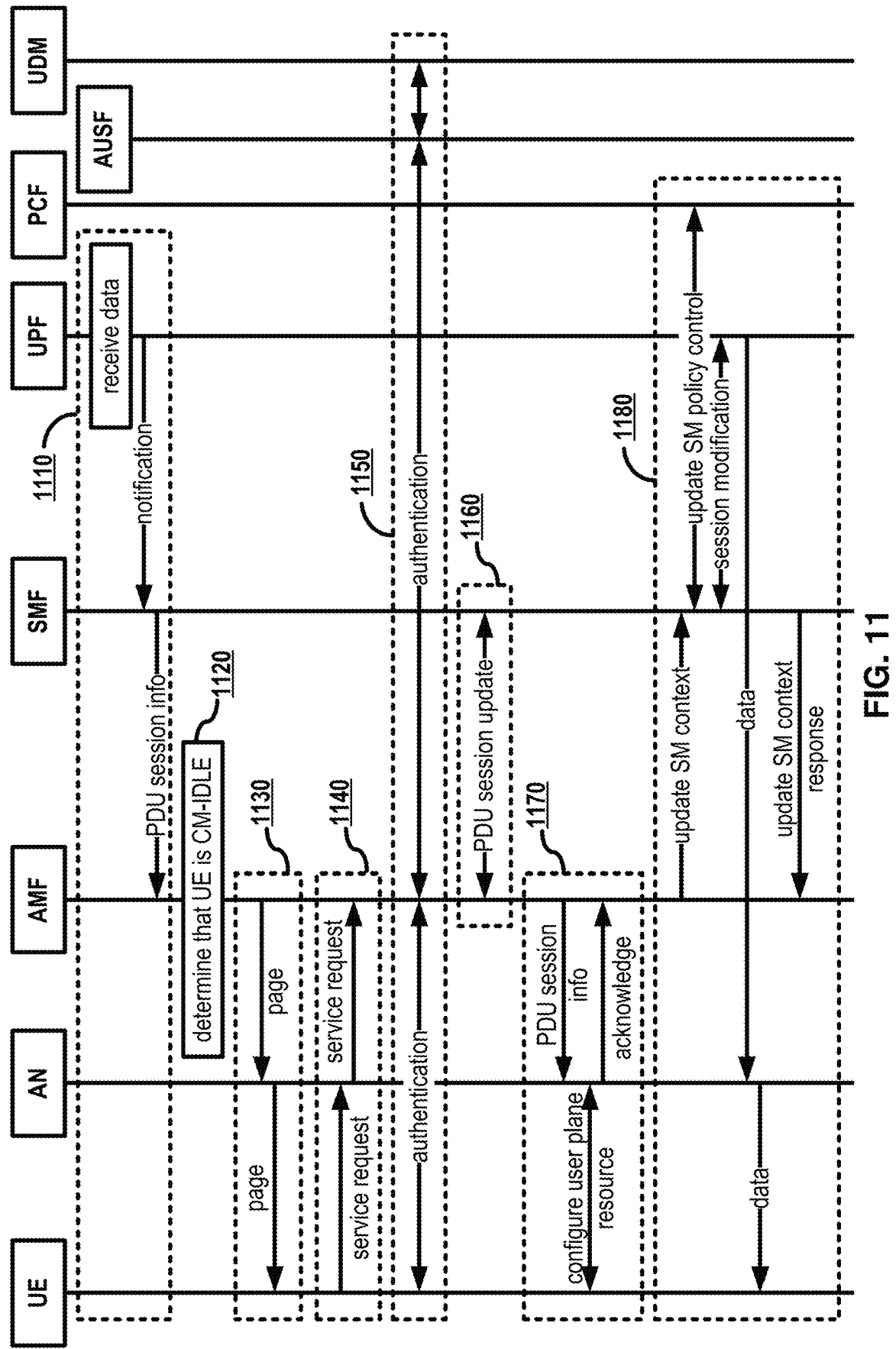
FIG. 11 illustrates an example of a service request procedure for a wireless device.
Figure 12:
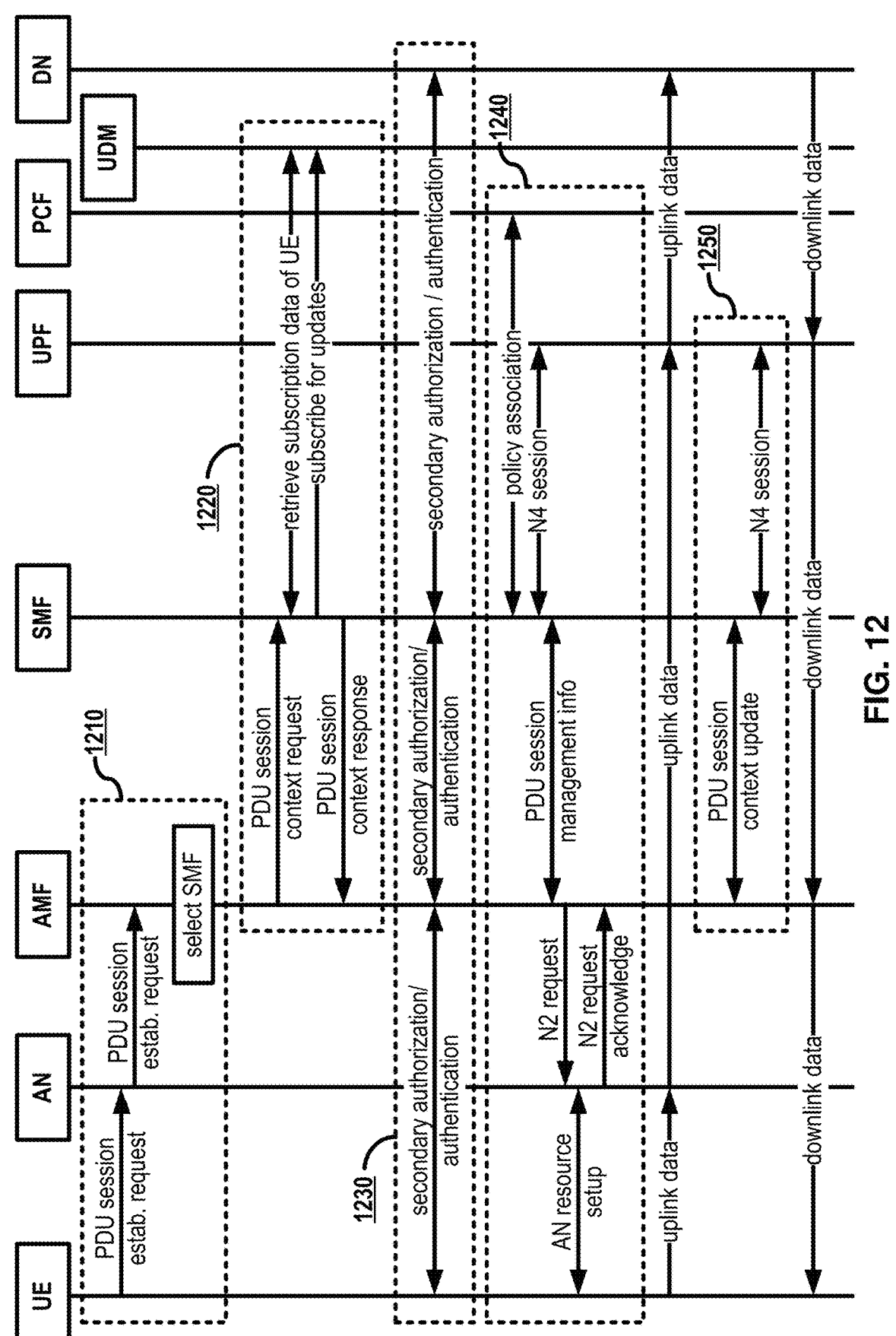
FIG. 12 illustrates an example of a protocol data unit (PDU) session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode;

and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_P-DUSession_CreateSMContext Response and/or a Nsmf_P-DUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4

Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a Namf_Communication_N1N2MessageTransfer message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_P-DUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
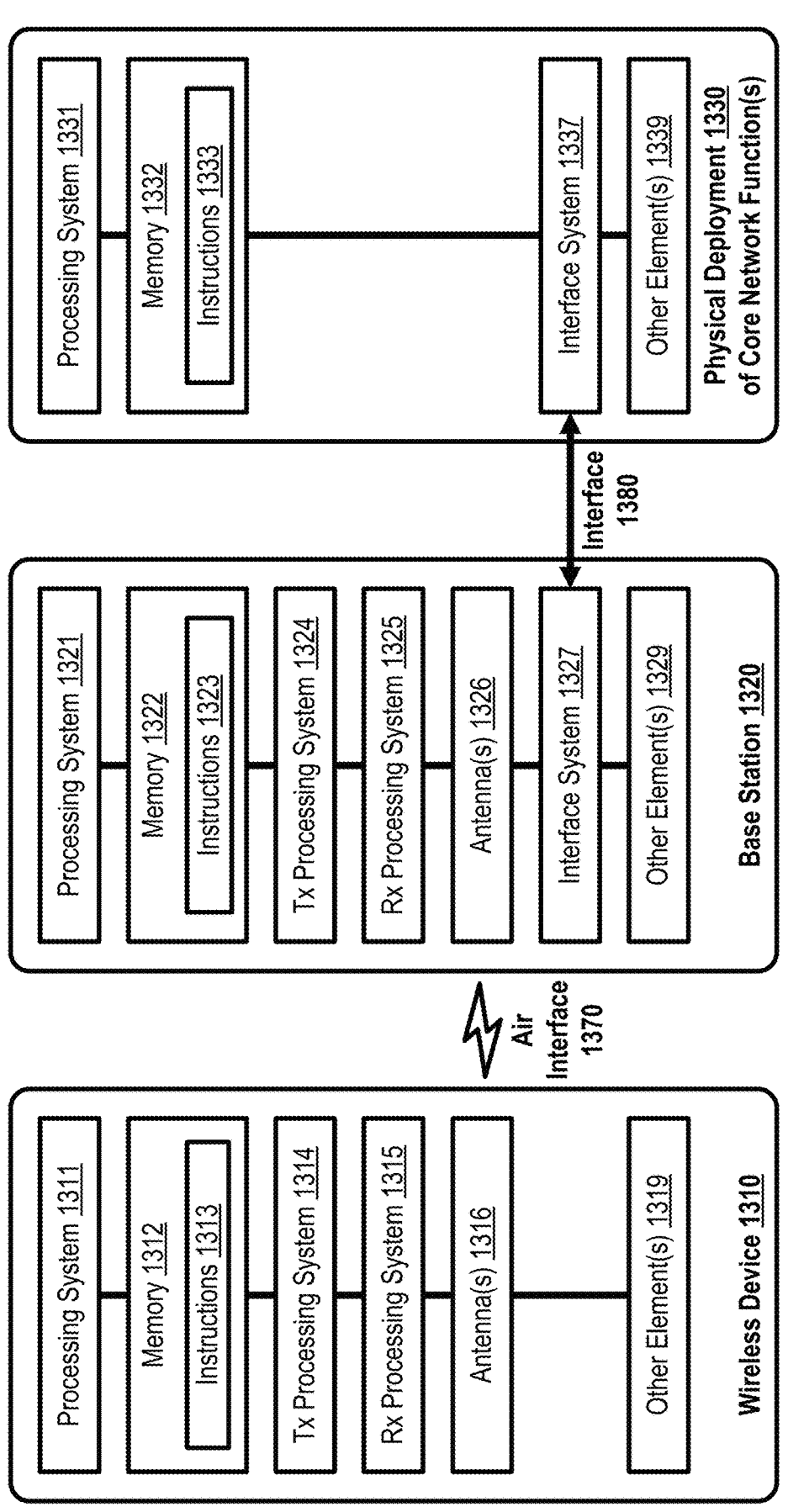
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interlace system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interlace to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

Figures 14A, 14B, 14C, 14D:
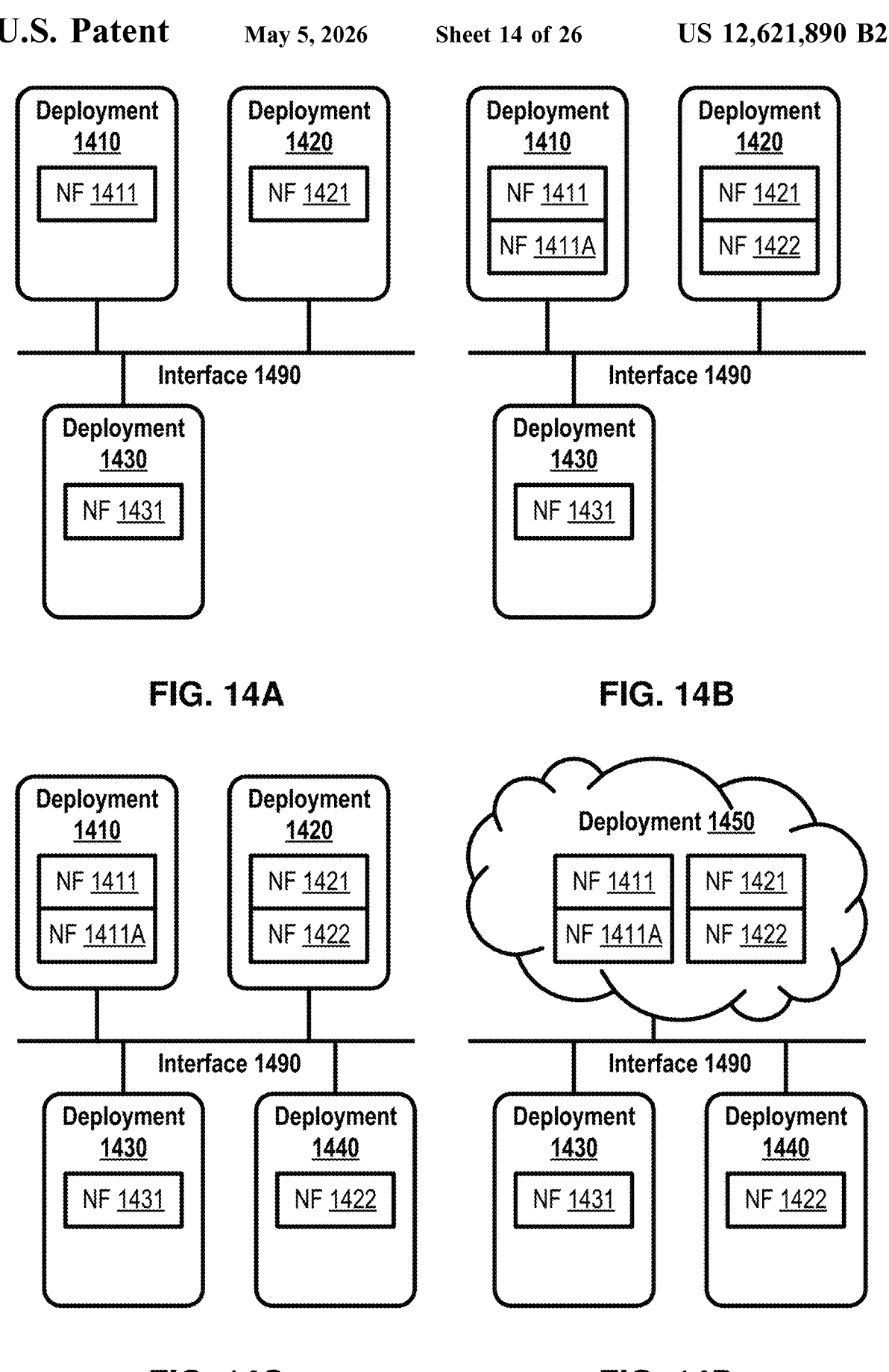
FIG. 14A, FIG. 14B, FIG. 14C, and FIG. 14D illustrate various examples of physical core network deployments, each having one or more network functions or portions thereof.

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

In an example, a time service my comprise a service that provides time information (e.g., absolute time information, relative time information) to a wireless device. The time service may be provided by and/or via a communication network. The time service may determine and/or obtain time information from one or more time sources. The time service may be, for example, a coordinated universal time (UTC) service.

In an example, traceability may comprise tracing, authentication, verification, confirmation, and/or proof. In an example, traceability of a time service (e.g., traceability to UTC) may comprise an indication that time information is accurate (e.g., accurate to a particular degree of accuracy), precise (e.g., to a particular degree of precision) provided by and/or determined based on one or more particular (e.g., identified) sources of time, authentic, and/or calibrated. In an example, traceability may be associated with particular time information and/or a particular time service. In an example, a wireless device may require and/or request that a network provide traceability associated with particular time information and/or a particular time service. In an example, a network that provides a time service may or may not provide traceability and/or specific aspects of traceability.

Figure 15:
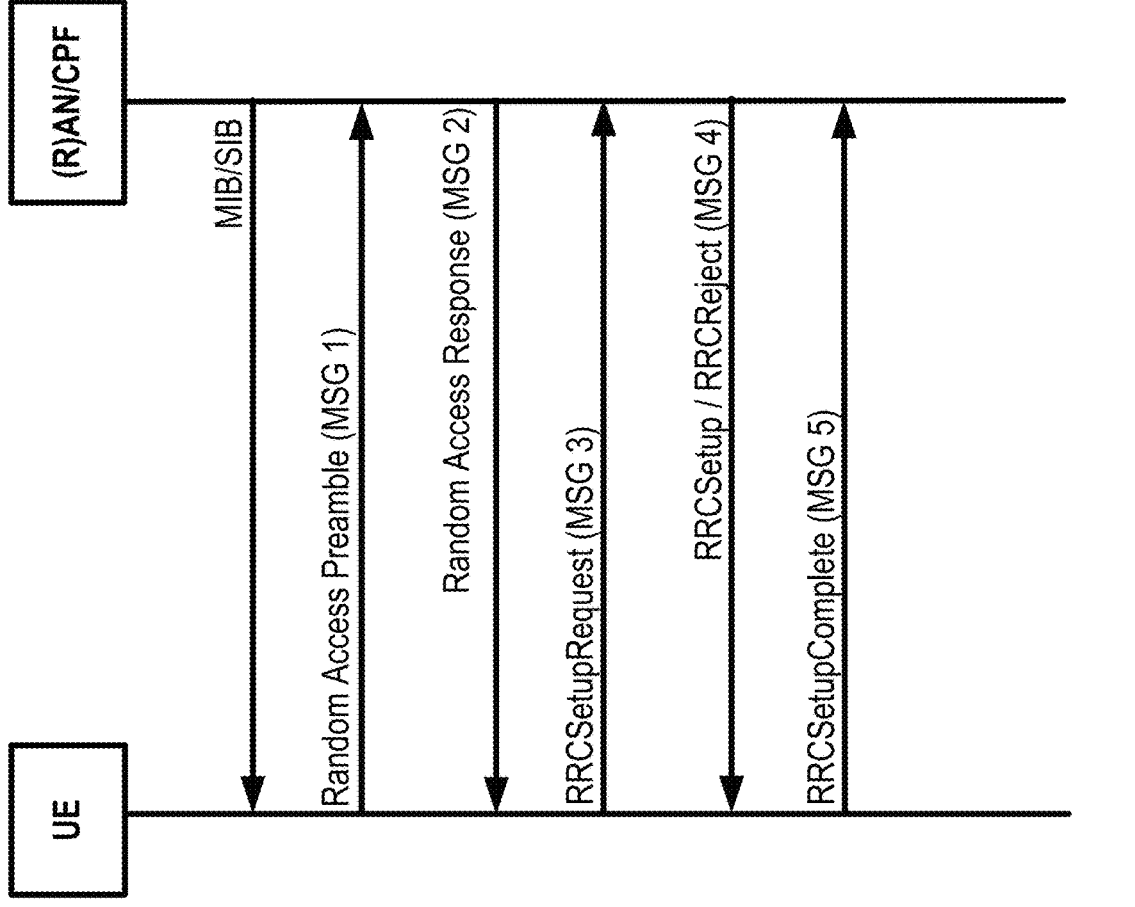
FIG. 15 illustrates an example of RRC connection establishment procedure for a wireless device.

FIG. 15 is an example call flow illustrates an example of RRC connection establishment procedure. In an example, a UE may receive a master information block (MIB) information (e.g., information element, parameter, message) and/or a system information block (SIB) 1 information (e.g., information element, parameter, message) from a base station (e.g., (R)AN). The MIB information may comprise system information. For example, the MIB information may comprise at least one of parameter: systemFrameNumber, subCarrierSpacingCommon, ssb-SubcarrierOffset, dmrs-TypeA-Position, pdcch-ConfigSIB1, cellBarred, intraFreqReselection, and/or the like. In an example, the SIB 1 information may comprise information relevant when evaluating if a UE is allowed to access a cell and defines the scheduling of other system information. In an example, the SIB 1 may comprise radio resource configuration information that is common for all UEs and barring information applied to the unified access control. In an example, the UE may receive SIB x information (e.g., information element, parameter, message) from the (R)AN and/or a control plane function (CPF) (e.g., an AMF). For example, the SIB x information may comprise SIB 2, SIB 3, SIB 4, and/or the like, other than SIB 1. In an example, the SIB 2 information may comprise cell re-selection information common for intra-frequency, inter-frequency and/or inter-RAT cell re-selection (e.g., applicable for more than one type of cell re-selection but not necessarily all) as well as intra-frequency cell re-selection information other than neighbouring cell related. For example, the SIB 2 message may comprise at least one parameter: cellReselectionInfoCommon, cellReselectionServingFreqInfo, intraFreqCellReselectionInfo, and/or the like. In an example, the SIB 3 information may comprise neighbouring cell related information relevant only for intra-frequency cell re-selection. The IE includes cells with specific re-selection parameters as well as blacklisted cells. For example, the SIB 3 information may comprise at least one parameter: intraFreqNeighCellList, and/or intraFreqBlackCellList.

In response to the message received from the (R)AN and/or the CPF, the UE may transmit at least one random access preamble to the (R)AN. In an example, the UE may transmit at least one random access preamble to the CPF (e.g., via the (R)AN). For example, the UE may send the at least one random access preamble to the (R)AN via a message 1 (MSG 1). In response to the at least one random access preamble received from the UE, the (R)AN may send a random access response message to the UE. In an example, the CPF may transmit a random access response message to the UE (e.g., via the (R)AN). For example, the CPF and/or the (R)AN may send the random access response message to the UE via a message 2 (MSG 2).

In an example, in response to the random access response message, the UE may send a message (e.g., RRC setup request) to the (R)AN and/or the CPF. For example, the UE may send the RRC setup request message via a message 3 (MSG 3). For example, the UE may send the RRC setup request message to the CPF via the (R)AN. For example, the RRCSetupRequest message may indicate establishing an RRC connection for the UE. The RRCSetupRequest message may comprise at least one of: a UE identity (e.g., TMSI), a parameter (e.g., establishmentCause) indicating a cause value of RRC establishment, and/or a dedicatedNAS-Message. For example, the establishmentCause may comprise at least one of value: emergency, highPriorityAccess, mt-Access, mo-Signalling, mo-Data, mo-VoiceCall, mo-VideoCall, mo-SMS, mps-PriorityAccess, mcs-PriorityAccess, and/or the like.

In response to the message received from the UE, the (R)AN and/or the CPF may send a RRC setup message to the UE via a message 4 (MSG 4). For example, the CPF may send the RRC setup message to the UE via the (R)AN. For example, the RRC setup message may be used to establish SRB 1. In an example, the RRCSetup message may comprise at least one information element: a masterCellGroup, a radioBearerConfig and/or dedicatedNAS-Message. The masterCellGroup may indicate that the network configures the RLC bearer for the SRB1. The radioBearerConfig may indicate that the SRB1 may be configured in RRC setup.

In an example, in response to the message received from the (R)AN and/or the CPF, the UE may send a RRCSetupComplete message to the (R)AN. For example, the UE may send a RRCSetupComplete message to the CPF via a message 5 (MSG 5). For example, the UE may send the RRCSetupComplete message to the CPF via the (R)AN. RRCSetupComplete message may comprise at least one parameter: a selectedPLMN-Identity, a registeredCPF, a guami-Type (e.g., native, mapped), s-NSSAI-List (e.g. list of network slice identifiers), dedicatedNAS-Message, a TMSI, and/or the like. The registeredCPF may comprise a PLMN identity and/or a CPF identifier. In an example, the RRCSetupComplete message may comprise a NAS message. For example, the dedicatedNAS-Message of the RRC-SetupComplete message may comprise the NAS message. For example, the dedicatedNAS-Message may comprise a registration request message.

Figure 16:
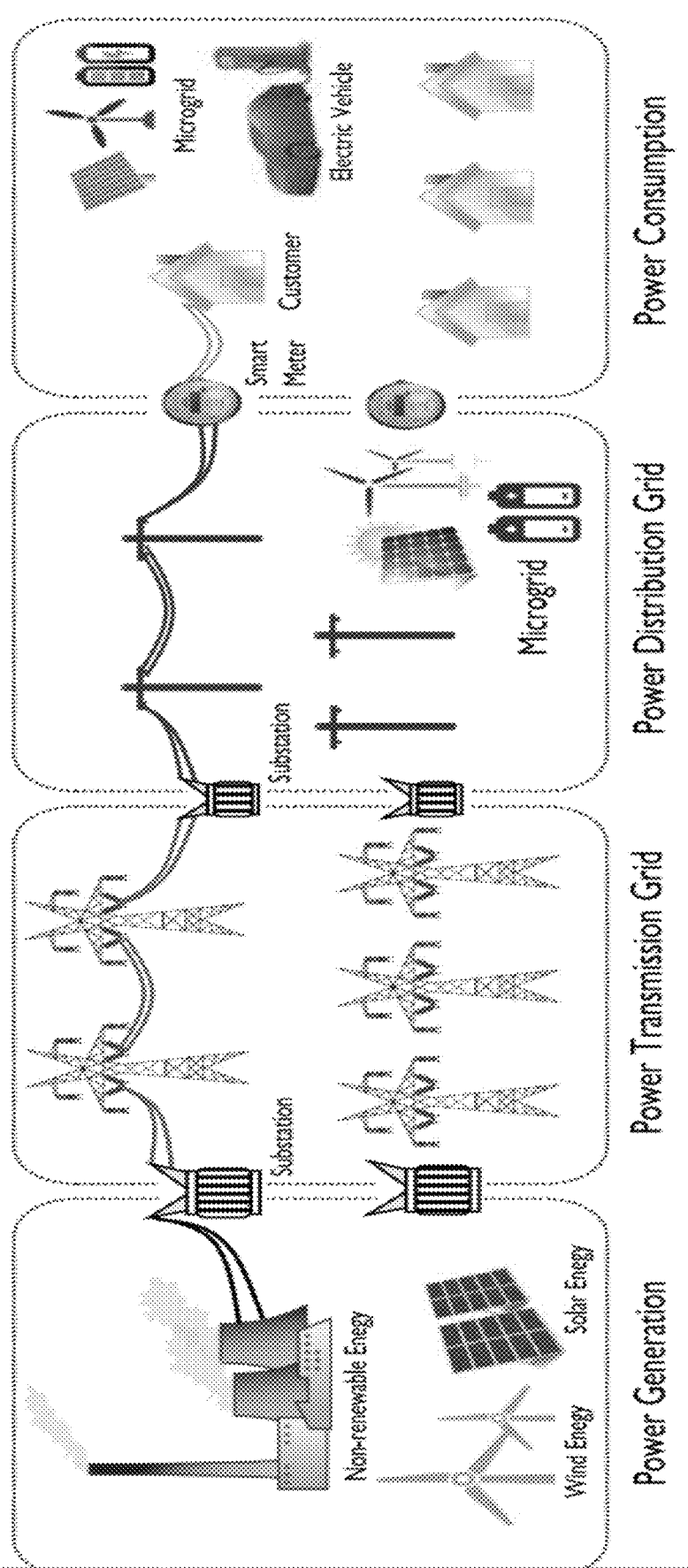
FIG. 16 illustrates an example of a power system/smart energy system.

FIG. 16 illustrates an example of a power system/smart energy system. In an example, the terminologies "power system", "power grid", "smart grid" and/or "smart energy system" may be used interchangeable. In an example, a power system/smart energy system may comprise power generation, power transmission, power distribution, and/or power consumption. In an example, the power generation may comprise generating/supplying (electric) power by means of solar, wind, fuel cell and/or gas combined in one or more power generating centers. For example, the power generation may comprise coal-fired power generation, gas-fired power generation, hydropower, solar energy, wind energy, and/or the like. In an example, the power transmission may comprise transmitting the power from a power generating center to one or more load center (e.g., power station, power substation). In an example, the power distribution may comprise distributing the power to nearby power users/consumers (e.g., homes, industries, electric vehicles). In an example, the power consumption may comprise consuming/using the power by the power users/consumers (e.g., homes, industries, electric vehicles).

Figure 17:
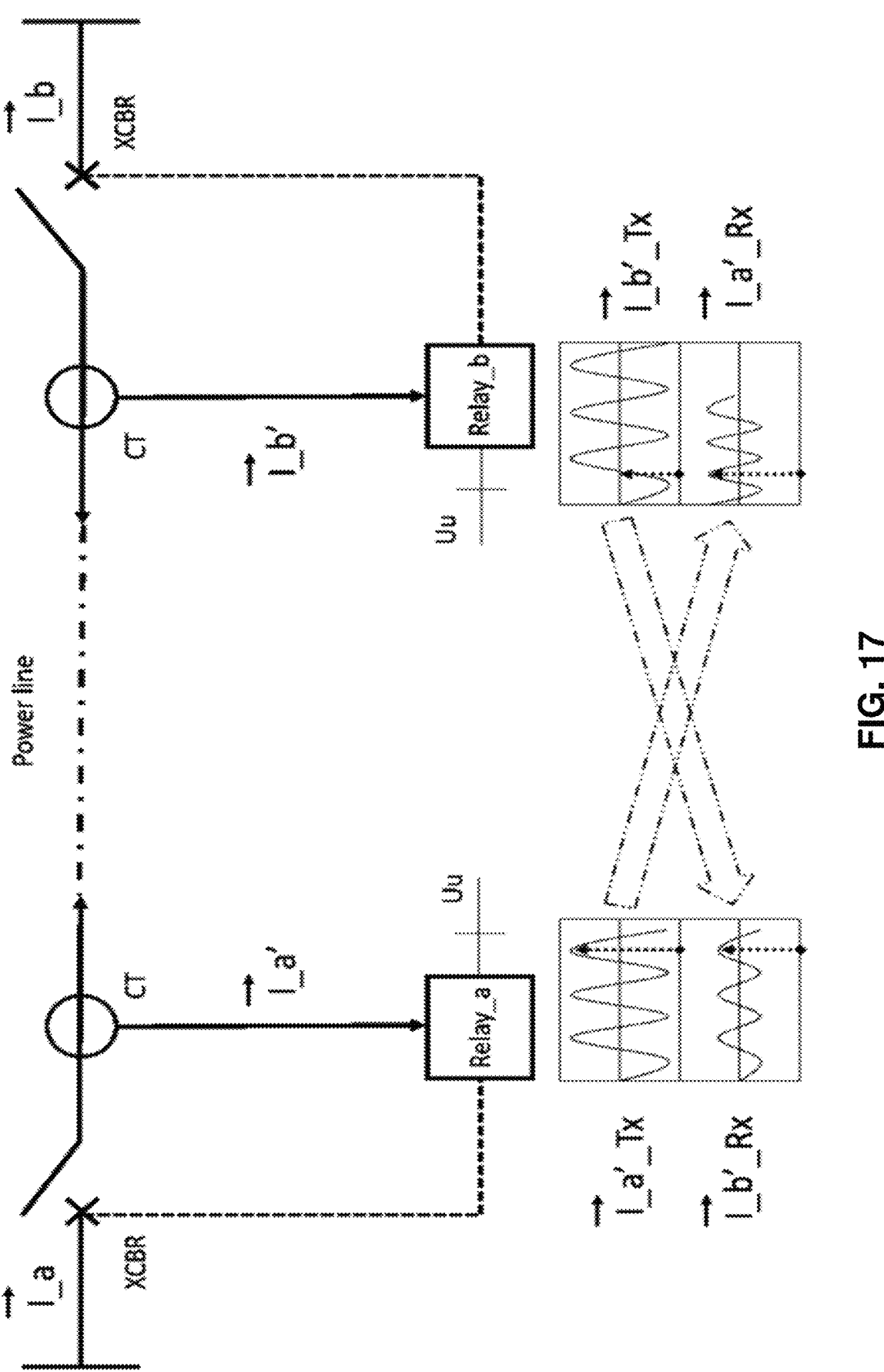
FIG. 17 illustrates an example of line current differential protection by two protection relays deployed in two substations.

FIG. 17 illustrates an example of line current differential protection by two protection relays deployed in two substations. In an example, the line current differential protection (defined as 87 L in IEEE C37.2-2008) has been widely used in electrical transmission systems to protect High-Voltage (HV) transmission lines. As a proven protection mechanism, it may be deployed for power distribution networks to protect (Medium-Voltage) MV distribution lines where applicable. The popularity of line current differential protection may come from the fast protection mechanism, reliability and the absolute selectivity of protected zones. Therefore, for Low-Voltage (LV) and MV power lines (both underground and overhead), current differential protection may be deployed easily with cellular technology without having to lay dedicated communication cables, either in refurbishment or new distribution substation construction projects.

In an example, the mechanism of line current differential protection may follow the Kirchhoff's current law, which is that the sum of currents at a junction of a circuit equals to zero. As illustrated in FIG. 17, two protection relays (e.g., Relay_a and Relay_b) deployed at two substations form the protection zone, within which the power line may be protected from incidents such as short circuit. Each protection relay continuously may measure its local current and may transmit it towards the other. Each protection relay may compare the locally measured current and the current received from the remote relay to calculate the differential current at a specific instant of time. FIG. 17 shows two communication channels (illustrated as dashed arrow boxes) between the two protection relays. Here the "communication channel" may refer to the channel used for transferring the phase segregated current value data between the two protection relays. The current phasors from the two protection relays, deployed geographically apart from each other, should be aligned in time for the current differential algorithm to execute correctly. For Relay_a, at a given moment the local current is I_a'_Tx, and the time-aligned remote current from Relay_b is I_b'_Rx. Using them as input, the protection algorithm in Relay_a may derive the differential current. The same mechanism may be applied in Relay_b. Whenever any incidents (e.g., short circuit) between Relay_a and Relay_b happened, the differential current may exceed the threshold values as determined by the relay restraint characteristics, the Relay_a and/or Relay_b may send a trip command to the circuit breaker (XCBR) to open the circuit, thus protecting the power line from being burnt down and any secondary damages (e.g., a fireball blaze on the power line may be caused by the incidents).

In an example, the protection function of the protection relays may depend on three things: (1) Sampling, buffering and transferring local current; (2) Receiving the sampled current values from the remote protection relay; (3) Time synchronization of the two protection relays—performing time-alignment of the locally buffered current samples with received remote samples.

In an example, in terms of sampling, a protection relay may need to sample the local current periodically, and transfers sampled data within a pre-defined time period T. In other words, the communication latency should not exceed T. Max of T may be between 5 ms and 10 ms (e.g., as specified in IEC 61850-90-1), which infers the latency requirement for this use case. Secondly, once the buffered samples pertinent to the same instant in time are available, the relay must align them in time. In an example, a relay may need to perform correct alignment of local and received data (e.g., current value). For example, Relay_a may have sampled a current value 1 at 3:00 PM, when receiving one or more current values from Relay_b, Relay_a may need to identify a current value 2 of one or more current values, where the current value 2 was sampled by Relay_b at 3:00 PM. As a relay needs to perform correct alignment of local and received data before calculating the differential current, the relay may need to know well enough when the remote relay transmits a specific data packet. Current clock synchronization is realized by relays attaching timestamps to measurement samples before transmission. A modern relay with an Ethernet interface normally needs to resort to IEEE 1588 Precision Time Protocol for synchronization, since the relay assumes the Ethernet network to be non-deterministic.

Regarding time alignment of local and received remote data, there may be two methods, a time-based alignment method, and/or a channel-based alignment method. In an example, when the time-based alignment method is used, a first relay (e.g., Relay_a) may send a first current value with a timestamp to a second relay (e.g., Relay_b), where the timestamp may indicate a sampling time of the first current value. Based on the timestamp, the second relay may identify a second current value sampled at the timestamp by the second relay. The second relay may compare the first current value and the second current value. If the differences between the first current value and the second current value exceeds a threshold value, the second relay may send a trip command to the circuit breaker (XCBR) to open the circuit. The first relay may take the similar actions as the second relay. In an example, the time-based alignment method may use external time source such as GNSS to get/derive the timestamp.

In an example, due to various reasons in some smaller substations a GNSS receiver is not available. Even for a substation installed with a GNSS receiver, relays may fall back to channel-based alignment for time synchronization if GNSS become unavailable. For this reason, it may be necessary to support the channel-based alignment method may be support. Different from GNSS-based alignment that is not adversely affected by communication channel asymmetry, the channel-based alignment may be critically dependent on channel symmetry—near equal latency in transmission and reception directions between two protection relays respectively. In an example, the latency may be a time (duration) it takes for sending a data from its original source (e.g., Relay_a) to its destination (e.g., Relay_b). In an example, the latency may indicate a time (duration) to (successfully) deliver a data packet/message from a first network element (e.g., UE 1) to a second network element (e.g., UE 2). In an example, the latency may be measured in microseconds, milliseconds, seconds, etc.

Currently in the Smart Grid automation market, the max communication channel asymmetry may be dependent on the chosen type of differential protection relay and may be vendor-specific. For instance, an old-fashioned TDM-based differential protection relay may be more sensitive to asymmetry than a modern type differential protection relay with an Ethernet interface. The latter may deal with asymmetry till 3 millisecond (ms), above which the relay will enter blocking mode. According to the IEEE C37.243 Guide, the asymmetry in terms of communication channel latency is around 2 ms. From here on, focus may be on how to satisfy channel-based alignment requirements using services from 5G system.

There may be two options to implement the channel-based alignment method. Option 1, the protection relays detect/measure the latencies of the relevant communication channel (e.g., the communication path between two relays). In an example, per existing protection relay algorithm implementation, channel-based alignment method may presume the delay in each communication direction (e.g., sending/uplink direction, receiving/downlink direction) to be (nearly) half of the Round-trip time (RTT). In an example, the RTT may be a duration/amount of time it takes for a signal to be sent plus the amount of time it takes for acknowledgement of that signal having been received. In an example, if 5G system provides the delay in each communication direction to be (nearly) half of the RTT, existing relay algorithm may be reused. According to IEEE C37.243 Guide, 2 ms may be required as the max communication channel latency asymmetry between the two protection relays. In an example, Relay_a may attach a timestamp to the transmitted measurement data, Relay_b may receive the timestamp from Relay_a and may re-attaches the same timestamp to the next out-going data packet towards Relay_a. By receiving the original timestamp in return packet, Relay_a may determine the RTT by subtracting the present local time with the returned original timestamp. Halving the RTT, Relay_a obtains the amount of time shift/alignment it shall apply to the current samples received from Relay_b. Therefore, it may be required that the communication channel from Relay_a to Relay_b incurs near-equal latency as the channel from Relay_b to Relay_a. Following this approach, excessive communication channel asymmetry between Relay_a and Relay_b may lead to misalignment of currents (such as the I_b'_Tx and I_a'_Rx at Relay_b in FIG. 17), manifesting in phase shift. This may result in increase or decrease of the apparent differential current, causing blocking of the protection or in the worst case a false trip and further negatively impact Smart Grid availability and reliability.

Option 2, the communication system (e.g., 5G) may provide the latencies of the relevant communication channel. In an example, alternatively, instead of requiring the communication channels (from Relay_a to Relay_b, and from Relay_b to Relay_a) to be highly symmetrical regarding latency, a different approach may be proposed as a new 5G service to improve protection relay design by the Smart Grid OEMs. To achieve the same goal as for Relay_a to know how much it needs to time shift the received current samples from Relay_b to align with its local current, it may be sufficient if the 5G system could provide such a protection relay with the latency of the relevant communication channel (latency from Relay_b to Relay_a for Relay_a, and latency from Relay_a to Relay_b for Relay_b) with good confidence/precision. This provided latency value may either be estimated or assigned by the 5G system. In this way, the channel latency information may be directly provided to relays by the 5G system, a protection relay may not need to carry out its own estimation. This may open new possibilities for the protection relay manufacturers to design new and possibly simpler time-alignment algorithms.

For time-based alignment method, the existing IEEE 1588 time master of the NG-RAN may be used. In this case, the complexity may be the use of the IEEE 1588 power/utility profile (a.k.a. IEC 61850-9-3) instead of using the telecom profile.

In an example, typically in a distribution grid, a MV power line transmits electricity between two substations. Two protection relays may be installed at both ends of the power line. Relay_a may continuously sample and measure the local current I_a' and sends it to Relay_b, so does Relay_b. In an example, Relay_a may sample local current values I_a' and store them locally. The Relay_a may send the local current values I_a' to Relay_b periodically. In an example, a first timestamp may be attached to the local current values I_a' to help Relay_b to match the data correctly. In an example, the Relay_b may sample local current values Lb', stores them locally and sends them to Relay_a periodically. In an example, a second timestamp may be attached to the sampled values to help Relay_a to match the data correctly. In an example, the Relay_a may receive samples from Relay_b within the latency required by IEC 61850-90-1. Depending on the applied voltage levels, the max allowed latency may be between 5 ms and 10 ms. The Relay_a may store the received samples in a local buffer. In an example, the Relay_b may receive samples from Relay_a within the latency required by IEC 61850-90-1. Depending on the applied voltage levels, the max allowed latency may be between 5 ms and 10 ms. The Relay_b may store the received samples in a local buffer. In an example, inside both the Relay_a and the Relay_b, a microprocessor may decide that all the relevant data for a same instant in time are collected. The Relay may then align these data and use the algorithm to calculate the differential current for this time instant. In an example, differential current calculated at both the Relay_a and the Relay_b may stay in the restraining region (below threshold). None of the relay trips. The system may continue to function in normal condition.

In an example incident, suddenly, a strong wind blows down a tree branch falling down the overhead distribution line close to the ground. The voltage of the power line may cause an electric discharge to the objects on the ground, and may cause spark leakage. This discharge may cause current from both substations to flow with increased magnitude into the power line. Since both relays are still measuring the current and sends the sampled values to each other, the differential current may exceed the threshold. Both relays may trigger a trip signal to the connected circuit breaker. The circuit breaker may open and stop current from flowing into the power line, to avoid more serious damage. The abnormal condition of the power line in the protected zone may be duly isolated from the electrical grid.

Figures 18A, 18B:
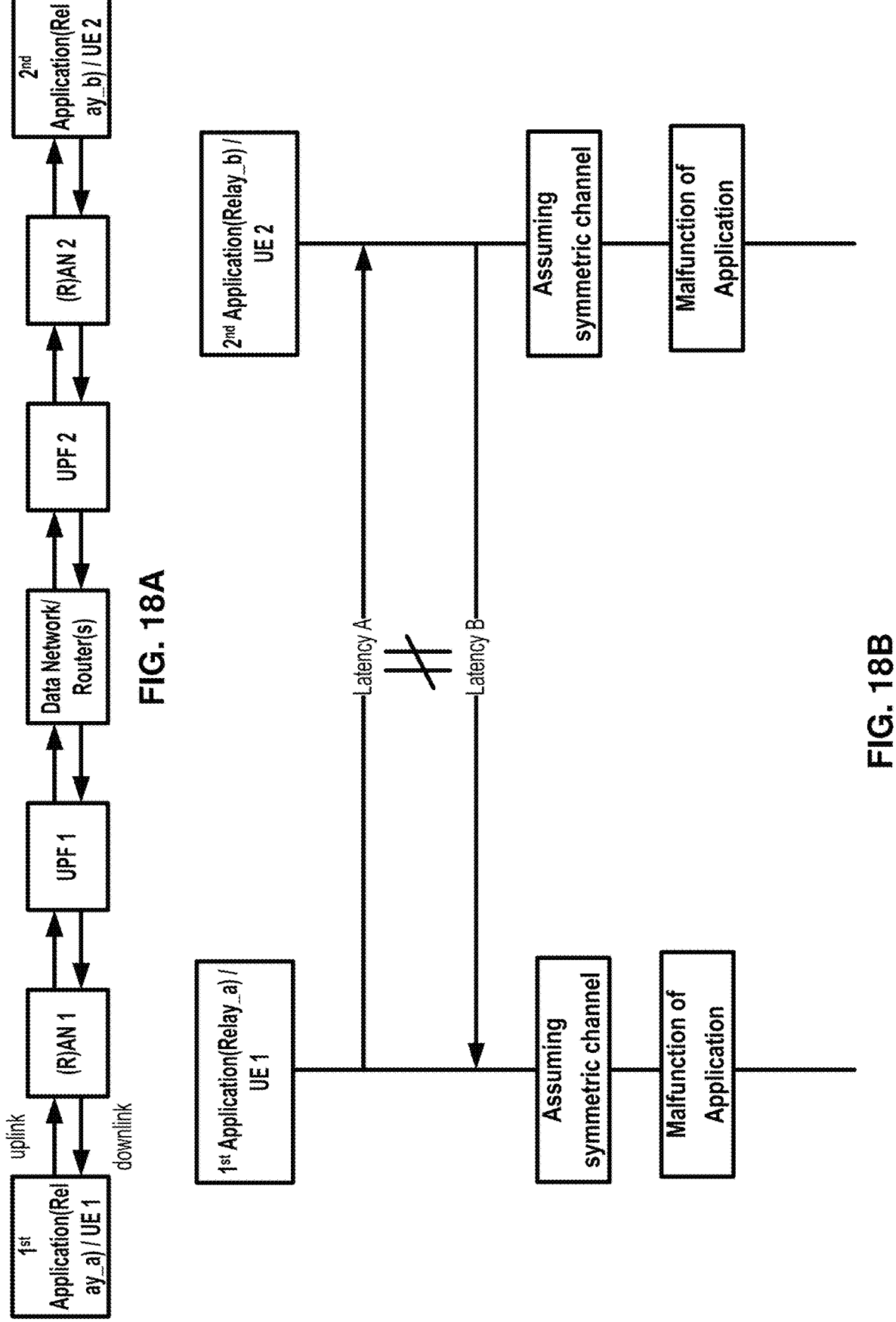
FIG. 18A and FIG. 18B are example diagrams illustrate problems of existing technologies.

FIG. 18A and FIG. 18B are example diagrams illustrate problems of existing technologies. In an example, as shown in FIG. 18A, a first application may be running in a first wireless device (illustrated as UE1), and a second application may be running in a second wireless device (illustrated as UE2). In an example, the first application and/or the second application may be associated with a game between the UE 1 and the UE2. In an example, the first application and/or the second application may be associated with a line current differential protection between a Relay_a and a Relay_b, wherein the Relay_a may comprise and/or be co-located with UE1, and a Relay_b may comprise and/or be co-located with UE2. There may be one or more network functions and/or nodes between UE1 and UE2. In an example, from the perspective of Relay_a/UE 1, an uplink communication channel/path may comprise a direction from the Relay_a/UE 1 to the Relay_b/UE 2, and may comprise one or more network functions/nodes: the Relay_a/UE 1, a (R)AN 1, a UPF 1, Data Network/Router(s), a UPF 2, a (R)AN 2, and/or the Relay_b/UE 2. From the perspective of Relay_a/UE 1, a downlink communication channel/path may comprise a direction from the Relay_b/UE 2 to the Relay_a/UE 1, and may comprise one or more network functions/nodes: the Relay_b/UE 2, the (R)AN 2, the UPF 2, the Data Network/Router(s), the UPF 1, the (R)AN 1, and/or the Relay_a/UE 1. In an example, from the perspective of Relay_b/UE 2, an uplink communication channel/path may comprise a direction from the Relay_b/UE 2 to the Relay_a/UE 1, and may comprise one or more network functions/nodes: Relay_b/UE 2, the (R)AN 2, the UPF 2, the Data Network/Router(s), the UPF 1, the (R)AN 1, and/or the Relay_a/UE 1. From the perspective of Relay_b/UE 2, a downlink communication channel/path may comprise a direction from the Relay_a/UE 1 to the Relay_b/UE 2, and may comprise one or more network functions/nodes: the Relay_a/UE 1, the (R)AN 1, the UPF 1, the Data Network/Router(s), the UPF 2, the (R)AN 2, and/or the Relay_b/UE 2.

In an example, the first application (e.g., Relay_a) and/or the second application (e.g., Relay_b) may need symmetric communication channel/path between the first application/UE 1 and the second application/UE 2. In an example, the symmetric communication channel/path may indicate that the unlink communication channel/path and the downlink communication channel/path are symmetric. In an example, the unlink communication channel/path and the downlink communication channel/path are symmetric may indicate that the end to end latency of the unlink communication channel/path (e.g., a latency from the Relay_a/UE 1 to the Relay_b/UE 2) is the same as the end to end latency of the downlink communication channel/path (e.g., a latency from the Relay_b/UE 2 to the Relay_a/UE 1). In an example, the unlink communication channel/path and the downlink communication channel/path are symmetric may indicate that the difference between [the end to end latency of the unlink communication channel/path] and [the end to end latency of the downlink communication channel/path] may be less than and/or equal to a value (e.g., 2 ms).

In existing technology, as shown in FIG. 18B, the first application/UE 1 and/or the second application/UE 2 may assume the communication channel between the first application/UE 1 and/or the second application/UE 2 is symmetric, e.g., latency A equals latency B in the FIG. 18B. However, network functions/nodes between the first application/UE 1 and/or the second application/UE 2 may have different schedules/procedures on uplink user data and downlink user data, which may cause different end to end latency on uplink communication channel and end to end latency on downlink communication channel. Consequently, the communication channel between the first application/UE 1 and the second application/UE 2 may be asymmetric. This may further cause malfunction of the first application and/or the second application. For example, this may result in errors on line current differential protection. For example, this may result in bad user experience on games.

The existing technology may have an issue on asymmetric (communication) channel. The existing technology may have an issue that a first wireless device and/or a second wireless device may assume that a communication channel between the first wireless device and the second wireless device is symmetric, which may cause malfunction of application(s) in the first wireless device and/or the second wireless device. The existing technology may have an issue to enable a network to get information of asymmetric (communication) channel. The existing technology may have an issue to enable a network to take actions to modify/change the asymmetric (communication) channel to symmetric communication channel.

Example embodiments of the present disclosure implement an enhanced mechanism to enable detecting an asymmetric communication channel/path between two network functions/nodes. Example embodiments of the present disclosure implement an enhanced mechanism to enable a wireless device to detect a communication channel/path is asymmetric between the two wireless devices. Example embodiments of the present disclosure implement an enhanced mechanism to enable a network to get information of asymmetric communication channel. Example embodiments of the present disclosure implement an enhanced mechanism to enable a network to take actions to modify/change the asymmetric communication channel to symmetric communication channel.

In an example embodiment of the present disclosure, a base station may receive a first message from a first wireless device. The first message may comprise a parameter indicating an asymmetric channel between the first wireless device and a second wireless device. In an example, based on the parameter, the base station may send a second message to the first wireless device. The second message may indicate modifying radio resource configuration of a bearer associated with the asymmetric channel. In an example, the terminology "asymmetric channel" can be used interchangeable with the terminology "asymmetric communication channel".

Figure 19:
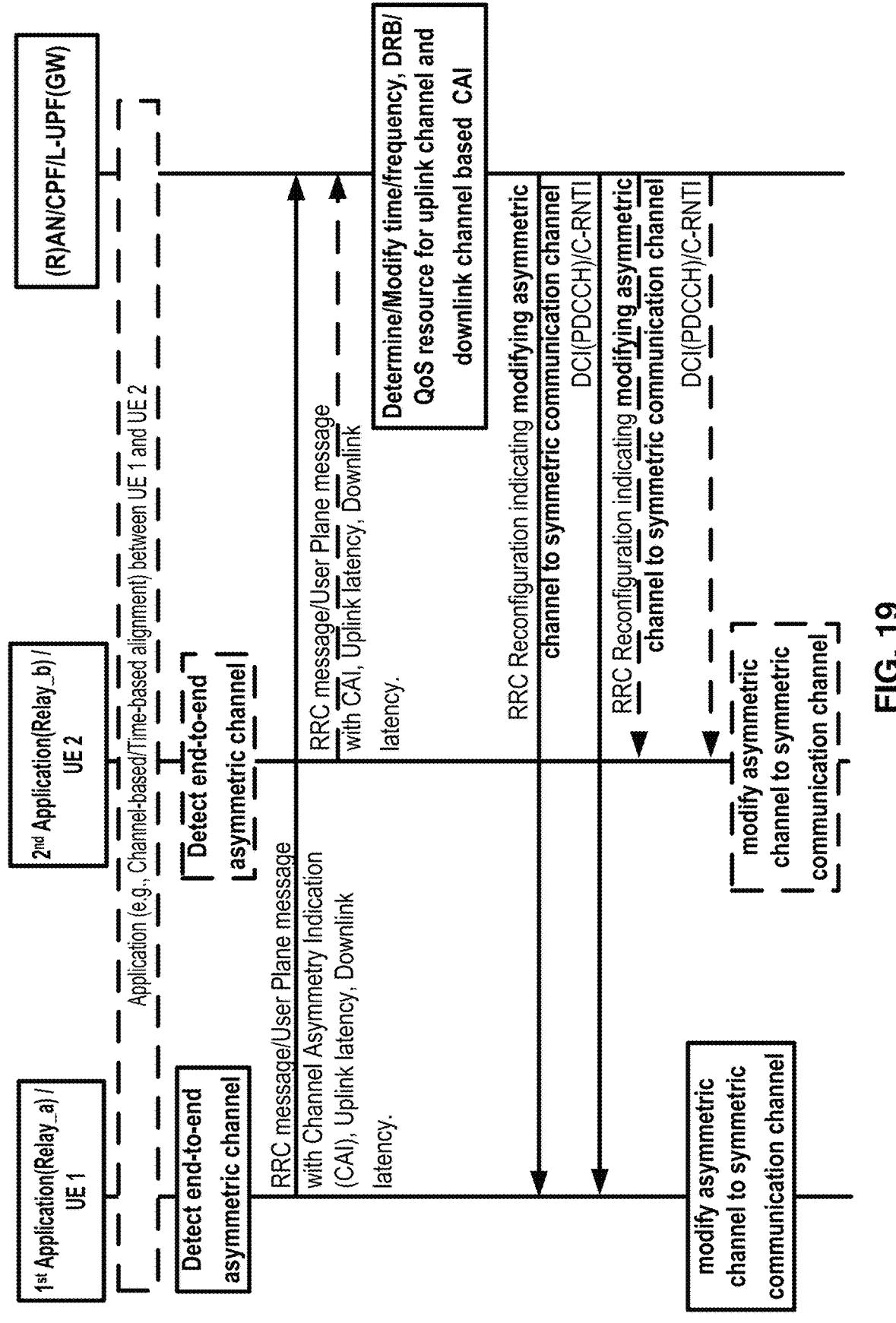
FIG. 19 is an example call flow as per an aspect of an embodiment of the present disclosure.

FIG. 19 is an example call flow which may comprise one or more actions. In an example, a first wireless device (e.g., UE 1) may establish a first PDU session with a first network. The first network may comprise a communication system (e.g., 5G, 6G). In an example, the first network may comprise at least one network function: a base station (e.g., (R)AN), an AMF, an SMF, a UPF, a PCF, and/or the like. In an example, a second wireless device may establish a second PDU session with the first network and/or a second network. The second network may comprise at least one network function: a base station (e.g., (R)AN), an AMF, an SMF, a UPF, a PCF, and/or the like. In an example, the first network and/or the second network may comprise at least one network function: a control plane function (CPF) (e.g., AMF, SMF), a local gate way (e.g., L-GW), and/or a local user plane function (L-UPF). In an example, a first application (e.g., line current differential protection, game) may run in the first wireless device, and a second application (e.g., line current differential protection, game) may run in the second wireless device. In an example, the first application may be associated with the second application. For example, the first application (e.g., line current differential protection) and the second application (e.g., line current differential protection) may be used together to protect a same power equipment/power line. For example, the first application (e.g., game) and the second application (e.g., game) may be used together for a same game and played by two users via the network. In an example, a time-based alignment method, and/or a channel-based alignment method may be used for the line current differential protection for the first wireless device and/or the second wireless device.

In an example, the first wireless device may communicate with the second wireless device over the first PDU session and/or the second PDU session. In an example, the first PDU session may be between the first wireless device and a core network function (e.g., AMF, SMF, UPF). In an example, the first PDU session may be between the first wireless device and a base station (e.g., (R)AN as shown in FIG. 19). In an example, the (R)AN may be co-located with a CPF, a L-GW, and/or a L-UPF. In an example, the second PDU session may be between the second wireless device and a second core network function (e.g., AMF, SMF, UPF). In an example, the second core network function may be the same core network function accessed by the first wireless device, or a different core network function. In an example, the second PDU session may be between the second wireless device and a second base station. In an example, the second base station may be the same (R)AN accessed by the first wireless device, or a different base station).

In an example, the first wireless device may send/receive user data packet of the first application via control plane signaling. In an example, the second wireless device may send/receive user data packet of the second application via control plane signaling. For example, the user data packet may be sent from the first wireless device to the AMF in a NAS message, rather than a user plane. In an example, the first wireless device may send user data packet to the second wireless device via the base station, the AMF/NEF, and/or the base station. In an example, the first wireless device may send user data packet to the second wireless device via the base station, a first AMF, an NEF, a second AMF, and/or a second base station. In an example, the communication channel/path between the first application/UE 1 and the second application/UE 2 may be symmetric.

In an example, the first wireless device and/or the second wireless device may detect that the communication channel/path between a first network function and a second network function is asymmetric. For example, the first wireless device and/or the second wireless device may detect that the communication channel/path between the first wireless device and the second wireless device is asymmetric. For example, the first wireless device may detect that the communication channel/path between the first wireless device and the base station may be asymmetric. In an example, the communication channel/path is asymmetric (or an asymmetric communication channel/path) may indicate that end to end latency of the unlink communication channel/path (e.g., a latency A from UE 1 to UE 2) does not equal to the end to end latency of the downlink communication channel/path (e.g., a latency B from UE 2 to UE 1). In an example, the unlink communication channel/path and the downlink communication channel/path are asymmetric may indicate that the difference between [the end to end latency of the unlink communication channel/path] and [the end to end latency of the downlink communication channel/path] may be greater than a value (e.g., 2 ms). In an example, the base station, the first wireless device and/or the second wireless device may detect/measure one way delay (OWD)/one way latency and/or asymmetric communication channel by using a method as described in FIG. 20 and/or FIG. 21. In an example, the one way delay (OWD)/one way latency may be a length of the time that a packet takes from point A (e.g., network element (NE) 1) to point B (e.g., NE 2) inside a network or across at least one network.

In an example, in response to detecting the asymmetric communication channel/path, the first wireless device may send a first message to the base station indicating an asymmetric channel between the first wireless device and a second wireless device. In an example, the first message may comprise a first parameter (e.g., Channel Asymmetry Indication (CAI)) indicating an asymmetric channel between the first wireless device and a second wireless device. For example, the first parameter/Channel Asymmetry Indication may indicate the communication channel/path between the first wireless device and the second wireless device is asymmetric. In an example, the first parameter/Channel Asymmetry Indication may indicate an asymmetric channel between the first wireless device and the base station. For example, the first parameter/Channel Asymmetry Indication may indicate the communication channel/path between the first wireless device and the base station is asymmetric.

In an example, the asymmetric channel may comprise an asymmetric uplink communication channel and an asymmetric downlink communication channel. In an example, the asymmetric uplink communication channel and the asymmetric downlink communication channel may indicate end to end latency of the uplink communication channel does not equal to end to end latency of the downlink communication channel. In an example, the asymmetric uplink communication channel and downlink communication channel may indicate a difference between [end to end latency of the uplink communication channel] and [end to end latency of the downlink communication channel] is less than a configured value, wherein the configured value may be 2 ms. In an example, the uplink communication channel may indicate a communication path from a first network element to a second network element, and the downlink communication channel indicates a communication path from the second network element to the first network element. In an example, the first network element may comprise at least one of: a first wireless device; a first base station; a first access and mobility management function (AMF); a first session management function (SMF); a first user plane function (UPF); a first network exposure function (NEF); and/or a first router. In an example, the second network element may comprise at least one of: a second wireless device; a second base station; a second AMF; a second SMF; a second UPF; a second NEF; and/or a second router. In an example, the communication path may comprise at least one of: at least one physical uplink control channel (PUCCH); at least one physical downlink control channel (PDCCH); at least one physical uplink shared channel (PUSCH); at least one physical downlink shared channel (PDSCH); at least one signaling radio bearer (SRB); at least one data radio bearer (DRB); at least one RRC connection; at least one service data flow; at least one QoS flow; and/or at least one protocol data unit (PDU) session. In an example, the communication path may indicate a path of communication over at least one of: an air interface; an ethernet cable; a fiber cable; and/or a communication network.

In an example, the first message may comprise a second parameter (e.g., Uplink Channel Latency) indicating an end to end latency of uplink communication channel of the asymmetric channel. In an example, the end to end latency of uplink communication channel may be a one way delay/latency from the first wireless device to the second wireless device. In an example, the end to end latency of uplink communication channel may be a one way delay/latency from the first wireless device to the base station. In an example, the second parameter/Uplink Channel Latency may comprise at least one of: a second; a decisecond; a centisecond; a millisecond; a microsecond; and/or the like.

In an example, the first message may comprise a third parameter (e.g., Downlink Channel Latency) indicating an end to end latency of downlink communication channel of the asymmetric channel. In an example, the end to end latency of downlink communication channel may be a one way delay/latency from the second wireless device to the first wireless device. In an example, the end to end latency of downlink communication channel may be a one way delay/latency from the base station to the first wireless device. In an example, the third parameter/Downlink Channel Latency may comprise at least one of: a second; a decisecond; a centisecond; a millisecond; a microsecond; and/or the like.

In an example, the first message may comprise a fourth parameter (e.g., a Channel Symmetry Request (CSR)) indicating a request for symmetric communication channels between the first wireless device and the second wireless device. In an example, the fourth parameter/Channel Symmetry Request may indicate a request for symmetric communication channels between the first wireless device and the base station. In an example, the first parameter/Channel Asymmetry Indication may indicate a request for symmetric communication channels between the first wireless device and the second wireless device. In an example, the first parameter/Channel Asymmetry Indication may indicate a request for symmetric communication channels between the first wireless device and the base station. In an example, the first parameter/Channel Asymmetry Indication may indicate a request to modify/change the asymmetric communication channels to symmetric communication channels between the first wireless device and the second wireless device. In an example, the first parameter/Channel Asymmetry Indication may indicate a request to modify/change the asymmetric communication channels to symmetric communication channels between the first wireless device and the base station.

In an example, the symmetric communication channels may be applied/used for a first service and/or the first application of the first wireless device. In an example, the symmetric communication channels may be applied/used for a second service and/or the second application of the second wireless device. In an example, the first service and/or the second service may comprise a video service, a URLLC service (e.g., as described in FIG. 6), an eMBB service (e.g., as described in FIG. 6), an mMTC service (e.g., as described in FIG. 6), a Massive Internet of things (MIoT) service, a High-Performance Machine-Type Communications (HMTC) service, and/or the like. In an example, the MIoT may indicate one or more physical objects that are embedded with sensors, processing ability, software, and other technologies that connect and exchange data with other devices and systems over the Internet or other communications networks. In an example, the HMTC service may indicate a type of low power wide area network (LPWAN) radio technology to enable a wide range of cellular devices, sensors, and services (e.g., for M2M and/or IoT applications).

In an example, the symmetric communication channels may comprise at least one symmetric uplink communication channel and/or at least one downlink communication channel. In an example, the at least one symmetric uplink communication channel and/or the at least one downlink communication channel may indicate end to end latency of the at least one uplink communication channel equals to end to end latency of the at least one downlink communication channel. In an example, the at least one symmetric uplink communication channel and/or the at least one downlink communication channel may indicate that a difference between [end to end latency of the at least one uplink communication channel] and [end to end latency of the at least one downlink communication channel] is less than and/or equal a configured (e.g., threshold) value (e.g., 2 ms).

In an example, the at least one uplink communication channel may indicate a communication path from a first network element to a second network element. In an example, the at least one downlink communication channel may indicate a communication path from the second network element to the first network element. In an example, the first network element may comprise at least one of: a first wireless device; a first base station; a first access and mobility management function (AMF); a first session management function (SMF); a first user plane function (UPF); a first network exposure function (NEF); a first router; and/or the like. In an example, the second network element may comprise at least one of: a second wireless device; a second base station; a second AMF; a second SMF; a second UPF; a second NEF; a second router; and/or the like. In an example, the communication path may comprise at least one of: at least one physical uplink control channel (PUCCH); at least one physical downlink control channel (PDCCH); at least one physical uplink shared channel (PUSCH); at least one physical downlink shared channel (PDSCH); at least one signaling radio bearer (SRB); at least one data radio bearer (DRB); at least one RRC connection; at least one service data flow; at least one QoS flow; at least one protocol data unit (PDU) session; and/or the like. In an example, the communication path may indicate a path of communication over at least one of: an air interface; an ethernet cable; a fiber cable; a communication network; and/or the like.

In an example, the end to end latency of the at least one uplink communication channel may indicate a time (duration) to (successfully) deliver a data packet/message from the first network element (e.g., UE 1) to the second network element (e.g., UE 2). In an example, the end to end latency of the at least one downlink communication channel may indicate a time (duration) to (successfully) deliver a data packet/message from the second network element (e.g., UE 2) to the first network element (e.g., UE 1). In an example, the end to end latency of the at least one downlink communication channel may indicate a time (duration) to (successfully) receive a data packet/message from the second network element (e.g., UE 2) by the first network element (e.g., UE 1).

In an example, the fourth parameter/Channel Symmetry Request may indicate that a requested maximum end to end latency asymmetry/difference between [the at least one uplink communication channel] and [the at least one downlink communication channel] is less than and/or equal to a value (e.g., 2 ms). For example, the end to end latency of the at least one uplink communication channel is 5 ms, the end to end latency of the at least one downlink communication channel is 7 ms, based on above information, the end to end latency asymmetry/difference between [the at least one uplink communication channel] and [the at least one downlink communication channel] is 2 ms (e.g., 7 ms-5 ms=2 ms).

In an example, the fourth parameter/Channel Symmetry Request may indicate that end to end latency between the first network element and the second network element is less than and/or equal to a value (e.g., 5 ms, 10 ms). In an example, the fourth parameter/Channel Symmetry Request may indicate requesting end to end latency of the at least one uplink communication channel is less than and/or equal to a value (e.g., 5 ms, 10 ms). In an example, the fourth parameter/Channel Symmetry Request may indicate requesting end to end latency of the at least one downlink communication channel is less than and/or equal to a value (e.g., 5 ms, 10 ms).

In an example, the first message may comprise an identity of the first wireless device. In an example, the first message may comprise an identity of the second wireless device. In an example, the identity of the first wireless device and/or the identity of the second wireless device may comprise at least one of: a Generic Public Subscription Identifier (GPSI); a Subscription Permanent Identifier (SUPI); a Subscription Concealed Identifier (SUCI); a 5G Globally unique Temporary Identity (5G-GUTI); a permanent equipment identifier (PEI); an IP address; an application level identifier to identify the first/second wireless device; an external identifier of the first/second wireless device; and/or the like to identify the first/second wireless device. In an example, the GPSI may comprise a Mobile Station Integrated Services Digital Network (MSISDN) and/or an external identifier. In an example, the SUPI may comprise an International Mobile Subscriber Identity (IMSI) and/or Network Access Identifier (NAI). In an example, the PEI may comprise an International Mobile Equipment Identity (IMEI). In an example, the IP address may comprise an IPv4 address and/or an IPv6 prefix. In an example, in order to avoid disclosing the information of the first/second wireless device, the external identifier of the wireless device may be used by an application (e.g., a 3rd party).

In an example, the fourth parameter/Channel Symmetry Request, the identity of the first wireless device and/or the identity of the second wireless device may indicate that the first wireless device (e.g., UE 1) requesting symmetric communication channels between the first wireless device (e.g., UE 1) and the second wireless device (e.g., UE 2).

In an example, the first message may comprise an identifier of a RRC connection, where the RRC connection may be associated with the asymmetric channel. For example, the asymmetric channel may comprise the RRC connection. In an example, the first message may comprise an identifier of a radio bearer, where the radio bearer may be associated with the asymmetric channel. For example, the asymmetric channel may comprise the radio bearer. In an example, the first message may comprise an identifier of a protocol data unit (PDU) session, where the PDU session may be associated with the asymmetric channel. For example, the asymmetric channel may comprise the PDU session. In an example, the first message may comprise an identifier of a network slice (e.g., S-NSSAI), where the network slice may be associated with the asymmetric channel. For example, the asymmetric channel may comprise the network slice. In an example, the first message may comprise an identifier of a QoS flow, where the QoS flow may be associated with the asymmetric channel. For example, the asymmetric channel may comprise the QoS flow. In an example, the first message may comprise an identifier of a service data flow (SDF), where the SDF may be associated with the asymmetric channel. For example, the asymmetric channel may comprise the SDF.

In an example, the first message may comprise a user plane message. In an example, the user plane data may comprise the first message, for example, the first wireless device may send first message over a user plane. For example, the first wireless device may send at least one user data packet, where the at least one user data packet may comprise the first message. In an example, the first message may comprise a radio resource control (RRC) request message, wherein the RRC request message may comprise at least one of the following messages: a MeasurementReport; a ULInformationTransfer; an MSG 3; an MSG 5; a RRCSetupRequest message; a RRCSetupComplete message; a RRCResumeRequest message; a RRCResumeComplete message; a UEAssistanceInformation message; a UEInformationResponse message; a UECapabilityInformation message; and/or the like.

FIG. 22 is an example diagram depicting a RRCSetupRequest message, wherein the RRCSetupRequest message comprise the first parameter/Channel Asymmetry Indication indicating an asymmetric channel between the first wireless device and a second wireless device.

In an example, in response to the message received, the base station may take one or more actions. In an example action, the base station may determine to modify/change the asymmetric channel to symmetric communication channel based on at least one of: the first message; capability of the network/base station supporting symmetric communication channel; resource of the base station; local policy; and/or subscription information of the first wireless device. In an example, the capability of the network/base station supporting symmetric communication channel may indicate whether the base station has the capability to support a uplink symmetric communication channel and a downlink symmetric communication channel between the first wireless device and the base station. In an example, the capability of the network/base station supporting symmetric communication channel may indicate whether the base station has the capability to support a uplink symmetric communication channel and a downlink symmetric communication channel between the first wireless device and the second wireless device.

For example, the first message may comprise the first parameter/Channel Asymmetry Indication requesting to modify/change the asymmetric channel to symmetric communication channel, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may determine to modify/change the asymmetric channel to symmetric communication channel between the first wireless device and the base station. For example, the first message may comprise the first parameter/Channel Asymmetry Indication requesting to modify/change the asymmetric channel to symmetric communication channel, the first message may comprise the identity of the first wireless device and/or the identity of the second wireless device, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may determine to modify/change the asymmetric channel to symmetric communication channel between the first wireless device and the second wireless device.

In an example action, the base station may determine to modify radio resource configuration of a bearer associated with the asymmetric channel, based on at least one of: the first message; capability of the base station supporting symmetric communication channel; resource of the base station; local policy; and/or subscription information of the first wireless device. For example, the first message may comprise the first parameter/Channel Asymmetry Indication requesting to modify/change the asymmetric channel to symmetric communication channel, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may determine to modify radio resource configuration of a bearer associated with the asymmetric channel to enable the symmetric communication channel between the first wireless device and the base station. For example, the first message may comprise the first parameter/Channel Asymmetry Indication requesting to modify/change the asymmetric channel to symmetric communication channel, the first message may comprise the identity of the first wireless device and/or the identity of the second wireless device, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may determine to modify radio resource configuration of a bearer associated with the asymmetric channel to enable the symmetric communication channel between the first wireless device and the second wireless device.

In an example, based on the first message (e.g., the identifier of the RRC connection), the base station may determine the asymmetric channel is associated with the RRC connection for the first wireless device. In an example, based on the first message (e.g., the identifier of the radio bearer), the base station may determine the asymmetric channel is associated with the radio bearer for the first wireless device, wherein the radio bearer may comprise a data radio bearer and/or a signaling radio bearer. In an example, based on the first message (e.g., the identifier of the network slice, S-NSSAI), the base station may determine the asymmetric channel is associated with the network slice for the first wireless device, wherein the network slice may be associated with a PDU session. In an example, based on the first message (e.g., the identifier of the QoS flow), the base station may determine the asymmetric channel is associated with the QoS flow for the first wireless device, wherein the QoS flow may be associated with a PDU session. In an example, based on the first message (e.g., the identifier of the service data flow), the base station may determine the asymmetric channel is associated with the service data flow for the first wireless device, wherein the service data flow may be associated with a PDU session. In an example, based on the first message (e.g., the identifier of the PDU session), the base station may determine asymmetric channel is associated with the PDU session for the first wireless device, wherein the PDU session may be associated with at least one radio bearer, wherein the at least one radio bearer may comprise at least one data radio bearer and/or at least one signaling radio bearer.

In an example action, the base station may determine to modify/change time/frequency/space/power resources associated with the asymmetric channel to enable a symmetric uplink communication channel and downlink communication channel, based on at least one of: the first message; capability of the base station supporting symmetric communication channel; resource of the base station; local policy; and/or subscription information of the first wireless device.

For example, the first message may comprise the first parameter/Channel Asymmetry Indication requesting to modify/change the asymmetric channel to symmetric communication channel, the second parameter/Uplink Channel Latency may indicate 1 millisecond (ms) for uplink channel latency between the first wireless device and the second wireless device, the third parameter/Downlink Channel Latency may indicate 5 ms for downlink channel latency between the first wireless device and the second wireless device, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may determine to modify/change time/frequency/space/power resources associated with the asymmetric channel to enable the symmetric communication channel between the first wireless device and the second wireless device. For example, to enable the symmetric communication channel between the first wireless device and the second wireless device, the base station may modify time/frequency resource (e.g., a PDSCH associated with the asymmetric channel for the first wireless device and/or a PUSCH associated with the asymmetric channel for the second wireless device) to decrease the downlink channel latency between the first wireless device and the second wireless device. For example, to enable the symmetric communication channel between the first wireless device and the second wireless device, the base station may modify a PUSCH associated with the asymmetric channel for the first wireless device and/or a PDSCH associated with the asymmetric channel for the second wireless device, to increase the uplink channel latency within an allowed range between the first wireless device and the second wireless device.

For example, the first message may comprise the first parameter/Channel Asymmetry Indication requesting to modify/change the asymmetric channel to symmetric communication channel, the second parameter/Uplink Channel Latency may indicate 2 ms for uplink channel latency between the first wireless device and the base station, the third parameter/Downlink Channel Latency may indicate 5 ms for downlink channel latency between the first wireless device and the base station, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may determine to modify/change time/frequency/space/power resources associated with the asymmetric channel to enable the symmetric communication channel between the first wireless device and the base station. For example, to enable the symmetric communication channel between the first wireless device and the base station, the base station may modify time/frequency resource (e.g., a PDSCH associated with the asymmetric channel for the first wireless device) to decrease the downlink channel latency between the first wireless device and the base station. For example, to enable the symmetric communication channel between the first wireless device and the base station, the base station may modify a PUSCH associated with the asymmetric channel for the first wireless device, to increase the uplink channel latency within an allowed range between the first wireless device and the base station.

In an example action, the base station may determine to modify/change QoS resource associated with the asymmetric channel to enable a symmetric uplink communication channel and downlink communication channel, based on at least one of: the first message; capability of the base station supporting symmetric communication channel; resource of the base station; local policy; and/or subscription information of the first wireless device. In an example, the QoS resource may comprise QoS parameters, where the QoS parameters may comprise at least of Resource type; priority level; Packet Delay Budget (PDB); Packet Error Rate (PER); Averaging window; and/or Maximum Data Burst Volume. For example, the first message may indicate that the downlink channel latency is longer than the uplink channel latency, the base station may modify QoS resource/QoS parameters of the downlink channel to decrease the downlink channel latency.

In an example action, the base station may determine to modify/change radio bearer configuration information associated with the asymmetric channel to enable a symmetric uplink communication channel and downlink communication channel, based on at least one of: the first message; capability of the base station supporting symmetric communication channel; resource of the base station; local policy; and/or subscription information of the first wireless device. In an example, the base station may determine to modify/change radio bearer configuration information of a RRC connection associated with the asymmetric channel for the first wireless device, where the RRC connection may be associated with a PDU session, a network slice, a QoS flow, and/or a service data flow. In an example, the base station may determine to modify/change radio bearer configuration information of a first RRC connection associated with the asymmetric channel for the first wireless device, where the first RRC connection may be associated with a first PDU session, a first network slice, a first QoS flow, and/or a first service data flow for the first wireless device. In an example, the base station may determine to modify/change radio bearer configuration information of a second RRC connection associated with the asymmetric channel for the second wireless device, where the second RRC connection may be associated with a second PDU session, a second network slice, a second QoS flow, and/or a second service data flow for the second wireless device.

For example, the first message may comprise the first parameter/Channel Asymmetry Indication requesting to modify/change the asymmetric channel to symmetric communication channel, the second parameter/Uplink Channel Latency may indicate 1 millisecond (ms) for uplink channel latency between the first wireless device and the second wireless device, the third parameter/Downlink Channel Latency may indicate 5 ms for downlink channel latency between the first wireless device and the second wireless device, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may determine to modify/change radio bearer configuration information associated with the asymmetric channel to enable the symmetric communication channel between the first wireless device and the second wireless device. For example, to enable the symmetric communication channel between the first wireless device and the second wireless device, the base station may modify/change radio bearer configuration information of a first RRC connection associated with the asymmetric channel for the first wireless device and/or a second RRC connection associated with the asymmetric channel for the second wireless device, to decrease the downlink channel latency between the first wireless device and the second wireless device. In an example, the base station may modify/change radio bearer configuration information by modifying at least one radio bearer associated with the asymmetric channel. In an example, the base station may modify/change radio bearer configuration information by adding at least one new radio bearer associated with the asymmetric channel. In an example, the base station may modify/change radio bearer configuration information by removing at least one new radio bearer associated with the asymmetric channel. In an example, the at least one (new) radio bearer may comprise at least one (new) data radio bearer and/or at least one (new) signaling radio bearer. For example, to enable the symmetric communication channel between the first wireless device and the second wireless device, the base station may modify/change radio bearer configuration information of a first RRC connection associated with the asymmetric channel for the first wireless device and/or a second RRC connection associated with the asymmetric channel for the second wireless device, to increase the uplink channel latency within an allowed range between the first wireless device and the second wireless device. In an example, the first RRC connection may be between the first wireless device and the base station, the second RRC connection may be between the second wireless device and the base station. For example For example, the first message may comprise the first parameter/Channel Asymmetry Indication requesting to modify/change the asymmetric channel to symmetric communication channel, the second parameter/Uplink Channel Latency may indicate 2 ms for uplink channel latency between the first wireless device and the base station, the third parameter/Downlink Channel Latency may indicate 5 ms for downlink channel latency between the first wireless device and the base station, the capability of the network/base station supporting symmetric communication channel may indicate that the base station supports symmetric communication channel, the resource of the base station may enable the base station to modify/change the asymmetric channel to symmetric communication channel, the local policy and/or the subscription information of the first wireless device may allow the base station to modify/change the asymmetric channel to symmetric communication channel, based on above information, the base station may modify/change radio bearer configuration information of a RRC connection associated with the asymmetric channel for the first wireless device, to decrease the downlink channel latency between the first wireless device and the base station. In an example, the base station may modify/change radio bearer configuration information by modifying at least one radio bearer associated with the asymmetric channel. In an example, the base station may modify/change radio bearer configuration information by adding at least one new radio bearer associated with the asymmetric channel. In an example, the base station may modify/change radio bearer configuration information by removing at least one new radio bearer associated with the asymmetric channel. In an example, the at least one (new) radio bearer may comprise at least one (new) data radio bearer and/or at least one (new) signaling radio bearer. For example, to enable the symmetric communication channel between the first wireless device and the base station, the base station may modify/change radio bearer configuration information of a RRC connection associated with the asymmetric channel for the first wireless device, to increase the uplink channel latency within an allowed range between the first wireless device and the second wireless device. In an example, the RRC connection may be between the first wireless device and the base station.

In an example, the radio bearer configuration information may comprise parameters for at least one data radio bearer (DRB). In an example, the radio bearer configuration information may comprise parameters for at least one signaling radio bearer (SRB). In an example, the radio bearer configuration information may comprise QoS parameters for at least one signal radio bearer and/or at least one data radio bearer associated with the asymmetric channel.

In an example, the at least one data radio bearer may be used to transmit user plane data. In an example, the at least one signal radio bearer may be radio bearer(s) that is used for the transmission of RRC and/or NAS messages. In an example, the at least one signal radio bearer may comprise at least one of: SRB0, SRB1, SRB2, and/or SRB3. In an example, the SRB0 may be for RRC messages using a Common Control Channel (CCCH) logical channel. In an example, the SRB1 may be for RRC messages (which may comprise a piggybacked NAS message) as well as for NAS messages prior to establishment of SRB2, all using Dedicated Control Channel (DCCH) logical channel. In an example, the SRB2 may be for NAS messages and for RRC messages which comprise logged measurement information, all using DCCH logical channel. SRB2 may have a lower priority than SRB1 and may be configured by the network. In an example, the SRB3 may be for specific RRC messages when UE is in E-UTRA New Radio Dual Connectivity with E-UTRA connected to EPC ((NG)EN-DC) and/or New Radio Dual Connectivity (NR-DC), all using DCCH logical channel.

In an example, the QoS parameters for the at least one SRB and/or the at least one DRB may comprise at least one of: Resource type; priority level; Packet Delay Budget (PDB); Packet Error Rate (PER); Averaging window; Maximum Data Burst Volume; and/or the like. In an example, the Resource type may indicate resource for Non-Guaranteed Bit Rate (GBR), resource for GBR, and/or resource for Delay-critical GBR. In an example, the resource type may determine whether dedicated network resources are permanently allocated (e.g., by an admission control function in a radio base station). In an example, the priority level may indicate a priority in scheduling resources among DRB/SRB/QoS Flows. In an example, a lowest priority level value may indicate a highest priority. In an example, the Packet Delay Budget (PDB) may indicate an upper bound for the time that a packet may be delayed between a UE and another network function (e.g., UPF). In an example, the Packet Error Rate (PER) may indicate an upper bound for the rate of PDUs (e.g., IP packets) that have been processed by the sender of a link layer protocol (e.g., RLC in RAN of a 3GPP access) but that are not successfully delivered by the corresponding receiver to the upper layer (e.g., PDCP in RAN of a 3GPP access). The PER may define an upper bound for a rate of non-congestion related packet losses. In an example, each GBR QoS Flow may be associated with an Averaging window. The Averaging window may represent the duration over which the Guaranteed Flow Bit Rate (GFBR) and Maximum Flow Bit Rate (MFBR) may be calculated (e.g., in the (R)AN, UPF, UE). In an example, each GBR QoS Flow with Delay-critical resource type may be associated with a Maximum Data Burst Volume (MDBV). The MDBV may indicate the largest amount of data that a base station is required to serve within a period of 5G-AN PDB. For example, the base station may determine to modify QoS parameters for the at least one SRB and/or the at least one DRB associated with the asymmetric channel, e.g., to enable uplink end to end delay of the at least one DRB equal to downlink end to end delay of the at least one DRB. For example, the base station may determine to modify QoS parameters for the at least one SRB and/or the at least one DRB associated with the asymmetric channel, e.g., to make sure that asymmetry/difference between the uplink end to end delay of the at least one DRB and the downlink end to end delay of the at least one DRB is less than and/or equal to a value. In an example, the at least one SRB and/or the at least one DRB may be between the first wireless device and the base station. In an example, the at least one SRB and/or the at least one DRB may be between the second wireless device and the base station.

In an example, the radio bearer configuration information may comprise parameters of SDAP configuration information associated with the asymmetric channel. In an example, the SDAP configuration information may be used to set the configurable SDAP parameters for a data radio bearer. In an example, the SDAP configuration information may comprise at least one of the following information elements (IEs)/parameters: defaultDRB; mappedQoS-FlowsToAdd, FlowsToRelease, PDU session ID, and/or SDAP header information. In an example, the defaultDRB may indicate whether or not this is the default DRB for a PDU session identified by the PDU session ID. In an example, the mappedQoS-FlowsToAdd may indicate list of QoS flow IDs (QFIs) of uplink (UL) QoS flows of the PDU session to be additionally mapped to this DRB. A QFI value may be included at most once in all configured instances of SDAP-Config with the same PDU session ID. For QoS flow remapping, the QFI value of the remapped QoS flow may be only included in mappedQoS-FlowsToAdd in sdap-Config corresponding to the new DRB and not included in mappedQoS-FlowsToRelease in sdap-Config corresponding to the old DRB. In an example, the mappedQoS-FlowsToRelease may indicate list of QFIs of QoS flows of the PDU session to be released from existing QoS flow to DRB mapping of this DRB. In an example, the SDAP header information may indicate whether or not a SDAP header is present for uplink data and/or downlink data on this DRB.

In an example, the radio bearer configuration information may comprise parameters of PDCP configuration information associated with the asymmetric channel. In an example, the PDCP configuration information may comprise at least one parameter: PDCP SN UL Size, PDCP SN DL Size, RLC mode, ROHC Parameters, UL Data Split Threshold, PDCP Duplication, PDCP Re-establishment, PDCP Data Recovery, Duplication Activation, Out Of Order Delivery, PDCP Status Report Indication, Additional PDCP duplication Information, EHC Parameters, and/or the like. In an example, the PDCP SN UL Size may indicate PDCP sequence number size (e.g. in bits) for uplink. The PDCP SN DL Size may indicate PDCP sequence number size (e.g. in bits) for downlink. The RLC mode may indicate the RLC mode for the DRB, for example, Acknowledged Mode (AM), Unacknowledged Mode (UM) and/or Transparent Mode (TM). The ROHC Parameters may indicate ROHC parameters for header compression. The UL Data Split Threshold may indicate the uplink data split threshold (e.g. in bytes). The PDCP Duplication may indicates whether PDCP duplication is to be configured for the DRB. The PDCP Re-establishment may indicate PDCP entity re-establishment to be triggered. The PDCP Data Recovery may indicate PDCP data recovery to be triggered. The Duplication Activation may comprise information on the initial state of DL PDCP duplication. Out Of Order Delivery may indicate whether or not outOfOrderDelivery specified is configured. Out of order delivery may be configured only when the radio bearer is established. The PDCP Status Report Indication may indicate PDCP Status Report. For example, For Acknowledged Mode DRB, "downlink" indicates that the PDCP entity is configured to send PDCP status report(s) to the UE, and "uplink" indicates that the UE is configured to send PDCP status report(s). The Additional PDCP duplication Information may indicate number of PDCP duplication configured when it is more than 2 for the DRB. The EHC Parameters may indicate Ethernet Header Compression parameters.

In an example, in response to the first message, the base station may send a second message to the first wireless device/second wireless device. In an example, the second message may indicate modifying/changing the asymmetric channel to symmetric communication channel. In an example, the second message may indicate modifying/changing radio resource configuration of a bearer associated with the asymmetric channel. In an example, the second message may indicate modifying/changing time/frequency/space/power resources associated with the asymmetric channel. In an example, the second message may indicate modifying/changing QoS resource associated with the asymmetric channel. For example, the second message may comprise updated/new QoS parameters to modify/change the QoS resource associated with the asymmetric channel. In an example, the second message (e.g., updated/new radio bearer configuration information) may indicate modifying/changing radio bearer configuration information associated with the asymmetric channel. In an example, to indicate modifying/changing the RRC connection, the PDU session, the network slice, the QoS flow and/or the service data flow associated with the asymmetric channel to symmetric communication channel, the second message may comprise an identifier of the PDU session, an identifier of the network slice (e.g., S-NSSAI), an identifier of the QoS flow, and/or an identifier of the service data flow.

In an example, the base station may determine a fifth parameter (e.g., Channel Symmetry Indication (CSI)) indicating that the base station has modified the asymmetric channel. In an example, the fifth parameter/Channel Symmetry Indication may indicate the base station provides (updated) symmetric communication channel between the first wireless device and the second wireless device. In an example, the fifth parameter/Channel Symmetry Indication may indicate the base station provides (updated) symmetric communication channel between the first wireless device and the base station. In an example, the second message may comprise the fifth parameter/Channel Symmetry Indication. In an example, the second message may comprise a RRC-Congfiguration message, wherein the RRCCongfiguration message may comprise one or more parameters to modify/adjust the radio bearer/QoS resources associated with the asymmetric channel. In an example, the RRCCongfiguration message comprises one or more parameters to modify/adjust the time/frequency/space/power resources associated with the asymmetric channel.

In an example, the second message may comprise a Downlink Control Information (DCI), and/or a Cell Radio Network Temporary Identifier (C-RNTI). In an example, the second message may be a MAC layer message. In an example, the second message may be a physical layer message. In an example, the base station may send the second message to the first wireless device/second wireless device via a PDCCH. In an example, the DCI may indicate (updated/new) time and/or frequency resource associated with the asymmetry channel. In an example, the C-RNTI may indicate a RRC connection and scheduling, wherein the RRC connection and scheduling may be associated with the asymmetry channel.

In an example, the second message may comprise an RRC response message, wherein the RRC response message comprises at least one of following messages: a DLInformationTransfer; an RRCReconfiguration; an MSG 4; a RRCSetup; a RRCResume; UEReconfiguration; UEInformationRequest; and/or UECapabilityEnquiry. In an example, the second message may comprise at least one of: a registration response message; and/or a PDU session response message.

In response to the message received, the first wireless device and/or the second wireless device may take one or more actions. In an example action, based on the second message, the first wireless device and/or the second wireless device may modify/change the asymmetric channel to symmetric communication channel. In an example action, based on the second message, the first wireless device and/or the second wireless device may modify/change radio resource configuration of a bearer associated with the symmetric channel. In an example action, based on the second message (e.g., DCI, C-RNTI), the first wireless device and/or the second wireless device may modify/change time/frequency/space/power resources associated with the asymmetric channel. In an example action, based on the second message (e.g., QoS parameters), the first wireless device and/or the second wireless device modify/change QoS resource associated with the asymmetric channel. In an example action, based on the second message (e.g., updated/new radio bearer configuration information), the first wireless device and/or the second wireless device may modify/change radio bearer configuration information associated with the asymmetric channel.

In an example action, based on the second message (e.g., the identifier of the PDU session, the identifier of the network slice (e.g., S-NSSAI), the identifier of the QoS flow, and/or the identifier of the service data flow), the first wireless device and/or the second wireless device may modify/change the RRC connection, the PDU session, the network slice, the QoS flow and/or the service data flow associated with the asymmetric channel to symmetric communication channel.

In an example action, after modifying the asymmetric channel to symmetric communication channel, the first wireless device and/or the second wireless device may continue run the first application and/or the second application over the symmetric communication channel.

Figure 23:
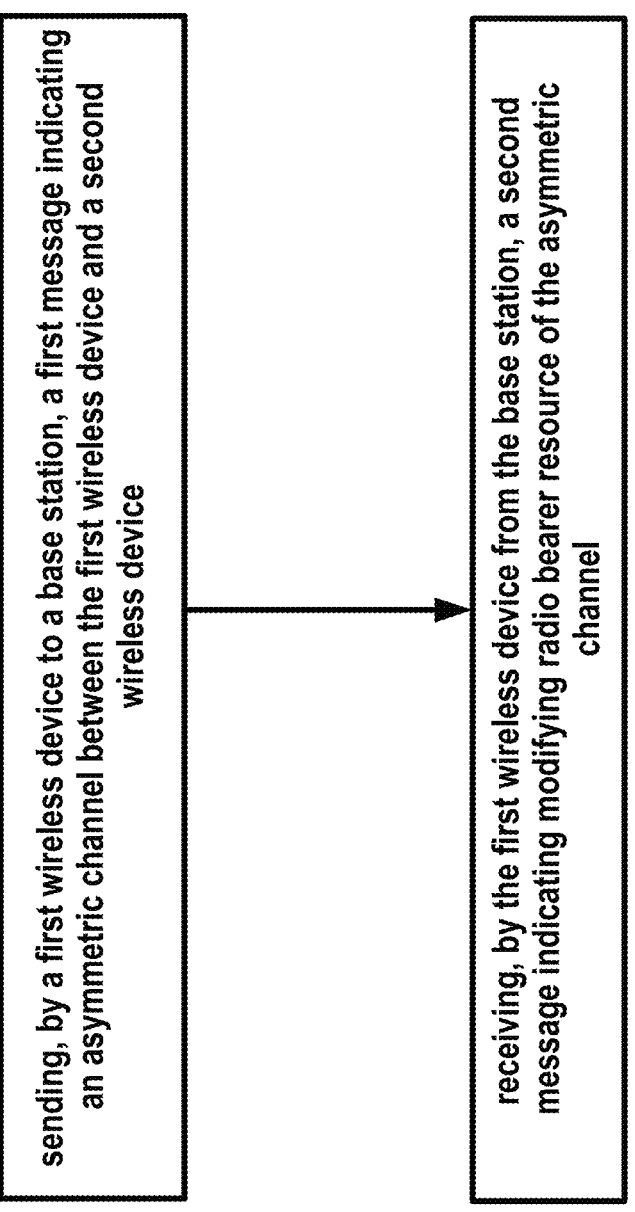
FIG. 23 is an example diagram depicting the procedures of a wireless device as per an aspect of an embodiment of the present disclosure.

FIG. 23 is an example diagram depicting the procedures of a wireless device as per an aspect of an embodiment of the present disclosure. FIG. 24 is an example diagram depicting the procedures of a base station as per an aspect of an embodiment of the present disclosure.

Figure 20:
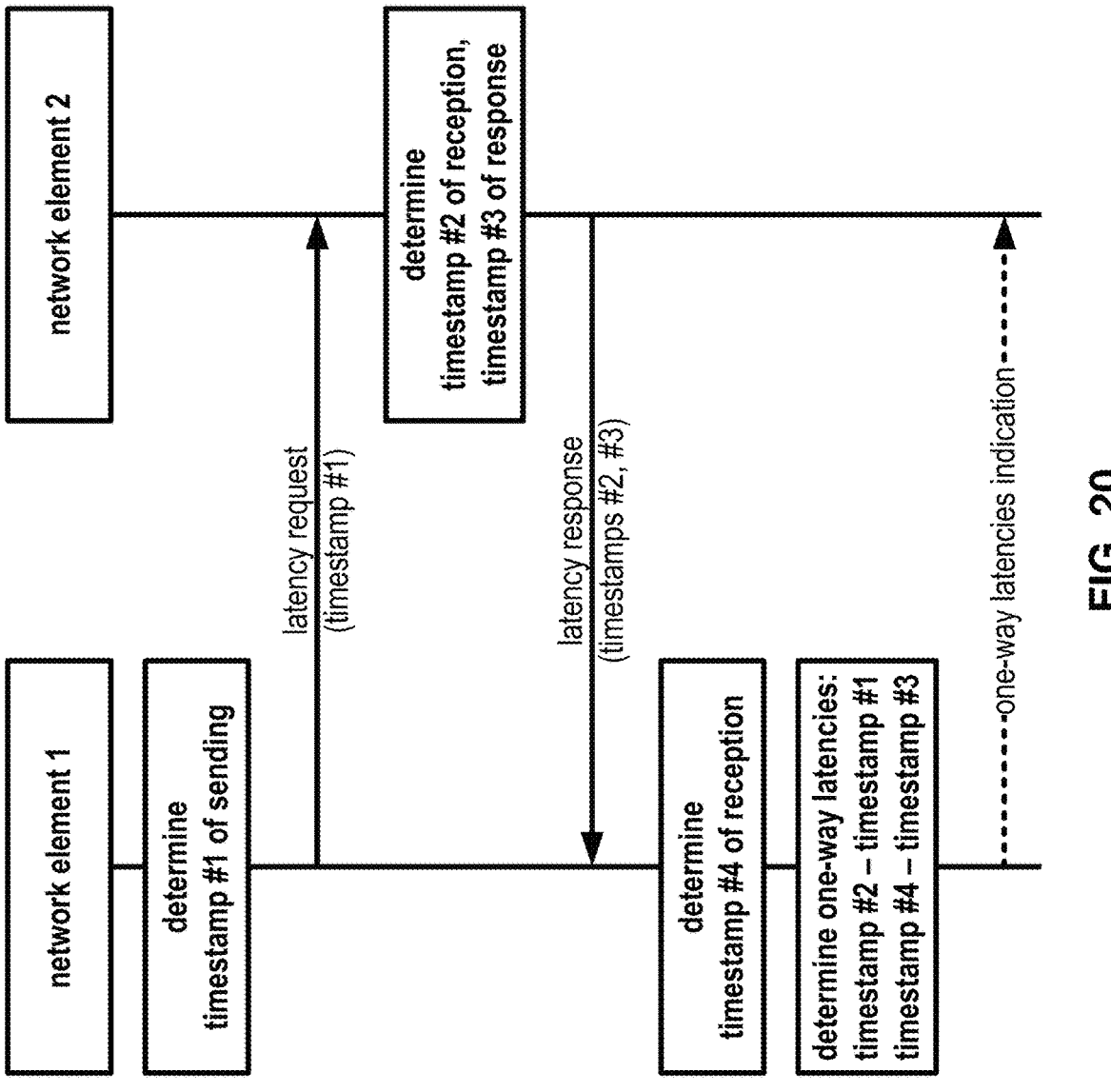
FIG. 20 is an example call flow as per an aspect of an embodiment of the present disclosure.

FIG. 20 is a call flow depicting an example to measure a one way delay between a first network element (e.g., NE1) and a second network element (e.g., NE2). In an example, the NE1 may be a first wireless device, a first base station, a first AMF, a first SMF, a first UPF, a first NEF, a first router, and/or the like. In an example, the NE2 may be a second wireless device, a second base station, a second AMF, a second SMF, a second UPF, a second NEF, a second router, and/or the like. In an example, for FIG. 19, the NE1 may be the first wireless device, the NE2 may be a second wireless device and/or a base station/L-UPF/L-GW. In an example, for FIG. 25, the NE1 may be the first wireless device, the NE2 may be a second wireless device and/or an AMF/NEF.

Figure 26:
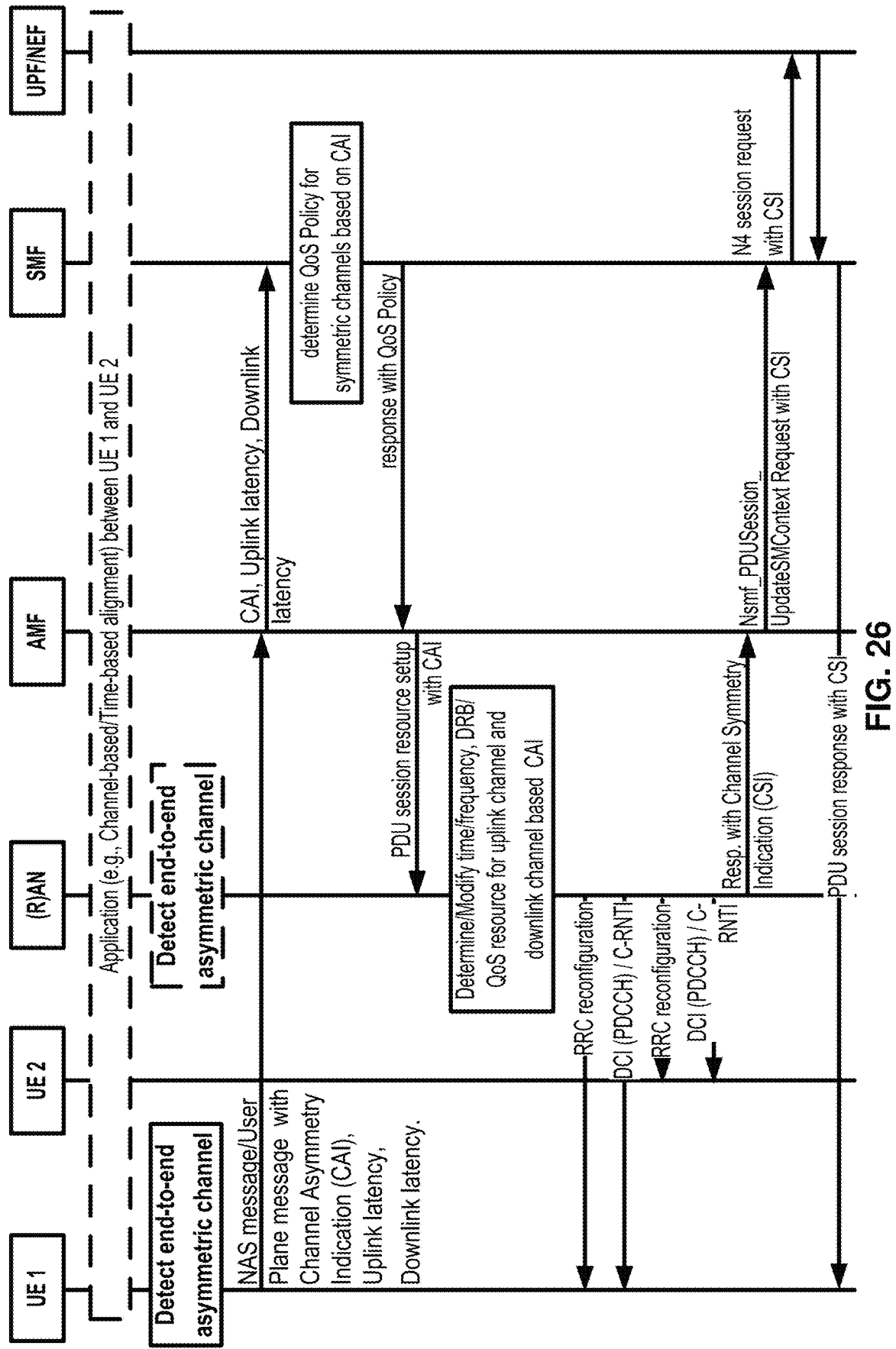
FIG. 26 is an example call flow as per an aspect of an embodiment of the present disclosure.

In an example, for FIG. 26, the NE1 may be the first wireless device, the NE2 may be a second wireless device, an SMF, a UPF, and/or an NEF. Above examples may also apply to the second wireless device (e.g., as NE 1) and other network elements (e.g., (R)AN, AMF, SMF, UPF, NEF) (e.g., as NE 2).

In an example, the NE1 may send a first message (e.g., One Way Delay Measurement Request) to the NE2 indicating requesting measuring a one way delay between the NE1 and the NE2. For example, the first message may comprise a parameter (e.g., One Way Delay Measurement) indicating requesting measuring a one way delay between the NE1 and the NE2. Before, when or after the sending of the first message, NE1 may determine a timestamp #1 corresponding to the time of the sending. The first message may comprise the timestamp #1 in the message. Based on receiving the message, the NE2 may determine a timestamp #2 corresponding to the receiving. The NE2 may determine a timestamp #3 corresponding to the sending of a second message back to the NE1 (latency response). The second message may comprise the timestamp #2 and the timestamp #3. Based on receiving the second message, the NE1 may determine a timestamp #4 indicating corresponding to the receiving the latency response. In an example, the NE1 may determine/calculate a first one way latency/delay by subtracting timestamp #1 from timestamp #2. In an example, the NE1 may determine/calculate a second one-way delay by subtracting timestamp #3 from timestamp #4. The one-way latencies/delays may respectively be referred as first and second, uplink and downlink, or any other appropriate labels, depending on the context in which the one-way latencies/delays are calculated. In an example, the NE1 may send a third message to the NE2, wherein the third message may indicate the first one-way delay, the second one-way delay, a difference between the first and second one-way delays, or any other indicator of symmetry. Additionally or alternatively, the third message may comprise timestamp #4. In a scenario where the first message (latency request) includes timestamp #1 and the third message comprises timestamp #4, the NE2 may itself be enabled to determine/ calculate the respective one-way delays based on the timestamps #1, #2, #3, #4. In an example, the timestamp 1, timestamp 2, timestamp 3, and/or timestamp 4 may be UTC time, GPS time, and/or the like.

Figure 21:
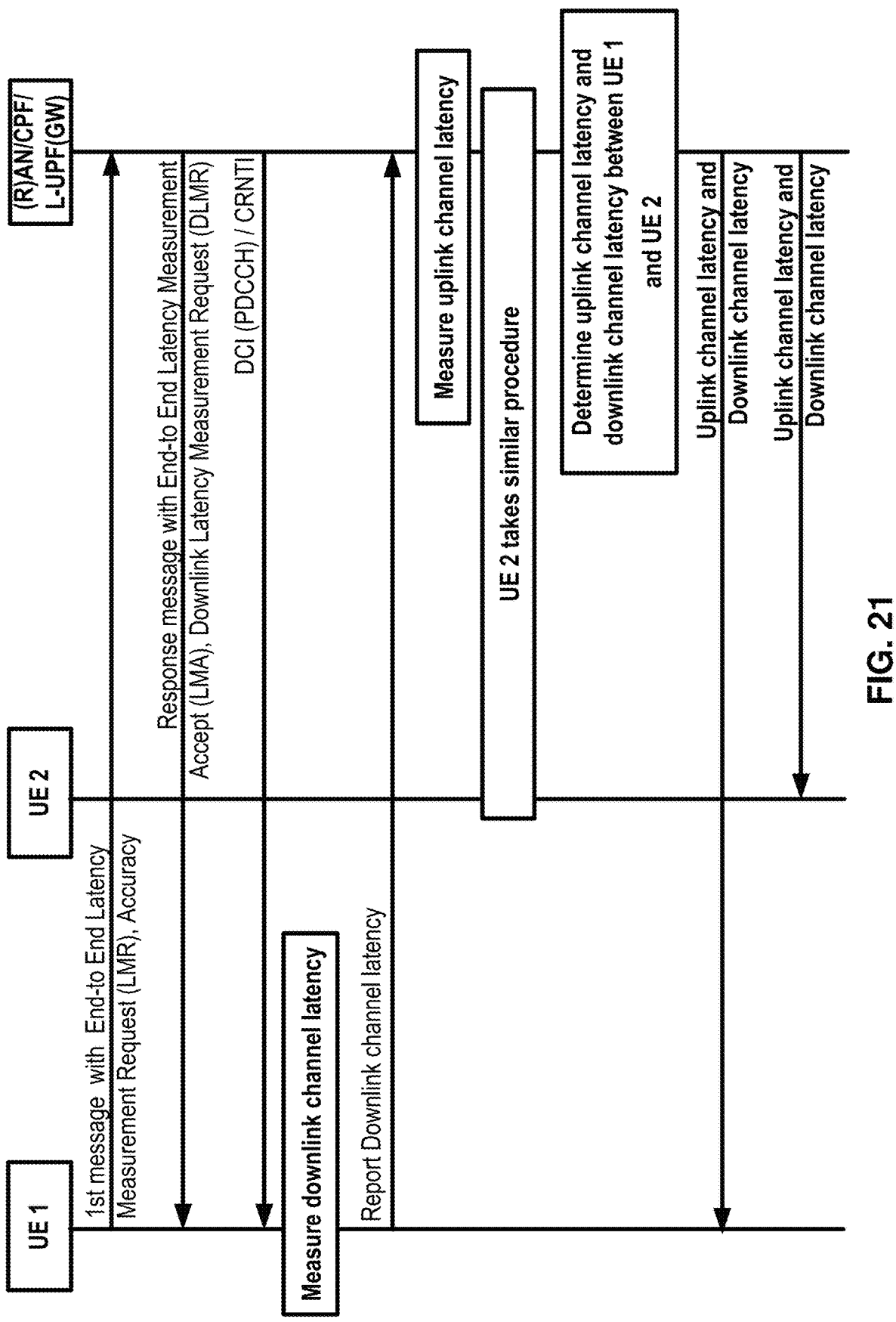
FIG. 21 is an example call flow as per an aspect of an embodiment of the present disclosure.

FIG. 21 is an example call flow demonstrate example ways how to measure a one way delay between a first wireless device and a base station, how to measure a one way delay between a second wireless device and a base station, and/or to measure a one way delay between the first wireless device and the second wireless device. In an example, the first wireless device (e.g., UE 1 as shown in FIG. 21) and the base station (e.g., (R)AN as shown in FIG. 21) may be synchronization (synchronized).

In an example, the synchronization between the UE 1 and the (R)AN may comprise synchronization for transmission and/or synchronization for reception. In an example, the synchronization may comprise Downlink Synchronization and Uplink Synchronization. In an example, the downlink may be a direction from the base station to the first wireless device. In an example, the uplink may be a direction from the first wireless device to the base station. In an example, the Downlink Synchronization may be a process in which UE 1 detects the radio boundary (e.g., the exact timing when a radio frame starts) and/or a OFDM symbol boundary (e.g., the exact timing when an OFDM symbol starts). The UE 1 may implement Downlink Synchronization by detecting and analyzing a Synchronization Signal Block (SSB) received from the (R)AN. In an example, the Uplink Synchronization may be a process in which UE figure out the exact timing when it should send uplink data (e.g., PUCCH, PUCCH). In an example, the (R)AN may handle multiple UEs and the network may have to ensure that the uplink signal from every UE should be aligned with a common receiver timer of the network.

In an example, the base station may receive a first message from the first wireless device, and the first message may indicate requesting measuring an end to end latency between the first wireless device and a second wireless device (e.g., UE 2 as shown in FIG. 21). In an example, the base station may receive the first message from the first wireless device, and the first message may comprise a parameter (e.g., End-to End Latency Measurement Request) indicating requesting measuring an end to end latency between the first wireless device and the second wireless device.

In an example, the first message may comprise a second parameter (e.g., Latency Accuracy) indicating accuracy of the end to end latency, wherein the accuracy of the end to end latency may comprise at least one of: a second; a decisecond; a centisecond; a millisecond; a microsecond; and/or the like. In an example, the first message may comprise at least one of: an identity of the first wireless device; and/or an identity of the second wireless device.

In response to the message received, the base station may take one or more actions. In an example action, based on at least one of: one or more parameters of the first message; capability of the base station supporting the end to end latency measurement; resource of the base station; local policy; and/or subscription information of the first wireless device, the base station may determine whether to accept the request of measuring the end to end latency between the first wireless device and the second wireless device.

In an example action, based on at least one of: one or more parameters of the first message; capability of the base station supporting the end to end latency measurement; resource of the base station; local policy; subscription information of the first wireless device; and/or determining whether to accept the request of measuring the end to end latency, the base station may determine a third parameter (e.g., End-to End Latency Measurement Accept) indicating accepting the request of measuring the end to end latency.

In an example action, the base station may send a second message to the first wireless device, the second message may comprise the third parameter/End-to End Latency Measurement Accept. In an example, the second message may indicate requesting measuring downlink one way delay/ latency between the base station and the first wireless device. For example, the second message may comprise a fourth parameter (e.g., Downlink Latency Measurement Request) indicates requesting measuring downlink one way delay/latency between the base station and the first wireless device. In an example, the base station may send a third message to the first wireless device, the third message may comprise a physical layer message. In an example, the third message may indicate physical layer resources for uplink channel and/or downlink channel. For example, the third message may comprise a DCI and/or C-RNTI. The DCI may indicate allocated time/frequency resource for PDSCH and/ or PUSCH. In an example, the time/frequency resource for PDSCH may indicate when the base station may send data packet to the wireless device. In an example, the time/ frequency resource for PUSCH may indicate when the first wireless device may send data packet to the base station.

In an example, the base station may send data packet to the first wireless device over the allocated PDSCH. In an example, the first wireless device may receive the data packet from the base station over the PDSCH at time t2, the first wireless device may determine/derive a time t1 when the base station sending the data packet based on at least one of: the synchronization between the first wireless device and the base station, the fourth parameter/Downlink Latency Measurement Request, the DCI and/or the C-RNTI. In an example, the first wireless device may determine/derive downlink one way delay/latency between the first wireless device and the base station by subtracting t1 from t2. In an example, the first wireless device may send a fourth message to the base station reporting the downlink one way delay. The fourth message may comprise the downlink one way delay/latency and/or the time t2.

In an example, based on the DCI and/or C-RNTI, the first wireless device may send data packet to the base station over the allocated PUSCH. In an example, the base station may receive the data packet over the allocated PUSCH at time t4, the base station may determine/derive a time t3 when the first wireless device sending the data packet based on at least one of: the synchronization between the first wireless device and the base station, the DCI and/or the C-RNTI. In an example, the base station may determine/derive uplink one way delay/latency between the first wireless device and the base station by subtracting t3 from t4.

In an example, the base station may take similar actions as describe above to measure uplink one way delay/latency and/or downlink one way delay/latency between the base station and the second wireless device. In an example, the base station may calculate the end to end latency between the first wireless device and the second wireless device. For example, the base station may calculate uplink one way delay/latency between the first wireless device and the second wireless device by adding [the uplink one way delay/latency between the first wireless device and the base station] to [the downlink one way delay/latency between the second wireless device and the base station]. For example, the base station may calculate downlink one way delay/latency between the first wireless device and the second wireless device by adding [the downlink one way delay/latency between the first wireless device and the base station] to [the uplink one way delay/latency between the second wireless device and the base station].

In an example, the base station may send [the uplink one way delay/latency between the first wireless device and the second wireless device] and/or [the downlink one way delay/latency between the first wireless device and the second wireless device] to the first wireless device and/or the second wireless device. In an example, the base station may send the [the uplink one way delay/latency between the first wireless device and the base station] and/or [the downlink one way delay/latency between the first wireless device and the base station] to the first wireless device. In an example, the base station may send the [the uplink one way delay/latency between the second wireless device and the base station] and/or [the downlink one way delay/latency between the second wireless device and the base station] to the second wireless device.

Figure 25:
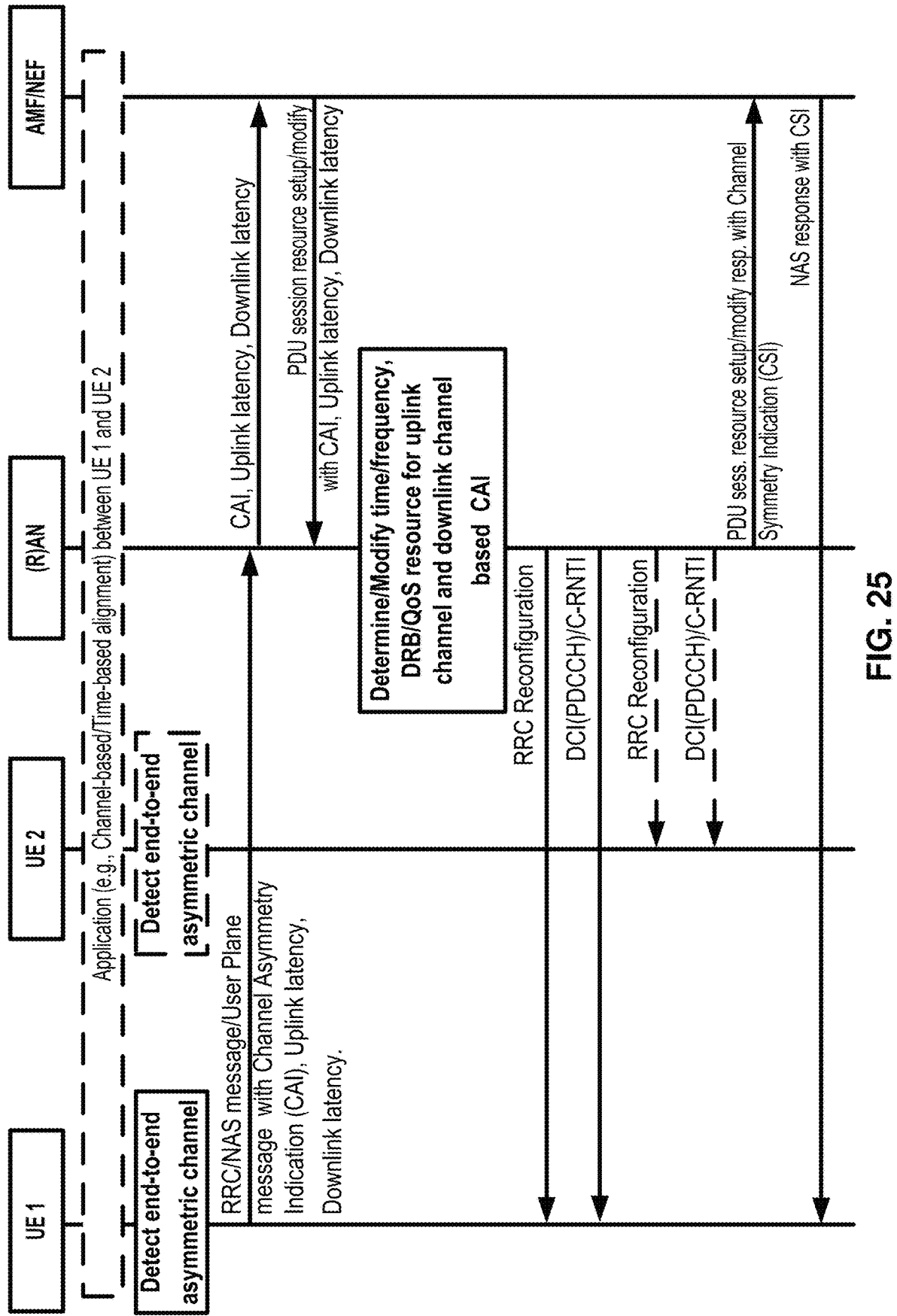
FIG. 25 is an example call flow as per an aspect of an embodiment of the present disclosure.

FIG. 25 is an example call flow which may comprise one or more actions. In an example, a first wireless device (e.g., UE 1) may establish a first PDU session with a first network. The first network may comprise a communication system (e.g., 5G, 6G). In an example, the first network may comprise at least one network function: a base station (e.g., (R)AN), an AMF, an SMF, a UPF, a PCF, and/or the like. In an example, a second wireless device may establish a second PDU session with the first network and/or a second network. The second network may comprise at least one network function: a base station (e.g., (R)AN), an AMF, an SMF, a UPF, a PCF, and/or the like. In an example, the first network and/or the second network may comprise at least one network function: a control plane function (CPF) (e.g., AMF, SMF), a local gate way (e.g., L-GW), and/or a local user plane function (L-UPF). In an example, a first application (e.g., line current differential protection, game) may run in the first wireless device, and a second application (e.g., line current differential protection, game) may run in the second wireless device. In an example, the first application may be associated with the second application. For example, the first application (e.g., line current differential protection) and the second application (e.g., line current differential protection) may be used together to protect a same power equipment/power line. For example, the first application (e.g., game) and the second application (e.g., game) may be used together for a same game and played by two users via the network. In an example, a time-based alignment method, and/or a channel-based alignment method may be used for the line current differential protection for the first wireless device and/or the second wireless device.

In an example, the first wireless device may communicate with the second wireless device over the first PDU session and/or the second PDU session. In an example, the first PDU session may be between the first wireless device and a core network function (e.g., AMF, SMF, UPF). In an example, the second PDU session may be between the second wireless device and a second core network function (e.g., AMF, SMF, UPF). In an example, the second core network function may be the same core network function accessed by the first wireless device, or a different core network function.

In an example, the first wireless device may send/receive user data packet of the first application via control plane signaling. In an example, the second wireless device may send/receive user data packet of the second application via control plane signaling. For example, the user data packet may be sent from the first wireless device to an AMF in a NAS message, rather than a user plane. In an example, the AMF may be co-located with an NEF. In an example, the first wireless device may send user data packet to the second wireless device via the base station, the AMF/NEF, and/or the base station. In an example, the first wireless device may send user data packet to the second wireless device via the base station, a first AMF, an NEF, a second AMF, and/or a second base station. In an example, the communication channel/path between the first application/UE 1 and the second application/UE 2 may be symmetric.

In an example, the first wireless device and/or the second wireless device may detect that the communication channel/path between a first network function and a second network function is asymmetric. For example, the first wireless device and/or the second wireless device may detect that the communication channel/path between the first wireless device and the second wireless device is asymmetric. For example, the first wireless device may detect that the communication channel/path between the first wireless device and the AMF/NEF is asymmetric. In an example, the communication channel/path is asymmetric (or an asymmetric communication channel/path) may indicate that end to end latency of the unlink communication channel/path (e.g., a latency A from UE 1 to UE 2) does not equal to the end to end latency of the downlink communication channel/path (e.g., a latency B from UE 2 to UE 1). In an example, the unlink communication channel/path and the downlink communication channel/path are asymmetric may indicate that the difference between [the end to end latency of the unlink communication channel/path] and [the end to end latency of the downlink communication channel/path] may be greater than a value (e.g., 2 ms). In an example, the base station, the first wireless device and/or the second wireless device may detect/measure one way delay (OWD)/one way latency and/or asymmetric communication channel by using a method as described in FIG. 20. In an example, the one way delay (OWD)/one way latency may be a length of the time that a packet takes from point A (e.g., network element (NE) 1) to point B (e.g., NE 2) inside a network or across at least one network.

In an example, in response to detecting the asymmetric communication channel/path, the first wireless device/second wireless device may send a first message to the AMF indicating an asymmetric channel between the first wireless device and a second wireless device. In an example, the first message may comprise a first parameter (e.g., Channel Asymmetry Indication (CAI)) indicating an asymmetric channel between the first wireless device and a second wireless device. For example, the first parameter/Channel Asymmetry Indication may indicate the communication channel/path between the first wireless device and the second wireless device is asymmetric. In an example, the first parameter/Channel Asymmetry Indication may indicate an asymmetric channel between the first wireless device and the AMF/NEF. For example, the first parameter/Channel Asymmetry Indication may indicate the communication channel/path between the first wireless device and the AMF/NEF is asymmetric.

In an example, the first message may comprise a second parameter (e.g., Uplink Channel Latency) indicating an end to end latency of uplink communication channel of the asymmetric channel. The definition/content of the second parameter/Uplink Channel Latency may be similar to the definition/content of the second parameter/Uplink Channel Latency as described in FIG. 19.

In an example, the first message may comprise a third parameter (e.g., Downlink Channel Latency) indicating an end to end latency of downlink communication channel of the asymmetric channel. The definition/content of the third parameter/Downlink Channel Latency may be similar to the definition/content of the third parameter/Downlink Channel Latency as described in FIG. 19.

In an example, the first message may comprise a fourth parameter (e.g., a Channel Symmetry Request (CSR)) indicating a request for symmetric communication channels between the first wireless device and the second wireless device. The definition/content of the fourth parameter/Channel Symmetry Request may be similar to the definition/content of the fourth parameter/Channel Symmetry Request as described in FIG. 19.

In an example, the first message may comprise an identity of the first wireless device and/or an identity of the second wireless device. The definition/content of the identity of the first wireless device/the identity of the second wireless device may be similar to the definition/content of the identity of the first wireless device/the identity of the second wireless device as described in FIG. 19.

In an example, the first message may comprise an identifier of a RRC connection, where the RRC connection may be associated with the asymmetric channel. For example, the asymmetric channel may comprise the RRC connection. In an example, the first message may comprise an identifier of a radio bearer, where the radio bearer may be associated with the asymmetric channel. For example, the asymmetric channel may comprise the radio bearer. In an example, the first message may comprise an identifier of a protocol data unit (PDU) session, where the PDU session may be associated with the asymmetric channel. For example, the asymmetric channel may comprise the PDU session. In an example, the first message may comprise an identifier of a network slice (e.g., S-NSSAI), where the network slice may be associated with the asymmetric channel. For example, the asymmetric channel may comprise the network slice. In an example, the first message may comprise an identifier of a QoS flow, where the QoS flow may be associated with the asymmetric channel. For example, the asymmetric channel may comprise the QoS flow. In an example, the first message may comprise an identifier of a service data flow (SDF), where the SDF may be associated with the asymmetric channel. For example, the asymmetric channel may comprise the SDF.

In an example, the first message may comprise a RRC message (e.g., RRCSetupComplete) and/or a NAS message (e.g., registration request). For example, the UE 1 may send a RRCSetupComplete message to the (R)AN, where the RRCSetupComplete message may comprise a registration request message. In an example, the (R)AN may forward the registration request message to the AMF/NEF. In an example, the registration request message may comprise at least one of: registration type, the identity of the first wireless device/UE identity (e.g., SUCI, SUPI and/or 5G-GUTI), last visited TAI (if available), security parameters, requested NSSAI, mapping of requested NSSAI, UE 5GC capability, PDU session status, PDU session(s) to be re-activated, Follow on request, MICO mode preference, and/or the like.

In response to the message received, the AMF may take one or more actions. In an example action, the AMF may send a second message (e.g., Initial Context Setup Request, PDU Session Resource Setup) to the base station. In an example, the second message may comprise one or more parameters of the first message. For example, the second message may comprise at least one of: the first parameter/Channel Asymmetry Indication, the second parameter/Uplink Channel Latency, the third parameter/Downlink Channel Latency, the fourth parameter/Channel Symmetry Request, the identity of the first wireless device, the identity of the second wireless device, the identifier of the RRC connection associate with the asymmetric channel, the identifier of the radio bearer associate with the asymmetric channel, the identifier of the PDU session associate with the asymmetric channel, the S-NSSAI associate with the asymmetric channel, the identifier of the QoS flow associate with the asymmetric channel, and/or the identifier of the service data flow associate with the asymmetric channel.

In an example, the second message may comprise at least one of: AMF UE NGAP ID, RAN UE NGAP ID, UE Aggregate Maximum Bit Rate, Core Network Assistance Information for RRC INACTIVE, GUAMI, PDU Session Resource Setup Request List (e.g., PDU session associated with the asymmetric channel), Allowed NSSAI, UE Security Capabilities, Security Key, Mobility Restriction List, Trace Activation, UE Radio Capability, Index to RAT/Frequency Selection Priority, Masked IMEISV, NAS-PDU, Emergency Fallback Indicator, RRC Inactive Transition Report Request, UE Radio Capability for Paging, Enhanced Coverage Restriction, UE Differentiation Information, NR V2X Services Authorized, UE User Plane CIoT Support Indicator, and/or UE Radio Capability ID.

In an example, in response to the message received, the base station may take one or more actions. In an example action, the base station may determine to modify/change the asymmetric channel to symmetric communication channel based on at least one of: the second message; capability of the network/base station supporting symmetric communication channel; resource of the base station; local policy; and/or subscription information of the first wireless device. In an example, the base station may take similar action to modify/change the asymmetric channel to symmetric communication channel as described in FIG. 19.

In an example action, the base station may determine to modify radio resource configuration of a bearer associated with the asymmetric channel, based on at least one of: the second message; capability of the base station supporting symmetric communication channel; resource of the base station; local policy; and/or subscription information of the first wireless device. In an example, the base station may take similar action to modify/change radio resource configuration of a bearer associated with the asymmetric channel as described in FIG. 19.

In an example, based on the second message (e.g., the identifier of the RRC connection), the base station may determine the asymmetric channel is associated with the RRC connection for the first wireless device. In an example, based on the second message (e.g., the identifier of the radio bearer), the base station may determine the asymmetric channel is associated with the radio bearer for the first wireless device, wherein the radio bearer may comprise a data radio bearer and/or a signaling radio bearer. In an example, based on the second message (e.g., the identifier of the network slice, S-NSSAI), the base station may determine the asymmetric channel is associated with the network slice for the first wireless device, wherein the network slice may be associated with a PDU session. In an example, based on the second message (e.g., the identifier of the QoS flow), the base station may determine the asymmetric channel is associated with the QoS flow for the first wireless device, wherein the QoS flow may be associated with a PDU session. In an example, based on the second message (e.g., the identifier of the service data flow), the base station may determine the asymmetric channel is associated with the service data flow for the first wireless device, wherein the service data flow may be associated with a PDU session. In an example, based on the second message (e.g., the identifier of the PDU session), the base station may determine asymmetric channel is associated with the PDU session for the first wireless device, wherein the PDU session may be associated with at least one radio bearer, wherein the at least one radio bearer may comprise at least one data radio bearer and/or at least one signaling radio bearer.

In an example action, the base station may determine to modify/change time/frequency/space/power resources associated with the asymmetric channel to enable a symmetric uplink communication channel and downlink communication channel, based on at least one of: the second message; capability of the base station supporting symmetric communication channel; resource of the base station; local policy; and/or subscription information of the first wireless device. In an example, the base station may take similar action to modify/change time/frequency/space/power resources associated with the asymmetric channel as described in FIG. 19.

In an example action, the base station may determine to modify/change QoS resource associated with the asymmetric channel to enable a symmetric uplink communication channel and downlink communication channel, based on at least one of: the second message; capability of the base station supporting symmetric communication channel; resource of the base station; local policy; and/or subscription information of the first wireless device. In an example, the base station may take similar action to modify/change QoS resource associated with the asymmetric channel as described in FIG. 19.

In an example action, the base station may determine to modify/change radio bearer configuration information associated with the asymmetric channel to enable a symmetric uplink communication channel and downlink communication channel, based on at least one of: the second message; capability of the base station supporting symmetric communication channel; resource of the base station; local policy; and/or subscription information of the first wireless device. In an example, the base station may take similar action to modify/change radio bearer configuration information associated with the asymmetric channel as described in FIG. 19.

In an example action, the base station may send a third message to the first wireless device/second wireless device. In an example, the third message may indicate modifying/changing the asymmetric channel to symmetric communication channel. In an example, the third message may indicate modifying/changing radio resource configuration of a bearer associated with the asymmetric channel. In an example, the third message may indicate modifying/changing time/frequency/space/power resources associated with the asymmetric channel. In an example, the third message may indicate modifying/changing QoS resource associated with the asymmetric channel. For example, the third message may comprise updated/new QoS parameters to modify/change the QoS resource associated with the asymmetric channel. In an example, the third message (e.g., updated/new radio bearer configuration information) may indicate modifying/changing radio bearer configuration information associated with the asymmetric channel. In an example, to indicate modifying/changing the RRC connection, the PDU session, the network slice, the QoS flow and/or the service data flow associated with the asymmetric channel to symmetric communication channel, the third message may comprise an identifier of the PDU session, an identifier of the network slice (e.g., S-NSSAI), an identifier of the QoS flow, and/or an identifier of the service data flow.

In an example action, the base station may determine a fifth parameter (e.g., Channel Symmetry Indication (CSI)) indicating that the base station has modified the asymmetric channel. In an example, the fifth parameter/Channel Symmetry Indication may indicate the base station provides (updated) symmetric communication channel between the first wireless device and the second wireless device. In an example, the fifth parameter/Channel Symmetry Indication may indicate the base station provides (updated) symmetric communication channel between the first wireless device and the base station.

In an example, the third message may comprise the fifth parameter/Channel Symmetry Indication. In an example, the third message may comprise a RRC (e.g., RRCCongfiguration) message, wherein the RRCCongfiguration message may comprise one or more parameters to modify/adjust the radio bearer/QoS resources associated with the asymmetric channel. In an example, the RRCCongfiguration message comprises one or more parameters to modify/adjust the time/frequency/space/power resources associated with the asymmetric channel. In an example, the third message may comprise a Downlink Control Information (DCI), and/or a Cell Radio Network Temporary Identifier (C-RNTI). In an example, the DCI may indicate (updated/new) time and/or frequency resource associated with the asymmetry channel.

In an example, the C-RNTI may indicate a RRC connection and scheduling, wherein the RRC connection and scheduling may be associated with the asymmetry channel.

In an example action, the base station may send a response message (e.g., Initial Context Setup Response, PDU Session Resource Setup Response) message to the AMF indicating the network/base station provides (updated) symmetric communication channel between the first wireless device and the second wireless device. For example, the response message may indicate the network/base station provides (updated) symmetric communication channel between the first wireless device and the base station. In an example, the response message may comprise the fifth parameter/Channel Symmetry Indication. In an example, the response message may comprise at least one of the following parameters associated with the asymmetric channel: parameter(s) for radio bearer configuration, parameter(s) for MAC configuration, parameter(s) for PDCP configuration, parameter(s) for RRC configuration, and/or parameter(s) for physical layer configuration. In an example, the response message may comprise at least one of: AMF UE NGAP ID, RAN UE NGAP ID, PDU Session Resource Setup Response List, PDU Session Resource Failed to Setup List, and/or Criticality Diagnostics. In an example, the Criticality Diagnostics IE may be sent by the (R)AN or the AMF when parts of a received message have not been comprehended or were missing, or if the message contained logical errors.

In response to the message received, based on at least one of: one or more parameters of the first message; one or more parameters of the response message; capability of the network (e.g., AMF, base station, NEF) supporting symmetric communication channel; resource of the network; local policy; and/or subscription information of the first wireless device, the AMF may determine whether to accept the request of modifying the asymmetric channel to the symmetric communication channel between the first wireless device and the second wireless device. In an example, the AMF may send a fourth message to the first wireless device/second wireless device. In an example, the fourth message may comprise a NAS message (e.g., registration accept). In an example, the fourth message may indicate that the network has modified/changed the asymmetric channel to symmetric communication channels. In an example, the fourth message may indicate the network/base station provides (updated) symmetric communication channel between the first wireless device and the second wireless device. In an example, the fourth message may indicate the network/base station provides (updated) symmetric communication channel between the first wireless device and the base station. In an example, the fourth message may comprise the fifth parameter/Channel Symmetry Indication.

In an example, in response to the message received (from the base station and/or the AMF), the first wireless device may take one or more actions as described in FIG. 19. For example, based on the third message and/or the fourth message, the first wireless device may modify the RRC connection associated with the asymmetric channel. For example, based on the third message and/or the fourth message, the first wireless device may modify the PDU session associated with the asymmetric channel. For example, based on the third message and/or the fourth message, the first wireless device may modify the network slice associated with the asymmetric channel. For example, based on the third message and/or the fourth message, the first wireless device may modify the QoS flow associated with the asymmetric channel. For example, based on the third message and/or the fourth message, the first wireless device may modify the service data flow associated with the asymmetric channel.

FIG. 26 is an example call flow which may comprise one or more actions. In an example, a first wireless device (e.g., UE 1) may establish a first PDU session with a first network. The first network may comprise a communication system (e.g., 5G, 6G). In an example, the first network may comprise at least one network function: a base station (e.g., (R)AN), an AMF, an SMF, a UPF, a PCF, and/or the like. In an example, a second wireless device may establish a second PDU session with the first network and/or a second network. The second network may comprise at least one network function: a base station (e.g., (R)AN), an AMF, an SMF, a UPF, a PCF, and/or the like. In an example, a first application (e.g., line current differential protection, game) may run in the first wireless device, and a second application (e.g., line current differential protection, game) may run in the second wireless device. In an example, the first application may be associated with the second application. For example, the first application (e.g., line current differential protection) and the second application (e.g., line current differential protection) may be used together to protect a same power equipment/power line. For example, the first application (e.g., game) and the second application (e.g., game) may be used for a same game and played by two users via the network. In an example, a time-based alignment method, and/or a channel-based alignment method may be used for the line current differential protection for the first wireless device and/or the second wireless device.

In an example, the first wireless device may communicate with the second wireless device over the first PDU session and/or the second PDU session. In an example, the first PDU session may be between the first wireless device and a core network function (e.g., AMF, SMF, UPF/NEF) of the first network. In an example, the second PDU session may be between the second wireless device and a second core network function (e.g., AMF, SMF, UPF/NEF) of the second network. In an example, the second core network function may be the same core network function accessed by the first wireless device. In an example, the second core network function may be different from the first core network function.

In an example, the first wireless device may send/receive user data packet of the first application via control plane signaling. In an example, the second wireless device may send/receive user data packet of the second application via control plane signaling. For example, the user data packet may be sent from the first wireless device to an SMF in a NAS message, rather than a user plane. In an example, the SMF may be co-located with an NEF. For example, the first wireless device may send user data to the second wireless device via a base station, an AMF, the SMF, an NEF, the SMF, the AMF, and/or the base station. In an example, the first wireless device may send user data to the second wireless device via a first base station, a first AMF, a first SMF, an NEF, a second SMF, a second AMF, and/or a second base station. In an example, the communication channel/path between the first application/UE 1 and the second application/UE 2 may be symmetric.

In an example, the first wireless device and/or the second wireless device may detect that the communication channel/path between a first network function and a second network function is asymmetric. For example, the first wireless device and/or the second wireless device may detect that the communication channel/path between the first wireless device and the second wireless device is asymmetric. For example, the first wireless device may detect that the communication channel/path between the first wireless device and the UPF/NEF is asymmetric. In an example, the communication channel/path is asymmetric (or an asymmetric communication channel/path) may indicate that end to end latency of the unlink communication channel/path (e.g., a latency A from UE 1 to UE 2) does not equal to the end to end latency of the downlink communication channel/path (e.g., a latency B from UE 2 to UE 1). In an example, the unlink communication channel/path and the downlink communication channel/path are asymmetric may indicate that the difference between [the end to end latency of the unlink communication channel/path] and [the end to end latency of the downlink communication channel/path] may be greater than a value (e.g., 2 ms). In an example, the base station, the first wireless device and/or the second wireless device may detect/measure one way delay (OWD)/one way latency and/or asymmetric communication channel by using a method as described in FIG. 20. In an example, the one way delay (OWD)/one way latency may be a length of the time that a packet takes from point A (e.g., network element (NE) 1) to point B (e.g., NE 2) inside a network or across at least one network.

In an example, in response to detecting the asymmetric communication channel/path, the first wireless device/second wireless device may send a first message to a network function indicating an asymmetric channel between the first wireless device and a second wireless device. In an example, the first message may indicate that an asymmetric channel between the first wireless device and an SMF/UPF/NEF. In an example, the network function may comprise an SMF, a NEF, and/or the like. In an example, the first message may comprise a first parameter (e.g., Channel Asymmetry Indication (CAI)) indicating an asymmetric channel between the first wireless device and a second wireless device. For example, the first parameter/Channel Asymmetry Indication may indicate the communication channel/path between the first wireless device and the second wireless device is asymmetric. In an example, the first parameter/Channel Asymmetry Indication may indicate an asymmetric channel between the first wireless device and the SMF/UPF/NEF. For example, the first parameter/Channel Asymmetry Indication may indicate the communication channel/path between the first wireless device and the SMF/UPF/NEF is asymmetric.

In an example, the first message may comprise a second parameter (e.g., Uplink Channel Latency) indicating an end to end latency of uplink communication channel of the asymmetric channel. The definition/content of the second parameter/Uplink Channel Latency may be similar to the definition/content of the second parameter/Uplink Channel Latency as described in FIG. 19. In an example, the second parameter/Uplink Channel Latency may indicate an end to end latency of uplink communication channel between the first wireless device and the SMF/UPF/NEF.

In an example, the first message may comprise a third parameter (e.g., Downlink Channel Latency) indicating an end to end latency of downlink communication channel of the asymmetric channel. The definition/content of the third parameter/Downlink Channel Latency may be similar to the definition/content of the third parameter/Downlink Channel Latency as described in FIG. 19. In an example, the third parameter/Downlink Channel Latency may indicate an end to end latency of downlink communication channel between the first wireless device and the SMF/UPF/NEF.

In an example, the first message may comprise a fourth parameter (e.g., a Channel Symmetry Request (CSR)) indicating a request for symmetric communication channels between the first wireless device and the second wireless device. The definition/content of the fourth parameter/Channel Symmetry Request may be similar to the definition/content of the fourth parameter/Channel Symmetry Request as described in FIG. 19. In an example, the fourth parameter/Channel Symmetry Request may indicate a request for symmetric communication channels between the first wireless device and the SMF/UPF/NEF.

In an example, the first message may comprise an identity of the first wireless device and/or an identity of the second wireless device. The definition/content of the identity of the first wireless device/the identity of the second wireless device may be similar to the definition/content of the identity of the first wireless device/the identity of the second wireless device as described in FIG. 19.

In an example, the first message may comprise an identifier of a RRC connection, where the RRC connection may be associated with the asymmetric channel. For example, the asymmetric channel may comprise the RRC connection. In an example, the first message may comprise an identifier of a radio bearer, where the radio bearer may be associated with the asymmetric channel. For example, the asymmetric channel may comprise the radio bearer. In an example, the first message may comprise an identifier of a protocol data unit (PDU) session, where the PDU session may be associated with the asymmetric channel. For example, the asymmetric channel may comprise the PDU session. In an example, the first message may comprise an identifier of a network slice (e.g., S-NSSAI), where the network slice may be associated with the asymmetric channel. For example, the asymmetric channel may comprise the network slice. In an example, the first message may comprise an identifier of a QoS flow, where the QoS flow may be associated with the asymmetric channel. For example, the asymmetric channel may comprise the QoS flow. In an example, the first message may comprise an identifier of a service data flow (SDF), where the SDF may be associated with the asymmetric channel. For example, the asymmetric channel may comprise the SDF.

In an example, the first message may comprise a RRC message (e.g., ULInformationTransfer) and/or a NAS message (e.g., PDU Session Establishment/Modification Request). In an example, the ULInformationTransfer message and/or the PDU Session Establishment/Modification Request message may comprise one or more parameters of the first message as described above. For example, the UE 1 may send a ULInformationTransfer message to the (R)AN, where the ULInformationTransfer message may comprise a PDU Session Establishment/Modification Request message. In an example, the UE 1 may send the PDU Session Establishment/Modification Request message to the SMF via a base station (e.g., (R)AN) and/or an AMF. For example, the UE 1 may send a NAS message to the AMF. The NAS message may comprise at least one of: S-NSSAI (s), UE Requested DNN, PDU Session ID (s) (e.g., identity of a first PDU session, and/or the identity of a second PDU session), Request type, Old PDU Session ID, and/or a N1 SM container. In an example, the N1 SM container may comprise a PDU Session Establishment/Modification Request message and/or a Port Management Information Container. In an example, the PDU Session Establishment/Modification Request message may comprise at least one of: the first parameter/Channel Asymmetry Indication; the second parameter/Uplink Channel Latency; the third parameter/Downlink Channel Latency; the fourth parameter/Channel Symmetry Request; the identity of the first wireless device (e.g., UE 1); the identity of the second wireless device (e.g., UE 2); the identity of the first PDU session; and/or the identity of the second PDU session. In an example, the PDU Session Establishment/Modification Request message may comprise at least one of: PDU session ID (s), Requested PDU Session Type, a Requested SSC mode, 5GSM Capability, PCO, SM PDU DN Request Container, Number of Packet Filters, Header Compression Configuration, UE Integrity Protection Maximum Data Rate, Always-on PDU Session Requested, and/or the like.

In an example, in response to the message received, the AMF may select an SMF. The AMF may send a message (e.g., Nsmf_PDUSession_CreateSMContext Request/ Nsmf_PDUSession_UpdateSMContext Request) to the SMF. In an example, the Nsmf_PDUSession_CreateSM-Context Request/Nsmf_PDUSession_UpdateSMContext Request may comprise one or more parameters of the first message as described above. In an example, the Nsmf_P-DUSession_CreateSMContext Request/Nsmf_PDUSession_UpdateSMContext Request message may comprise at least one of: SUPI, selected DNN, UE requested DNN, S-NSSAI(s), PDU Session ID (s), AMF ID, Request Type, [PCF ID, Same PCF Selection Indication], Priority Access, [Small Data Rate Control Status], N1 SM container (PDU Session Establishment/Modification Request message), User location information, Access Type, RAT Type, PEI, GPSI, UE presence in LADN service area, Subscription For PDU Session Status Notification, DNN Selection Mode, Trace Requirements, Control Plane CIoT 5GS Optimisation indication, and/or Control Plane Only indicator.

In an example, in response to the message received, the SMF may take one or more actions. In an example action, the SMF may determine to modify/change the asymmetric channel to symmetric communication channel and/or the SMF may determine to modify/change QoS policy/param-eter associated with the asymmetric channel to enable a symmetric uplink communication channel and downlink communication channel, based on at least one of: one or more parameters of the first message; capability of the network (e.g., SMF, UPF, AMF, base station, NEF) support-ing symmetric communication channel; resource of the network; local policy; subscription information of the first wireless device.

For example, the first message may comprise the first parameter/Channel Asymmetry Indication requesting to modify/change the asymmetric channel to symmetric com-munication channel, the second parameter/Uplink Channel Latency may indicate 1 millisecond (ms) for uplink channel latency between the first wireless device and the second wireless device, the third parameter/Downlink Channel Latency may indicate 5 ms for downlink channel latency between the first wireless device and the second wireless device, the capability of the network supporting symmetric communication channel may indicate that the network sup-ports symmetric communication channel, the resource of the network may enable the SMF to modify/change the asym-metric channel to symmetric communication channel, the local policy and/or the subscription information of the first wireless device may allow the SMF to modify/change the asymmetric channel to symmetric communication channel, based on above information, the SMF may determine to modify/change QoS policy/parameter associated with the asymmetric channel to enable the symmetric communica-tion channel between the first wireless device and the second wireless device. For example, to enable the symmetric communication channel between the first wireless device and the second wireless device, the SMF may modify QoS policy/parameter of the first PDU session associated with the asymmetric channel and/or QoS policy/parameter of the second PDU session associated with the asymmetric channel to enable the symmetric communication channel between the first wireless device and the second wireless device. For example, the SMF may modify/change QoS policy/param-eter of a downlink QoS flow of the first PDU session associated with the asymmetric channel for the first wireless device and/or a uplink QoS flow of the second PDU session associated with the asymmetric channel for the second wireless device to decrease the downlink channel latency between the first wireless device and the second wireless device. For example, to enable the symmetric communica-tion channel between the first wireless device and the second wireless device, the SMF may modify an uplink service data flow of the first PDU session associated with the asymmetric channel for the first wireless device and/or a downlink service data flow of the first PDU session associated with the asymmetric channel for the second wireless device, to increase the uplink channel latency within an allowed range between the first wireless device and the second wireless device.

For example, the first message may comprise the first parameter/Channel Asymmetry Indication requesting to modify/change the asymmetric channel to symmetric com-munication channel, the second parameter/Uplink Channel Latency may indicate 2 ms for uplink channel latency between the first wireless device and a UPF, the third parameter/Downlink Channel Latency may indicate 5 ms for downlink channel latency between the first wireless device and the UPF, the capability of the network supporting symmetric communication channel may indicate that the network supports symmetric communication channel, the resource of the network may enable the SMF to modify/ change the asymmetric channel to symmetric communica-tion channel, the local policy and/or the subscription infor-mation of the first wireless device may allow the SMF to modify/change the asymmetric channel to symmetric com-munication channel, based on above information, the SMF may determine to modify/change QoS policy/parameter associated with the asymmetric channel to enable the sym-metric communication channel between the first wireless device and the UPF. For example, the SMF may determine to modify/change QoS policy/parameter associated with the asymmetric channel to enable the symmetric communica-tion channel between the first wireless device and the UPF. For example, to enable the symmetric communication chan-nel between the first wireless device and the UPF, the SMF may modify/change QoS policy/parameter of the first PDU session associated with the asymmetric channel to enable the symmetric communication channel between the first wire-less device and the UPF. For example, the SMF may modify/change QoS policy/parameter of a downlink QoS flow of the first PDU session associated with the asymmetric channel for the first wireless device to decrease the downlink channel latency between the first wireless device and the UPF. For example, to enable the symmetric communication channel between the first wireless device and the UPF, the SMF may modify an uplink service data flow of the first PDU session associated with the asymmetric channel for the first wireless device, to increase the uplink channel latency within an allowed range between the first wireless device and the UPF.

In an example, the SMF may modify existing QoS policy/ parameters associated with the asymmetric channel. In an example, the SMF may determine (new) QoS policy/param-eters applied to the asymmetric channel. In an example, the (existing/new) QoS policy/parameters determined by the SMF may be applied to uplink first PDU session and/or downlink first PDU session, wherein the uplink PDU session may be between the UE 1 and the core network 1 (e.g., UPF 1), and downlink PDU session may be between the core network 1 (e.g., UPF 1) and the UE 1. In an example, the (existing/new) QoS policy/parameters determined by the SMF may be applied to the first PDU session and/or the second PDU session between the UE 1 and the UE 2. To be simple, the terminology "QoS policy/parameters determined by the SMF" is exchangeable with the terminology "(existing/new) QoS policy/parameters determined by the SMF".

In an example, the first PDU session and/or the second PDU session may comprise at least one QoS flow and/or at least one service data flow. In an example, the QoS policy/parameters determined by the SMF may be applied to uplink of the at least one QoS flow and/or uplink of the at least one service data flow, and/or downlink of the at least one QoS flow and/or downlink of the at least one service data flow. In an example, the QoS policy/parameters determined by the SMF may be applied to the at least one QoS flow and/or at least one service data flow of the first PDU session, and/or the at least one QoS flow and/or at least one service data flow of the second PDU session, between the UE 1 and the UE 2.

In an example, the at least one service data flow (SDF) may be an aggregate set of packet flows carried through the UPF that matches a service data flow template. In an example, the service data flow template may be set of service data flow filters in a PCC Rule or an application identifier in a PCC rule referring to an application detection filter in the SMF and/or in the UPF, required for defining a service data flow. In an example, the service data flow filter may be a set of packet flow header parameter values/ranges used to identify one or more of the packet flows in the UPF. In an example, a QoS Flow may be the finest granularity of QoS differentiation in the PDU Session. A QoS flow may be similar to a bearer in 4G/LTE. A QoS Flow ID (QFI) may be used to identify a QoS Flow in the 5G System. User Plane traffic with the same QFI within a PDU Session may receive the same traffic forwarding treatment (e.g., scheduling, admission threshold). The QFI may be carried in an encapsulation header on N3 interface (and/or N9 interface) e.g., without any changes to the e2e packet header. QFI may be used for all PDU Session Types. The QFI may be unique within a PDU Session. The QFI may be dynamically assigned or may be equal to the 5QI. Within the 5GS, a QoS Flow may be controlled by the SMF and may be preconfigured, or established via the PDU Session Establishment procedure, or the PDU Session Modification procedure.

In an example, the QoS policy/parameters determined by the SMF may comprise at least one PCC rule for the end to end latency measurement and/or the symmetric communication channels for the first wireless device. In an example, the at least one PCC rule may comprise at least one of: at least one charging control rule; at least one policy control rule; at least one usage monitoring control rule; at least one application detection and control rule; at least one traffic steering control rule; and/or at least one service data flow detection information (e.g., service data flow template). In an example, the at least one policy control rule may comprise at least one QoS control rule and/or at least one gating control rule. In an example, the at least one charging control rule may comprise at least one of: an information element indicating a charging method/charging type; an information element indicating at least one charging rate; and/or an information element indicating at least one identifier or address of a CHF. In an example, the charging method/charging type may comprise at least one of: online charging, offline charging, and/or converged charging.

In an example, the at least one policy control rule may be used for policy control, the at least one QoS control rule may be used for QoS control, and the at least one gating control rule may be used for gating control. In an example, the at least one QoS control rule may be used to authorize QoS on a service data flow and/or a QoS flow. In an example, the at least one gating control rule may be used to discard packets that don't match service data flow of the gating control rule and/or associated PCC rules. In an example, the at least one usage monitoring control rule may be used to monitor, both volume and time usage, and report the accumulated usage of network resources. In an example, the at least one application detection and control rule may comprise a request to detect a specified application traffic, report to a PCF on a start or stop of application traffic and to apply a specified enforcement and charging actions. In an example, the at least one traffic steering control rule may be used to activate/deactivate traffic steering policies for steering a subscriber's traffic to appropriate operator or 3rd party service functions (e.g., NAT, antimalware, parental control, DDoS protection) in an (S)Gi-LAN. In an example, the service data flow detection information (e.g., service data flow template) may comprise a list of service data flow filters or an application identifier that references the corresponding application detection filter for the detection of the service data flow. In an example, the service data flow detection information (e.g., service data flow template) may comprise combination of traffic patterns of the Ethernet PDU traffic.

In an example, the QoS policy/parameters determined by the SMF may comprise at least one of: 5QI/QCI, ARP, RQA, GFBR, MFBR and/or maximum packet loss rate as described in FIG. 8. In an example, the QoS policy/parameters determined by the SMF may comprise a QoS class identifier (QCI). The QCI may be a scalar that is used as a reference to a specific packet forwarding behavior (e.g., packet loss rate, packet delay budget) to be provided to an SDF. This may be implemented in the access network by the QCI referencing node specific parameters that control packet forwarding treatment (e.g., scheduling weights, admission thresholds, queue management thresholds, link layer protocol configuration, etc.), that have been pre-configured by the operator at a specific node(s) (e.g., base station).

In an example action, the SMF may send a message (e.g., Nsmf_PDUSession_CreateSMContext Response/Namf_Communication_N1N2MessageTransfer) to the AMF. In an example, the Nsmf_PDUSession_CreateSMContext Response/Namf_Communication_N1N2MessageTransfer message may comprise one or more parameters of the first message and/or the QoS policy/parameter determined by the SMF. In an example, the Nsmf_PDUSession_CreateSMContext Response/Namf_Communication_N1N2MessageTransfer message may comprise at least one of: the first parameter/Channel Asymmetry Indication; the second parameter/Uplink Channel Latency; the third parameter/Downlink Channel Latency; the fourth parameter/Channel Symmetry Request; the identity of the first wireless device; the identity of the second wireless device; the identity of the first PDU session; and/or the identity of the second PDU session. In an example, the Nsmf_PDUSession_CreateSMContext Response/Namf_Communication_N1N2MessageTransfer message may comprise at least one of: Cause, SM Context ID and/or a N1 SM container, wherein the N1 SM container may comprise a PDU Session Reject message. In an example, the PDU Session Reject message may comprise a cause value indicating the reject reason. In an example, the Nsmf_PDUSession_CreateSMContext Response/ Namf_Communication_N1N2MessageTransfer message may comprise N2 SM information, wherein the N2 SM information may comprise list of PDU session(s) associated with the asymmetric channel to be setup/modification by the base station. For example, the N2 SM information may comprise at least one of: PDU Session ID (s) associated with the asymmetric channel, QFI(s) associated with the asymmetric channel, QoS Profile(s) associated with the asymmetric channel (e.g., the QoS policy/parameters determined by the SMF), CN Tunnel Info, S-NSSAI from the Allowed NSSAI, Session-AMBR, PDU Session Type, User Plane Security Enforcement information, UE Integrity Protection Maximum Data Rate, RSN, and/or PDU Session Pair ID.

In response to the message received, the AMF may take one or more actions. In an example action, the AMF may send a second message (e.g., Initial Context Setup Request, PDU Session Resource Setup) to the base station. In an example, the second message may comprise one or more parameters of the Nsmf_PDUSession_CreateSMContext Response/Namf_Communication_N1N2MessageTransfer message. For example, the second message may comprise at least one of: the first parameter/Channel Asymmetry Indication, the second parameter/Uplink Channel Latency, the third parameter/Downlink Channel Latency, the fourth parameter/Channel Symmetry Request, the identity of the first wireless device, the identity of the second wireless device, the identifier of the RRC connection associate with the asymmetric channel, the identifier of the radio bearer associate with the asymmetric channel, the identifier(s) of the PDU session associate with the asymmetric channel, the S-NSSAI associate with the asymmetric channel, the identifier of the QoS flow associate with the asymmetric channel, and/or the identifier of the service data flow associate with the asymmetric channel.

In an example, the second message may comprise at least one of: AMF UE NGAP ID, RAN UE NGAP ID, UE Aggregate Maximum Bit Rate, Core Network Assistance Information for RRC INACTIVE, GUAMI, PDU Session Resource Setup Request List (e.g., PDU session associated with the asymmetric channel), Allowed NSSAI, UE Security Capabilities, Security Key, Mobility Restriction List, Trace Activation, UE Radio Capability, Index to RAT/Frequency Selection Priority, Masked IMEISV, NAS-PDU, Emergency Fallback Indicator, RRC Inactive Transition Report Request, UE Radio Capability for Paging, Enhanced Coverage Restriction, UE Differentiation Information, NR V2X Services Authorized, UE User Plane CIoT Support Indicator, and/or UE Radio Capability ID.

In an example, in response to the message received, the base station may take one or more actions. In an example action, the base station may determine to modify/change the asymmetric channel to symmetric communication channel based on at least one of: the second message; capability of the network/base station supporting symmetric communication channel; resource of the base station; local policy; and/or subscription information of the first wireless device. In an example, the base station may take similar action to modify/change the asymmetric channel to symmetric communication channel as described in FIG. 19.

In an example action, the base station may determine to modify radio resource configuration of a bearer associated with the asymmetric channel, based on at least one of: the second message; capability of the base station supporting symmetric communication channel; resource of the base station; local policy; and/or subscription information of the first wireless device. In an example, the base station may take similar action to modify/change radio resource configuration of a bearer associated with the asymmetric channel as described in FIG. 19.

In an example, based on the second message (e.g., the identifier of the RRC connection), the base station may determine the asymmetric channel is associated with the RRC connection for the first wireless device. In an example, based on the second message (e.g., the identifier of the radio bearer), the base station may determine the asymmetric channel is associated with the radio bearer for the first wireless device, wherein the radio bearer may comprise a data radio bearer and/or a signaling radio bearer. In an example, based on the second message (e.g., the identifier of the network slice, S-NSSAI), the base station may determine the asymmetric channel is associated with the network slice for the first wireless device, wherein the network slice may be associated with a PDU session. In an example, based on the second message (e.g., the identifier of the QoS flow), the base station may determine the asymmetric channel is associated with the QoS flow for the first wireless device, wherein the QoS flow may be associated with a PDU session. In an example, based on the second message (e.g., the identifier of the service data flow), the base station may determine the asymmetric channel is associated with the service data flow for the first wireless device, wherein the service data flow may be associated with a PDU session. In an example, based on the second message (e.g., the identifier of the PDU session), the base station may determine asymmetric channel is associated with the PDU session for the first wireless device, wherein the PDU session may be associated with at least one radio bearer, wherein the at least one radio bearer may comprise at least one data radio bearer and/or at least one signaling radio bearer.

In an example action, the base station may determine to modify/change time/frequency/space/power resources associated with the asymmetric channel to enable a symmetric uplink communication channel and downlink communication channel, based on at least one of: the second message; capability of the base station supporting symmetric communication channel; resource of the base station; local policy; and/or subscription information of the first wireless device. In an example, the base station may take similar action to modify/change time/frequency/space/power resources associated with the asymmetric channel as described in FIG. 19.

In an example action, the base station may determine to modify/change QoS resource associated with the asymmetric channel to enable a symmetric uplink communication channel and downlink communication channel, based on at least one of: the second message; capability of the base station supporting symmetric communication channel; resource of the base station; local policy; and/or subscription information of the first wireless device. In an example, the base station may take similar action to modify/change QoS resource associated with the asymmetric channel as described in FIG. 19.

In an example action, the base station may determine to modify/change radio bearer configuration information associated with the asymmetric channel to enable a symmetric uplink communication channel and downlink communication channel, based on at least one of: the second message; capability of the base station supporting symmetric communication channel; resource of the base station; local policy; and/or subscription information of the first wireless device. In an example, the base station may take similar action to modify/change radio bearer configuration information associated with the asymmetric channel as described in FIG. 19.

In an example action, the base station may send a third message to the first wireless device/second wireless device. In an example, the third message may indicate modifying/changing the asymmetric channel to symmetric communication channel. In an example, the third message may indicate modifying/changing radio resource configuration of a bearer associated with the asymmetric channel. In an example, the third message may indicate modifying/changing time/frequency/space/power resources associated with the asymmetric channel. In an example, the third message may indicate modifying/changing QoS resource associated with the asymmetric channel. For example, the third message may comprise updated/new QoS parameters to modify/change the QoS resource associated with the asymmetric channel. In an example, the third message (e.g., updated/new radio bearer configuration information) may indicate modifying/changing radio bearer configuration information associated with the asymmetric channel. In an example, to indicate modifying/changing the RRC connection, the PDU session, the network slice, the QoS flow and/or the service data flow associated with the asymmetric channel to symmetric communication channel, the third message may comprise an identifier of the PDU session, an identifier of the network slice (e.g., S-NSSAI), an identifier of the QoS flow, and/or an identifier of the service data flow.

In an example action, the base station may determine a fifth parameter (e.g., Channel Symmetry Indication (CSI)) indicating that the base station has modified the asymmetric channel. In an example, the fifth parameter/Channel Symmetry Indication may indicate the base station provides (updated) symmetric communication channel between the first wireless device and the second wireless device. In an example, the fifth parameter/Channel Symmetry Indication may indicate the base station provides (updated) symmetric communication channel between the first wireless device and the base station.

In an example, the third message may comprise the fifth parameter/Channel Symmetry Indication. In an example, the third message may comprise a RRC (e.g., RRCConfiguration) message, wherein the RRCConfiguration message may comprise one or more parameters to modify/adjust the radio bearer/QoS resources associated with the asymmetric channel. In an example, the RRCConfiguration message comprises one or more parameters to modify/adjust the time/frequency/space/power resources associated with the asymmetric channel. In an example, the third message may comprise a Downlink Control Information (DCI), and/or a Cell Radio Network Temporary Identifier (C-RNTI). In an example, the DCI may indicate (updated/new) time and/or frequency resource associated with the asymmetry channel. In an example, the C-RNTI may indicate a RRC connection and scheduling, wherein the RRC connection and scheduling may be associated with the asymmetry channel.

In an example action, the base station may send a response message (e.g., Initial Context Setup Response, PDU Session Resource Setup Response) message to the AMF indicating the network/base station provides (updated) symmetric communication channel between the first wireless device and the second wireless device. For example, the response message may indicate the network/base station provides (updated) symmetric communication channel between the first wireless device and the base station. In an example, the response message may comprise the fifth parameter/Channel Symmetry Indication. In an example, the response message may comprise at least one of the following parameters associated with the asymmetric channel: parameter(s) for radio bearer configuration, parameter(s) for MAC configuration, parameter(s) for PDCP configuration, parameter(s) for RRC configuration, and/or parameter(s) for physical layer configuration. In an example, the response message may comprise at least one of: AMF UE NGAP ID, RAN UE NGAP ID, PDU Session Resource Setup Response List, PDU Session Resource Failed to Setup List, and/or Criticality Diagnostics. In an example, the Criticality Diagnostics IE may be sent by the (R)AN or the AMF when parts of a received message have not been comprehended or were missing, or if the message contained logical errors.

In response to the message received, based on at least one of: one or more parameters of the Nsmf_PDUSession_CreateSMContext Response/Namf_Communication_N1N2MessageTransfer message; one or more parameters of the Initial Context Setup Response/PDU Session Resource Setup Response message; capability of the network (e.g., AMF, base station, NEF, SMF, UPF) supporting symmetric communication channel; resource of the network; local policy; and/or subscription information of the first wireless device, the AMF may determine whether to accept the request of modifying the asymmetric channel to the symmetric communication channel between the first wireless device and the second wireless device.

In an example, in response to the message received, the AMF may send a message (e.g., Nsmf_PDUSession_UpdateSMContext Request) to the SMF indicating network providing symmetric communication channel. In an example, the Nsmf_PDUSession_UpdateSMContext Request message may comprise at least one of: the fifth parameter/Channel Symmetry Indication, SM Context ID, N2 SM information and/or Request Type. In an example, the N2 SM information may comprise one or more IEs/parameters of the Initial Context Setup Response/PDU Session Resource Setup Response message.

In an example, in response to the message received, the SMF may take one or more actions. In an example action, the SMF may indicate the NEF/UPF to modify the asymmetric channel to symmetric communication channel based on at least one of the following: the message received from the AMF (e.g., the fifth parameter/Channel Symmetry Indication); the SMF determining to modify/change the asymmetric channel to symmetric communication channel; the SMF determining to modify/change QoS policy/parameter associated with the asymmetric channel to enable a symmetric uplink communication channel and downlink communication channel; one or more parameters of the first message; capability of the network (e.g., SMF, UPF, AMF, base station, NEF) supporting symmetric communication channel; resource of the network; local policy; and/or the subscription information of the first wireless device. For example, the SMF may send a message (e.g., Modify Asymmetric Channel Request) to the NEF requesting modify/change QoS policy/parameter associated with the asymmetric channel to enable a symmetric uplink communication channel and downlink communication channel. The Modify Asymmetric Channel Request message may comprise at least one of: the QoS policy/parameters (determined by the SMF) associated with the asymmetric channel; the identity of the first wireless device (e.g., UE 1); the identity of the second wireless device (e.g., UE 2); the identity of the first PDU session; and/or the identity of the second PDU session.

In an example action, the SMF may determine to modify/change at least one user plane rule associated with the asymmetric channels, based on at least one of: the message received from the AMF (e.g., the fifth parameter/Channel Symmetry Indication); the SMF determining to modify/ change the asymmetric channel to symmetric communication channel; the SMF determining to modify/change QoS policy/parameter associated with the asymmetric channel to enable a symmetric uplink communication channel and downlink communication channel; one or more parameters of the first message; capability of the network (e.g., SMF, UPF, AMF, base station, NEF) supporting symmetric communication channel; resource of the network; local policy; subscription information of the first wireless device; the QoS policy/parameters determined by the SMF; the identity of the first wireless device (e.g., UE 1); the identity of the second wireless device (e.g., UE 2); the identity of the first PDU session; and/or the identity of the second PDU session. For example, the SMF may modify at least one existing user plane rule associated with the asymmetric channel. For example, the SMF may determine at least one new user plane rule associated with the asymmetric channel.

In an example, the at least one (existing/new) user plane rule associated with the asymmetric channel may comprise at least one of: the QoS policy/parameters determined by the SMF; the first parameter/Channel Asymmetry Indication; the second parameter/Uplink Channel Latency; the third parameter/Downlink Channel Latency; the fourth parameter/Channel Symmetry Request; the fifth parameter/Channel Symmetry Indication; the identity of the first wireless device (e.g., UE 1); the identity of the second wireless device (e.g., UE 2); the identity of the first PDU session; and/or the identity of the second PDU session.

In an example, the at least one (existing/new) user plane rule may comprise at least one of: at least one packet detection rule; at least one forwarding action rule; at least one QoS enforcement rule; and/or at least one usage reporting rule. In an example, the at least one packet detection rule may comprise data/traffic packet detection information, e.g., one or more match fields against which incoming packets are matched and may apply other user plane rules (e.g., at least one forwarding action rule, at least one QoS enforcement rule, and/or at least one usage reporting rule) to the data/traffic packets matching the packet detection rule. In an example, the at least one forwarding action rule may comprise an apply action parameter, which may indicate whether a UP function may forward, duplicate, drop or buffer the data/traffic packet respectively. In an example, the at least one usage reporting rule may be used to measure the network resources usage in terms of traffic data volume, duration (e.g., time) and/or events, according to a measurement method in the usage reporting rule. In an example, the event may indicate a start of service and/or a stop of service. In an example, the at least one QoS enforcement rule may comprise instructions to request the UPF to perform QoS enforcement of the user plane traffic. For example, the at least one QoS enforcement rule may comprise the QoS policy/parameters determined by the SMF.

In an example, the SMF may determine a packet detection rule based on the service data flow detection information (e.g., service data flow template). In an example, the SMF may determine a forwarding action rule based on the policy control rule. In an example, the SMF may determine a usage reporting rule based on the usage monitoring control rule.

In an example action, the SMF may send to the UPF a message (e.g., N4 session establishment/modification request) comprising the at least one (existing/new) user plane rule. In response to receiving the message from the SMF, the UPF may install the at least one (existing/new)

user plane rule received from the SMF. The UPF may send to the SMF a response message (e.g., N4 session establishment/modification response), and enforce the at least one (existing/new) user plane rule.

In an example, in response to the message received, the UPF may take one or more actions based on the at least one (existing/new) user plane rule. In an example action, the UPF may allocate resources for the at least one (existing/new) user plane rule associated with the asymmetric channel. In an example action, the UPF may schedule uplink and/or downlink data packet to modify/change the asymmetric channel to symmetric communication channels.

In an example action, the UPF may enforce the at least one user plane rule. For example, the UPF may enforce the at least one packet detection rule by matching a user data/traffic packet with service data flow template (e.g., service data flow filters and/or application identifiers) and may apply other user plane rules (e.g., forwarding action rule, QoS enforcement rule, and usage reporting rule) to the data/traffic packets matched the packet detection rule. In an example, the UPF may enforce the at least one forwarding action rule by forwarding, duplicating, dropping or buffering a data/traffic packet respectively. In an example, the UPF may redirect the traffic to a web portal of the operator. In an example, the UPF may enforce the at least one usage reporting rule by measuring network resources usage in terms of traffic data volume, duration (e.g., time) and/or events, according to a measurement method in the usage reporting rule; the UPF may report the network resources usage to the SMF when the quota/threshold reached, and/or event and/or another trigger is (are) met.

In an example, the UPF may enforce the at least one QoS enforcement rule by applying at least one of QoS parameters: 5QI, ARP, MBR, GBR to a service data flow; In an example, the UPF may enforce the at least one QoS enforcement rule by applying at least one of QoS parameters: Session AMBR and default 5QI/ARP combination to a PDU session. In an example, the UPF may enforce the at least one QoS enforcement rule to modify/change the asymmetric channel to symmetric communication channels. For example, the first parameter/Channel Asymmetry Indication requesting to modify/change the asymmetric channel to symmetric communication channel, the second parameter/ Uplink Channel Latency may indicate 2 ms for uplink channel latency between the first wireless device and the second wireless device/UPF, the third parameter/Downlink Channel Latency may indicate 5 ms for downlink channel latency between the first wireless device and the second wireless device/UPF, the fourth parameter/Channel Symmetry Request may indicate requesting symmetric communication channels, based on above information, the UPF may modify the scheduling of downlink user data packet to decrease the downlink one way delay/latency between the first wireless and the second wireless device/UPF. The UPF may modify the scheduling of uplink user data packet to increase the uplink one way delay/latency in an allowed range between the first wireless and the second wireless device/UPF.

In an example action, in response to the message received from the UE, the SMF may send a NAS response message (e.g., PDU session establishment/modification response) to the wireless device. In an example, the PDU session establishment/modification response message (e.g., PDU Session Establishment/Modification Accept) may indicate accepting the request of modifying the asymmetric channel to symmetric communication channels.

In an example, the PDU session establishment/modification response message may indicate that the network has modified/changed the asymmetric channel to symmetric communication channel. In an example, the PDU session establishment/modification response message may indicate the network provides (updated) symmetric communication channel between the first wireless device and the second wireless device. In an example, the PDU session establishment/modification response message may indicate the network provides (updated) symmetric communication channel between the first wireless device and the UPF/NEF. In an example, the PDU session establishment/modification response message may comprise the fifth parameter/Channel Symmetry Indication and/or the QoS policy/parameters determined by the SMF.

In an example, the SMF may send the NAS response message to the wireless device via the AMF and/or the base station. For example, the SMF may send a Namf_Communication_N1N2MessageTransfer message to the AMF. In an example, the Namf_Communication_N1N2MessageTransfer message may comprise the fifth parameter/Channel Symmetry Indication and/or the QoS policy/parameters determined by the SMF.

In an example, the Namf_Communication_N1N2MessageTransfer message may comprise at least one of: PDU Session ID (s) associated with asymmetric channel, N2 SM information and/or N1 SM container. In an example, the N2 SM information may comprise information sent to the base station. In an example, the N1 SM container may comprise information sent to the wireless device. In an example, the N2 SM information may comprise at least one of: the fifth parameter/Channel Symmetry Indication, the QoS policy/parameters determined by the SMF, PDU Session ID (s) associated with the asymmetric channel, QFI(s) associated with the asymmetric channel, QoS Profile(s) associated with the asymmetric channel, CN Tunnel Info, S-NSSAI from the Allowed NSSAI, Session-AMBR, PDU Session Type, User Plane Security Enforcement information, UE Integrity Protection Maximum Data Rate, RSN, and/or PDU Session Pair ID. In an example, the N1 SM container may comprise a PDU Session Establishment/Modification Accept message/parameter, wherein the PDU Session Establishment/Modification Accept message/parameter may comprise at least one of: the fifth parameter/Channel Symmetry Indication, the QoS policy/parameters determined by the SMF, QoS Rule(s) and QoS Flow level QoS parameters if needed for the QoS Flow(s) associated with the QoS rule(s) for the asymmetric channel, selected SSC mode, S-NSSAI(s), UE Requested DNN, allocated IPv4 address, interface identifier, Session-AMBR, selected PDU Session Type, Reflective QoS Timer (if available), P-CSCF address(es), Control Plane Only indicator, Header Compression Configuration, Always-on PDU Session Granted, Small Data Rate Control parameters, Small Data Rate Control Status, and/or Serving PLMN Rate Control.

In an example, the AMF may send the N2 SM information to the base station. In an example, the AMF may send the N1 SM container to the wireless device in a NAS message. In an example, in response to the message received from the AMF, based on the N2 SM information, the base station may take one or more actions. In an example action, the base station may send an RRC message (e.g., RRCReconfiguration) to the wireless device. The RRCReconfiguration message may indicate modify asymmetric channel to symmetric communication channels.

In response to the message received from the SMF, AMF and/or the base station, the first wireless device/second wireless device may take one or more actions as described in FIG. 19. For example, the first wireless device/second wireless device may take one or more actions based on the message received from the SMF, AMF and/or the base station (e.g., the fifth parameter/Channel Symmetry Indication, the QoS policy/parameters determined by the SMF). For example, the first wireless device/second wireless device may modify the RRC connection associated with the asymmetric channel. For example, the first wireless device/second wireless device may modify the PDU session associated with the asymmetric channel. For example, the first wireless device/second wireless device may modify the network slice associated with the asymmetric channel. For example, the first wireless device/second wireless device may modify the QoS flow associated with the asymmetric channel. For example, the first wireless device/second wireless device may modify the service data flow associated with the asymmetric channel.

In an example embodiment, a base station may receive a first message from a first wireless device. The first message may comprise a parameter indicating an asymmetric channel between the first wireless device and a second wireless device. In an example, based on the parameter, the base station may send a second message to the first wireless device. The second message may indicate modifying radio resource configuration of a bearer associated with the asymmetric channel. In an example, the first message may comprise a second parameter indicating an end to end latency of uplink communication channel of the asymmetric channel. In an example, the first message may comprise a third parameter indicating an end to end latency of downlink communication channel of the asymmetric channel. In an example, the asymmetric channel may comprise an asymmetric uplink communication channel and an asymmetric downlink communication channel. In an example, the asymmetric uplink communication channel and the asymmetric downlink communication channel may indicate end to end latency of the uplink communication channel does not equal to end to end latency of the downlink communication channel. In an example, the asymmetric uplink communication channel and the asymmetric downlink communication channel may indicate a difference between [end to end latency of the uplink communication channel] and [end to end latency of the downlink communication channel] is less than a configured value, wherein the configured value is 2 ms. In an example, the uplink communication channel may indicate a communication path from a first network element to a second network element, and the downlink communication channel may indicate a communication path from the second network element to the first network element. In an example, the first network element may comprise at least one of: a first wireless device; a first base station; a first access and mobility management function (AMF); a first session management function (SMF); a first user plane function (UPF); a first network exposure function (NEF); and/or a first router. In an example, the second network element comprises at least one of: a second wireless device; a second base station; a second AMF; a second SMF; a second UPF; a second NEF; and/or a second router.

In an example, the communication path may comprise at least one of: at least one physical uplink control channel (PUCCH); at least one physical downlink control channel (PDCCH); at least one physical uplink shared channel (PUSCH); at least one physical downlink shared channel (PDSCH); at least one signaling radio bearer (SRB); at least one data radio bearer (DRB); at least one RRC connection; at least one service data flow; at least one QoS flow; and/or at least one protocol data unit (PDU) session. In an example, the communication path may indicate a path of communication over at least one of: an air interface; an ethernet cable; a fiber cable; and/or a communication network. In an example, the first message may comprise a third parameter indicating requesting a symmetric communication channel between the first wireless device and the second wireless device. In an example, the symmetric communication channel may comprise symmetric uplink communication channel and symmetric downlink communication channel. In an example, the symmetric uplink communication channel and symmetric downlink communication channel may indicate end to end latency of the uplink communication channel equals to end to end latency of the downlink communication channel. In an example, the symmetric uplink communication channel and downlink communication channel may indicate a difference between [end to end latency of the uplink communication channel] and [end to end latency of the downlink communication channel] is less than a configured value, wherein the configured value is 2 ms.

In an example, the first message may comprise a radio resource control (RRC) request message, wherein the RRC request message may comprise at least one of the following messages: a MeasurementReport; a ULInformationTransfer; an MSG 3; an MSG 5; a RRCSetupRequest; a RRCSetupComplete; a RRCResumeRequest; a RRCResumeComplete; a UEAssistanceInformation; a UEInformationResponse; and/or a UECapabilityInformation. In an example, the first message may comprise at least one of: an identity of the first wireless device; and/or an identity of the second wireless device. In an example, the identity of the first wireless device and/or the identity of the second wireless device may comprise at least one of: a Generic Public Subscription Identifier (GPSI), wherein the GPSI may comprise a Mobile Station Integrated Services Digital Network (MSISDN) and/or an external identifier; a Subscription Permanent Identifier (SUPI), wherein the SUPI may comprise an International Mobile Subscriber Identity (IMSI) and/or Network Access Identifier (NAI); a Subscription Concealed Identifier (SUCI); a 5G Globally unique Temporary Identity (5G-GUTI); a permanent equipment identifier (PEI), wherein the PEI may comprise an International Mobile Equipment Identity (IMEI); an IP address, wherein the IP address may comprise an IPv4 address and/or an IPv6 prefix; and/or an application level identifier to identify the (first/second) wireless device.

In an example, the first message may comprise an identifier of a RRC connection which associated with the asymmetric channel, wherein the asymmetric channel is over the RRC connection. In an example, the first message may comprise an identifier of a radio bearer which associated with the asymmetric channel, wherein the asymmetric channel is over the radio bearer. In an example, the first message may comprise an identifier of a protocol data unit (PDU) session which associated with the asymmetric channel, wherein the asymmetric channel is over the PDU session. In an example, the first message may comprise an identifier of a network slice which associated with the asymmetric channel, wherein the asymmetric channel is over the network slice. In an example, the first message may comprise an identifier of a QoS flow which associated with the asymmetric channel, wherein the asymmetric channel is over the QoS flow. In an example, the first message may comprise an identifier of a service data flow (SDF) which associated with the asymmetric channel, wherein the asymmetric channel is over the SDF. In an example, the base station may determine to modifying radio bearer resource of the asymmetric channel, based on at least one of: the first message; capability of the base station supporting symmetric communication channel; resource of the base station; local policy; and/or subscription information of the first wireless device.

In an example, the capability of the base station supporting symmetric communication channel may indicate whether the base station has the capability to support an uplink symmetric communication channel and a downlink symmetric communication channel. In an example, the base station may determine a parameter/Channel Symmetry Indication (CSI) indicating the base station has modified the asymmetric channel. In an example, the CSI may indicate the base station provides (updated) symmetric communication channel between the first wireless device and the second wireless device. In an example, based on the first message, the base station may determine the asymmetric channel is associated with a RRC connection for the first wireless device. In an example, based on the first message, the base station may determine the asymmetric channel is associated with a radio bearer for the first wireless device, wherein the radio bearer comprises a data radio bearer and/or a signaling radio bearer. In an example, based on the first message, the base station may determine the asymmetric channel is associated with a network slice for the first wireless device, wherein the network slice is associated with a PDU session.

In an example, based on the first message, the base station may determine the asymmetric channel is associated with a QoS flow for the first wireless device, wherein the QoS flow is associated with a PDU session. In an example, based on the first message, the base station may determine the asymmetric channel is associated with a service data flow for the first wireless device, wherein the service data flow is associated with a PDU session. In an example, based on the first message, the base station may determine the asymmetric channel is associated with a PDU session for the first wireless device, wherein the PDU session is associated with at least one radio bearer, wherein the at least one radio bearer comprises at least one data radio bearer and/or at least one signaling radio bearer. In an example, based on the first message, the base station may determine to modify QoS resource of the asymmetric channel to enable symmetric communication channel, based on at least one of: capability of the base station supporting symmetric communication channel; the first message; resource of the base station; local policy; and/or subscription information of the first wireless device. In an example, based on the first message, the base station may determine to modify QoS resource to enable a symmetric uplink communication channel and downlink communication channel between the first wireless device and the second wireless device. In an example, the QoS resource may comprise QoS parameters for a signal radio bearer and/or a data radio bearer.

In an example, based on the parameter, the base station may determine to modify time/frequency/space/power resources to enable a symmetric uplink communication channel and downlink communication channel between the first wireless device and the second wireless device. In an example, based on the parameter, the base station may determine radio bearer configuration information of a radio bearer for the asymmetric channel. In an example, the radio bearer configuration information may comprise parameters for a data radio bearer. In an example, the radio bearer configuration information may comprise parameters for a signal radio bearer. In an example, the radio bearer configuration information may comprise QoS parameters for a signal radio bearer and/or a data radio bearer. In an example, the QoS parameters may comprise at least one of: Resource type; priority level; Packet Delay Budget (PDB); Packet Error Rate (PER); Averaging window; and/or Maximum Data Burst Volume.

In an example, the second message may comprise an RRC response message, wherein the RRC response message may comprise at least one of following messages: a DLInformationTransfer; an RRCReconfiguration; an MSG 4; a RRC-Setup; a RRCResume; UEReconfiguration; UEInformation-Request; and/or UECapabilityEnquiry. In an example, the second message may comprise at least one of: a registration response message; and/or a PDU session response message. In an example, the first message may comprise at least one of: a registration request message; and/or a protocol data unit (PDU) session request message. In an example, the second message may comprise comprises a RRCCongfiguration message, wherein the RRCCongfiguration message comprises one or more parameters to modify/adjust the radio bearer/QoS resources associated with the asymmetric channel. In an example, the second message may comprise a RRCCongfiguration message, wherein the RRCCongfiguration message comprises one or more parameters to modify/adjust the time/frequency/space/power resources associated with the asymmetric channel. In an example, the first wireless device may detect the asymmetric channel between the first wireless device and a second wireless device. In an example, the parameter may indicate a request for symmetric communication channels between the first wireless device and the second wireless device. In an example, the parameter may indicate a request for symmetric communication channels between the first wireless device and the base station. In an example, the parameter may indicate a request to modify/change the asymmetric communication channels to symmetric communication channels between the first wireless device and the second wireless device.

In an example, the parameter may indicate a request to modify/change the asymmetric communication channels to symmetric communication channels between the first wireless device and the base station. In an example, the base station may determine to modify/change asymmetric channel to symmetric communication, based on at least one of: capability of the base station supporting symmetric communication channel; the first message; resource of the base station; local policy; and/or subscription information of the first wireless device. In an example, the second message may indicate modifying/changing the asymmetric channel to symmetric communication channel. In an example, the second message may indicate modifying/changing radio resource configuration of a bearer associated with the asymmetric channel. In an example, the second message may indicate modifying/changing time/frequency/space/power resources associated with the asymmetric channel. In an example, the second message may indicate modifying/changing QoS resource associated with the asymmetric channel. In an example, the second message may indicate modifying/changing radio bearer configuration information associated with the asymmetric channel.

In an example, the second message may indicate modifying/changing at least one of: an RRC connection associated with the asymmetric channel; a PDU session associated with the asymmetric channel; a network slice associated with the asymmetric channel; a QoS flow associated with the asymmetric channel; and/or a service data flow associated with the asymmetric channel. In an example, based on the second message, first wireless device may modify the asymmetric channel to symmetric communication channel. In an example, based on the second message, first wireless device may modify radio resource configuration of a bearer associated with the symmetric channel. In an example, based on the second message, first wireless device may modify time/frequency/space/power resources associated with the asymmetric channel. In an example, based on the second message, first wireless device may modify QoS resource associated with the asymmetric channel. In an example, based on the second message, first wireless device may modify radio bearer configuration information associated with the asymmetric channel. In an example, based on the second message, first wireless device may modify at least one of: an RRC connection associated with the asymmetric channel; a PDU session associated with the asymmetric channel; a network slice associated with the asymmetric channel; a QoS flow associated with the asymmetric channel; and/or a service data flow associated with the asymmetric channel.

In an example embodiment, a first wireless device may send a first message to a base station, the first message may comprise: a first parameter indicating an asymmetric channel between the first wireless device and a second wireless device; a second parameter indicating an end to end latency of uplink communication channel of the asymmetric channel; a third parameter indicating an end to end latency of downlink communication channel of the asymmetric channel; a fourth parameter indicating a request for symmetric communication channels between the first wireless device and the second wireless device; an identity of the first wireless device associated with the asymmetric channel; an identifier of a RRC connection associated with the asymmetric channel; an identifier of a radio bearer associated with the asymmetric channel; an identifier of a protocol data unit (PDU) session associated with the asymmetric channel; an identifier of a network slice associated with the asymmetric channel; an identifier of a QoS flow associated with the asymmetric channel; and/or an identifier of a service data flow associated with the asymmetric channel. In an example, the first wireless device may receive a second message from the base station. The second message may indicate at least one of: modifying radio bearer resource of the asymmetric channel; modifying the asymmetric channel to symmetric communication channel; modifying time/frequency/space/power resources associated with the asymmetric channel; and/or QoS resource associated with the asymmetric channel. In an example, the second message may indicate RRC connection, the PDU session, the network slice, the QoS flow and/or the service data flow associated with the asymmetric channel. In an example, based on the second message, the first wireless device may modify at least one of: radio bearer resource of the asymmetric channel; the asymmetric channel to symmetric communication channel; time/frequency/space/power resources associated with the asymmetric channel; and/or QoS resource associated with the asymmetric channel. In an example, based on the second message, first wireless device may modify at least one of: an RRC connection associated with the asymmetric channel; a PDU session associated with the asymmetric channel; a network slice associated with the asymmetric channel; a QoS flow associated with the asymmetric channel; and/or a service data flow associated with the asymmetric channel.

In an example embodiment, a first wireless device may send a first message to a network function. The first message may indicate an asymmetric channel between the first wireless device and a second wireless device. In an example, the first wireless device may receive a second message from the base station. The second message may indicate modifying radio bearer resource of the asymmetric channel. In an example, the network function may comprise at least one of: a base station; an AMF; an SMF; and/or an NEF. In an example embodiment, a first wireless device may send a first message to a network function. The first message may indicate an asymmetric channel between the first wireless device and a second wireless device. In an example, the network function may comprise at least one of: a base station; an AMF; an SMF; and/or an NEF. In an example embodiment, a network function of a network may receive a first message from a first wireless device. The first message may indicate an asymmetric channel between the first wireless device and a second wireless device. In an example, the network function may send a second message to the first wireless device. The second message may indicate the network provides (updated) symmetric communication channel between the first wireless device and the second wireless device. In an example, the network function may comprise at least one of: a base station; an AMF; an SMF; and/or an NEF. In an example embodiment, a network function of a network may receive a first message from a first wireless device. The first message may indicate an asymmetric channel between the first wireless device and a second wireless device.

In an example embodiment, an AMF may receive a first message from a first wireless device. The first message may indicate an asymmetric channel between the first wireless device and a second wireless device. In an example, the AMF may send a second message to the first wireless device. The second message may indicate the network provides (updated) symmetric communication channel between the first wireless device and the second wireless device. In an example, the AMF may determine, a parameter/Channel Symmetry Indication (CSI) indicating the network has modified the asymmetric channel. In an example embodiment, an access and mobility management function (AMF) of a network may receive a first message from a first wireless device. The first message may indicate requesting modifying an asymmetric channel to symmetric communication channels. The first message may comprise: a first parameter indicating an asymmetric channel between the first wireless device and a second wireless device; a second parameter indicating an end to end latency of uplink communication channel of the asymmetric channel; a third parameter indicating an end to end latency of downlink communication channel of the asymmetric channel; a fourth parameter indicating a request for symmetric communication channels between the first wireless device and the second wireless device; an identity of the first wireless device associated with the asymmetric channel; an identifier of a RRC connection associated with the asymmetric channel; an identifier of a radio bearer associated with the asymmetric channel; an identifier of a protocol data unit (PDU) session associated with the asymmetric channel; an identifier of a network slice associated with the asymmetric channel; an identifier of a QoS flow associated with the asymmetric channel; and/or an identifier of a service data flow associated with the asymmetric channel. In an example, the AMF may send a second message to a base station. The second message may comprise one or more parameters of the first message. In an example, the AMF may receive from the base station, a response message indicating the base station provides (updated) symmetric communication channel. In an example, the AMF may determine to accept the request of modifying the asymmetric channel to the symmetric communication channel. In an example, the AMF may send to the first wireless device, a NAS message indicating: network has modified the asymmetric channel to symmetric communication channels; and/or the network provides (updated) symmetric communication channels.

In an example embodiment, a session management function (SMF) may receive a first message from a first wireless device. The first message may indicate an asymmetric channel between the first wireless device and a second wireless device. In an example, the SMF may send to the first wireless device, a second message indicating the network provides (updated) symmetric communication channel between the first wireless device and the second wireless device. In an example embodiment, a session management function (SMF) may receive a first message from a first wireless device. The first message may indicate requesting modifying an asymmetric channel to symmetric communication channels. The first message may comprise: a first parameter indicating an asymmetric channel between the first wireless device and a second wireless device; a second parameter indicating an end to end latency of uplink communication channel of the asymmetric channel; a third parameter indicating an end to end latency of downlink communication channel of the asymmetric channel; a fourth parameter indicating a request for symmetric communication channels between the first wireless device and the second wireless device; an identity of the first wireless device associated with the asymmetric channel; an identifier of a RRC connection associated with the asymmetric channel; an identifier of a radio bearer associated with the asymmetric channel; an identifier of a protocol data unit (PDU) session associated with the asymmetric channel; an identifier of a network slice associated with the asymmetric channel; an identifier of a QoS flow associated with the asymmetric channel; and/or an identifier of a service data flow associated with the asymmetric channel. In an example, based on the first message, the SMF may determine at least one of: to modify the asymmetric channel to symmetric communication channel; and/or to modify QoS policy/parameter associated with the asymmetric channel to enable a symmetric uplink communication channel and downlink communication channel. In an example, the SMF may send to an AMF, a second message comprising: one or more parameters of the first message; and/or QoS policy/parameter determined by the SMF. In an example, the SMF may receive from the AMF, a response message indicating network providing symmetric communication channel. In an example, the SMF may determine modifying at least one user plane rule associated with the asymmetric channels. In an example, the SMF may send to a UPF/NEF, a third message indicating modifying the asymmetric channel to symmetric communication channel. In an example, the SMF may send to the first wireless device, a NAS message indicating: the network provides (updated) symmetric communication channel between the first wireless device and the second wireless device; accepting the request of modifying the asymmetric channel to symmetric communication channels; and/or the network has modified/changed the asymmetric channel to symmetric communication channel.

What is claimed is:

1. A base station comprising:
one or more processors; and
memory storing instructions that, when executed by the one or more processors, cause the base station to:
receive, from a first wireless device, a first radio resource control (RRC) message indicating that a communication associated with a bearer is asymmetric, wherein the first RRC message comprises an identifier of the bearer associated with an asymmetric channel, and wherein the bearer is associated with a service that needs a symmetric communication; and send, to the first wireless device and based on the first RRC message, a second RRC message comprising radio resource configuration parameters of the first wireless device, wherein the second RRC message indicates modifying a radio bearer resource of the asymmetric channel.

2. The base station of claim 1, wherein the indicating that the communication associated with the bearer is asymmetric indicates an asymmetric uplink communication channel and an asymmetric downlink communication channel.

3. The base station of claim 2, wherein the indicating the asymmetric uplink communication channel and the asymmetric downlink communication channel indicates end to end latency of the uplink communication channel is not equal to end to end latency of the downlink communication channel.

4. The base station of claim 2, wherein the indicating the asymmetric uplink communication channel and downlink communication channel indicates a difference between latency of the uplink communication channel and latency of the downlink communication channel is less than a configured value.

5. The base station of claim 2, wherein the indicating the uplink communication channel indicates a communication path from a first network element to a second network element; and wherein the indicating the downlink communication channel indicates a second communication path from the second network element to the first network element.

6. The base station of claim 1, wherein the first RRC message comprises an identifier of an RRC connection which is associated with the asymmetric channel; and wherein the asymmetric channel is over the RRC connection.

7. The base station of claim 1, wherein the asymmetric channel is over the bearer.

8. The base station of claim 1, wherein the first RRC message comprises an identifier of a protocol data unit (PDU) session which is associated with the asymmetric channel; and wherein the asymmetric channel is over the PDU session.

9. The base station of claim 1, wherein the first RRC message comprises an identifier of a network slice which is associated with the asymmetric channel; and wherein the asymmetric channel is over the network slice.

10. The base station of claim 1, wherein the first RRC message comprises an identifier of a quality of service (QoS) flow which is associated with the asymmetric channel; and wherein the asymmetric channel is over the QoS flow.

11. The base station of claim 1, wherein the first RRC message comprises an identifier of a service data flow (SDF) which is associated with the asymmetric channel; and wherein the asymmetric channel is over the SDF.

12. The base station of claim 1, wherein the instructions further cause the base station to determine, based on the first RRC message, radio bearer configuration information of a radio bearer for the asymmetric channel.

13. The base station of claim 12, wherein the radio bearer configuration information comprises parameters for a data radio bearer, or for a signal radio bearer, or for both a data radio bearer and a signal radio bearer.

14. The base station of claim 12, wherein the radio bearer configuration information comprises QoS parameters for a signal radio bearer, for a data radio bearer, or for both a signal radio bearer and a data radio bearer.

15. A wireless device comprising:

one or more processors; and memory storing instructions that, when executed by the one or more processors, cause the wireless device to:

send, to a base station, a first radio resource control (RRC) message indicating an asymmetric channel between the wireless device and a second wireless device, wherein the first RRC message comprises an identifier of a bearer associated with the asymmetric channel, and wherein the bearer is associated with a service that needs a symmetric communication; and receive, from the base station, a second RRC message indicating modifying a radio bearer resource of the asymmetric channel.

16. The wireless device of claim 15, wherein the first RRC message indicates an asymmetric uplink communication channel and an asymmetric downlink communication channel.

17. The wireless device of claim 15, wherein the first RRC message comprises an identifier of an RRC connection which is associated with the asymmetric channel; and wherein the RRC connection is over the asymmetric channel.

18. The wireless device of claim 15, wherein the first RRC message comprises an identifier of a radio bearer which is associated with the asymmetric channel; and wherein the asymmetric channel is over the radio bearer.

19. The wireless device of claim 15, wherein the first RRC message comprises an identifier of a protocol data unit (PDU) session which is associated with the asymmetric channel; and wherein the PDU session is over the asymmetric channel.

20. A non-transitory computer-readable medium comprising instructions that, when executed by one or more processors of a base station, cause the base station to:

receive, from a first wireless device, a first radio resource control (RRC) message indicating that a communication associated with a bearer is asymmetric, wherein the first RRC message comprises an identifier of the bearer associated with an asymmetric channel, and wherein the bearer is associated with a service that needs a symmetric communication; and send, by the base station to the first wireless device and based on the first RRC message, a second RRC message comprising radio resource configuration parameters of the first wireless device, wherein the second RRC message indicates modifying radio bearer resource of the asymmetric channel.

* * * * *